US012790872B2

(12) United States Patent
Jaroff et al.

(10) Patent No.: US 12,790,872 B2
(45) Date of Patent: Nov. 10, 2026

(54) MOTOR-ACTUATED HANDS-FREE DOOR OPENING AND CLOSING SYSTEM

(71) Applicant: Joseph Ivan Jaroff, Old Westbury, NY (US)

(72) Inventors: Joseph Ivan Jaroff, Old Westbury, NY (US); Yefim Safris, Golden Valley, MN (US)

( * ) Notice: Subject to any disclaimer, the term of this patent is extended or adjusted under 35 U.S.C. 154(b) by 167 days.

(21) Appl. No.: 18/732,723

(22) Filed: Jun. 4, 2024

(65) Prior Publication Data

US 2024/0384584 A1 Nov. 21, 2024

Related U.S. Application Data

(60) Continuation-in-part of application No. 18/198,250, filed on May 16, 2023, now Pat. No. 12,000,191, (Continued)

(51) Int. Cl.
*E05F 13/02* (2006.01)
*E05F 15/624* (2015.01)
*E05F 11/54* (2006.01)

(52) U.S. Cl.
CPC ............ *E05F 15/624* (2015.01); *E05F 13/02* (2013.01); *E05F 11/54* (2013.01); (Continued)

(58) Field of Classification Search
CPC .............................. E05F 15/624; E05F 15/641
See application file for complete search history.

(56) References Cited

U.S. PATENT DOCUMENTS 1,694,431 A * 12/1928 Russell ................. E05F 15/624 49/358
2,827,284 A * 3/1958 Bunzl ................... E05F 15/624 49/32
(Continued)

FOREIGN PATENT DOCUMENTS

CN 116696186 A * 9/2023
FR 3120380 A1 * 9/2022 ............ E05F 15/624
GB 2259547 A * 3/1993 ............ E05F 15/624

*Primary Examiner* — Catherine A Kelly
(74) *Attorney, Agent, or Firm* — Alfred M. Walker; Thomas A. O'Rourke; James Bongiorno

(57) ABSTRACT

A cost-effective, hands-free door opener activated via foot, cane, remote, Bluetooth, security systems, smart home technology, or proximity sensors which promotes hygienic and accessible door operation without physical contact. This device features a linear motion mechanism with a spring-loaded drive wheel, ensuring stable operation across varied surface types, environments, and door orientations. It includes precise control over the angle, distance, and speed of door opening and closing, complemented by user interfaces. Sensors adapt to environmental conditions and user presence, reducing pathogen transmission risks. Programmable delays for door operations cater to different traffic flows and safety requirements. The system supports various motor types and power setups including wireless operation and charging, suitable for retrofitting existing doors in commercial, institutional, and residential areas. Safety features detect obstructions, ensuring seamless operation. This invention integrates robust mechanical design with intelligent sensors integrated by a controller, enhancing door functionality in diverse environments.

24 Claims, 40 Drawing Sheets

Related U.S. Application Data which is a division of application No. 17/345,898, filed on Jun. 11, 2021, now Pat. No. 11,692,384.

(60) Provisional application No. 63/102,377, filed on Jun. 12, 2020.

(52) U.S. Cl.
CPC ..... *E05Y 2201/706* (2013.01); *E05Y 2201/72* (2013.01); *E05Y 2400/3017* (2024.05)

(56) References Cited

U.S. PATENT DOCUMENTS

| | | | | |
|---|---|---|---|---|
| 4,569,546 | A * | 2/1986 | Howard | E05B 53/001 292/225 |
| 4,672,773 | A * | 6/1987 | Bilt | E05F 15/635 49/358 |
| 4,754,572 | A * | 7/1988 | Bilt | E05F 15/632 49/358 |
| 5,801,501 | A * | 9/1998 | Redelberger | E05F 15/697 318/469 |
| 6,194,857 | B1 * | 2/2001 | Stolz | B60J 7/0573 296/213 |
| 6,891,479 | B1 * | 5/2005 | Eccleston | E05F 15/63 340/545.1 |
| 7,021,005 | B1 * | 4/2006 | Curry | E05F 15/635 49/358 |
| 7,021,007 | B2 * | 4/2006 | Jacobs | E05D 15/0691 16/97 |
| 7,213,369 | B2 * | 5/2007 | Freeman | E05F 15/77 704/E15.045 |
| 7,261,012 | B2 * | 8/2007 | Meyer | G01P 3/487 74/421 A |
| 7,872,470 | B2 * | 1/2011 | Booth | G01P 3/488 324/207.2 |
| 9,115,530 | B2 | 8/2015 | Michael | |
| 9,163,446 | B2 * | 10/2015 | Houser | E05F 15/40 |
| 10,081,977 | B2 | 9/2018 | Shelley | |
| 11,136,812 | B2 * | 10/2021 | Rabinowitz | E05F 15/624 |
| 11,174,664 | B2 * | 11/2021 | Sellinger | E05F 15/624 |
| 11,215,003 | B2 * | 1/2022 | Nash | E05F 15/624 |
| 11,377,895 | B2 * | 7/2022 | Cohen | E05F 5/02 |
| 11,486,185 | B2 * | 11/2022 | Tulsidas | G06V 40/40 |
| 11,585,143 | B1 * | 2/2023 | Iriarte | E05B 47/0001 |
| 11,692,384 | B2 * | 7/2023 | Jaroff | E05F 11/54 49/324 |
| 11,713,609 | B2 * | 8/2023 | Leonard | E05F 15/622 49/324 |
| 12,000,191 | B2 * | 6/2024 | Jaroff | E05F 11/54 |
| 2012/0304541 | A1 | 12/2012 | Goodman | |
| 2013/0318878 | A1 | 12/2013 | Manseder | |
| 2021/0293071 | A1 * | 9/2021 | Leonard | E05F 15/622 |
| 2021/0388659 | A1 * | 12/2021 | Jaroff | E05F 13/04 |
| 2022/0108581 | A1 * | 4/2022 | Jain | G07F 17/0014 |
| 2022/0333423 | A1 * | 10/2022 | Leonard | E05F 15/622 |

* cited by examiner

SCHEMATIC DIAGRAM
OF TIME DELAY SYSTEM FOR FOOT OPERABLE DOOR OPENER
WITH SLIP CLUTCH (Sliding Door Wheel Orientation)

(Swing Door Wheel Orientation)

Swing Door 3/4 Transparent View

MOTOR-ACTUATED HANDS-FREE DOOR OPENING AND CLOSING SYSTEM

CROSS-REFERENCES TO RELATED APPLICATIONS

The present application is a continuation-in-part of application Ser. No. 18/198,250, filed May 16, 2023, and claims priority under 35 USC 120 therefrom, which '250 application is a divisional of application Ser. No. 17,345,898, filed Jun. 11, 2021, now U.S. Pat. No. 11,692,384 B2 issued Jul. 4, 2023, and claims priority under 35 USC 120 therefrom. The '898 application claims benefit of provisional application No. 63/102,377, filed Jun. 12, 2020, and claims priority in part therefrom under 35 U.S.C. § 119 (e) therefrom. The disclosures of the '250 and the '898 applications are incorporated by reference herein, the disclosures of the '377 provisional application is incorporated by reference herein.

FIELD OF THE INVENTION

The present invention relates to safe, foot operable door openers, to avoid manual hands contact with door handles having unsanitary pathogens thereon. Foot operable implies use of the foot, or use of a cane. The foot operable door opener could also be applied to the hands-free opening of many different types of doors, including, but not limited to, those doors that warehouse workers and food service wait staff may utilize for ingress and egress while carrying packages and/or heavy trays of food. The foot operable door opener also acts as a door assist for people with weak arms. The foot operable door opener is a cost-effective aid for people with disabilities who are in walkers or wheelchairs at home or in commercial environments. The foot operable door opener is a cost-effective application for home use convenience of entering a residence with groceries, letting pets in and outdoors, regulating household temperatures and saving energy by remotely opening and closing doors. The foot operable door opener is a cost-effective application which can be integrated into smart home technology and aid in life safety and egress.

BACKGROUND OF THE INVENTION

In this era of germs and viruses, including, but not limited to, the Covid-19 virus, other fungal bacterial and viral pathogens, door handles can be a constant source of transmission of germs and viruses, being readily communicable to the hands of subsequent openers of those doors.

Efforts have been made to provide electrically operable door openers, but they are often complex and expensive to install and operate.

For example, U.S. Pat. No. 10,081,977 B2 of Shelley, discloses an automatic electronically and remotely controlled door opening and closing device, using RF frequency remote controls, and a chassis and a slide mechanism with a spring-loaded tensioner for ground contact, in contrast to our retractable variable cam linear motion device to create floor friction and traction. The system taught by Shelley and U.S. 2013/0318878 (Manseder) or US 2012/0304541 (Goodman) does not include a foot-operated switch, and does not have real time door position monitoring and real time regulating and adjusting of the wheel's vertical position using a linear actuator to account for sloped conditions and/or accommodating for application of a variable force with respect to the ground plane and/or for accommodating changing environmental conditions and/or in situ conditions. Shelly's device has drawbacks if used in a residential and/or a commercial application.

Other patents promote a non-motorized cradle for a footwear, such as a shoe or boot, which is attached to a door so that a user has to awkwardly insert the shoe or boot into the door attached, non-moving footwear cradle, where the cradle includes a lower horizontal floor plate and a distal upwardly extending vertical ledge, whereby the user attempts to open the door using only the leverage of the user's leg, as noted in U.S. Pat. No. 9,115,530 of Michael Sewell. This is not practical since most doors, by design, are equipped with standard overhead closers, or floor closers or spring hinges, which have a 5-10 lbs. of resistance. A force too great to comfortably overcome without mechanical advantage while pivoting on one leg.

The openers of the aforementioned patents do not provide simple, cost effective, means of opening a door without using one's hands, and without a footwear cradle, offering no mechanical assistance. They are also not applicable to siding doors.

OBJECTS OF THE INVENTION

It is therefore an object of the present invention to provide a simple, cost-effective means of opening a door without using one's hands.

It is also an object of the present invention to provide a convenient, safe door opener solely that may be operated using the foot of the user upon a pedal actuator of a door opener.

It is yet another object of the present invention to provide a door opener with a time delay on both the opening and closing cycle of the door opening/closing processes, to permit safe egress through the door.

It is a further object to provide a foot operable door opener that can be retrofit onto any existing door.

It is also an object of the invention to provide a foot operable door opener, with optional motor assist for persons who have limited mobility, and/or very limited strength.

It is therefore an object of the present invention to provide a simple, cost-effective means of opening a door without using one's hands utilizing the most current: motor, sensor, and interfacing technologies currently available.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In keeping with these objects and others which may become apparent, in one non-motorized embodiment the present invention is directed to a foot operable door opener, without using one's hands, and without an electrical assist.

It is to be known in the trade as the SAFETY MAX™ DOOR OPENER.

In this era of germs and viruses, non-motorized embodiment provides a simple, cost effective, means of opening a door without using of one's hands, and without an electrical assist. The entrance cycle is initiated by stepping on a pedal. This force drives the pedal a ¼ turn, engaging a soft wheel to open the door. The pedal is hard linked to a crank arm which goes into a unidirectional crank shaft hub to turn the wheel. The downward pressure from the pedal pivots a ratcheted hinge connected to a bracketed spring-loaded wheel assembly to keep constant pressure to the ground. A speed increasing gear box or multiple pumps of the pedal turns the wheel system two or more 360 degrees rotations, opening the door sufficiently to allow the entrant to pass. When the foot pedal is dis-engaged by the entrant, this action releases a one way directional mechanical device, such as a ratchet hinge mechanism, or other one way mechanical devices, such as cams, coils, one way threaded devices, slides and ways, or rack and pawl devices, allowing the spring assisted wheel assemble to rotate or slide up, back to its original up position, releasing the wheel from the ground, allowing the door to close with a standard overhead closer or spring-loaded hinge. Now the door is ready for the next entrant.

Models may also include an optional, main spring which can be wound for a further assist to accommodate a delayed action start, where now, a foot switch actuated spring-loaded wheel drops and engages opening cycle as described above. The door which after actuation, will close after a time delay on the retracting spring mechanism, also described above. Both opening and closing are by mechanical advantage, without the use of electric power or motors. This invention is differentiated, unique, novel, and patentable from all prior art, by its' being a simple machine without electric power, electric motors, scanner or traffic readers of any kind, and through mechanical advantage and a spring loaded hinge assembly to keep constant pressure to the floor plane, hygienically opening doors when safety from disease, virus, bacteria, or other hazards are wished to be avoided or hand operation is not possible as with warehouse or food service, where hands free greatly eases the potential for trip and drop hazards, by the use of an economical apparatus that can be added/or retro fit to any door type, swinging or sliding, wood, hollow metal, metal-framed glass, all glass, etc. to facilitate ingress and egress passages of all types, locations and environments.

Other alternate embodiments for the foot operable door opener may include an internal or wired latch release mechanism, enabling the door opener to be used on a standard latching door, such as found in most residences.

In a first embodiment, the foot operable door opener includes a crank assembly including a crank arm, which is rotated from a home position by depression of a foot pedal, with a foot or cane, to rotate a crankshaft 1.3. A drive assembly is connected to the crank arm through the crank shaft for winding one or more main springs.

A gear train with a preselected speed increasing ratio transfers power from the main spring to a drive wheel assembly, which preferably includes a main drive wheel with a mechanical soft, durometer contact material, or a pneumatic main drive wheel connected to a main driveshaft. A traction tension assembly is actuated by the main crankshaft to rotate the main shaft for swinging the door open.

Optionally, a delay assembly is provided for delaying release of potential energy of the main spring to the main drive shaft in order to allow safe ergonomic transfer of an entrant's weight to both feet, which allows the entrant to comfortably step aside to clear swinging of the door.

A return spring is mounted on the aforementioned crank shaft and arm, for returning the crank arm to its home position; and, whereby an entrant is able to open the door without use of hands or electrical assist.

A safety feature is included, whereby the gear train of the door opener includes a clutch bearing allowing for one-way travel of the gear train with no backlash or backward movement.

The gear train preferably has a speed increasing ratio of about 1 to 10.

For safety reasons, the delay assembly of the door opener includes a spring-loaded mechanical, dashpot, or pneumatic cylinder, which is compressed by the main crankshaft when the pedal and crank arm are depressed, so that the pneumatic cylinder has an opening, such as an orifice or an adjustable needle valve to allow air to escape from a compressed chamber in the mechanical or pneumatic cylinder, regulating the delay which releases stored potential from the main springs and which starts a cycle of the main drive wheel turning, without losing any potential energy.

Further with respect to the delay assembly, the aforesaid pneumatic cylinder has a piston and a spring-loaded plunger, where the plunger depresses a pawl, which engages a one-way mechanical directional device, such as a ratcheting wheel or socket, which is directly connected to the aforesaid main drive wheel. Other one-way directional devices can be used, such as cams, one-way threaded devices, rack and pawl devices. The release of pressure within the cylinder causes the spring-loaded plunger to release the ratchet, and the delay releasing stored potential from the main spring, starts a cycle of the main drive wheel turning, without losing any potential energy.

The traction assembly is also actuated when the crank arm is depressed, which rotates the aforesaid main shaft, causing a depressing arm to pull down a fork assembly, engaging a spring-loaded mechanism held down by a locking pawl, which causes a constant downward pressure for a predetermined length of travel, to accommodate an undercut under said door, threshold, and any slope in front of the door. When an activation pin hits an activation trigger when the aforesaid main springs unwinds at an end of its rotation, the spring-loaded mechanism releases and raises up the locking pawl and the main drive wheel back to a resting position ready for a next cycle.

Afterward, the door closes by itself with the assistance of at least one of standard spring-loaded or gravity hinges, overhead closing mechanisms and floor closing mechanisms, which is standard equipment in all operating entrance doors, or can be added to interior doors not normally equipped therewith.

Optionally, the drive wheel assembly is connected to the crank arm with a set of steel cables wrapped around a drum, whereby when the pedal and crank arm are depressed, the cables turn the drum, winding the main spring. Optionally, the main springs are all left-handed or right-handed.

For stability, a chassis is mounted on the door, which houses substantially all operative elements of the door opener.

The present invention also includes in a preferred first embodiment, a method of constructing and using a foot operable door opener comprising the steps of:

a) providing a crank assembly comprising a crank arm rotated from a home position by depression of a foot pedal for rotating a crankshaft;

b) providing a cables assembly connected to said crank arm through said transfer shaft for winding one or more main springs;

providing a drive assembly connected to said transfer shaft connected to said gear train;

c) providing a gear train with a preselected speed increasing ratio for transferring power from the main spring to a drive wheel assembly;

whereby the drive wheel assembly comprises a soft, durometer, main drive wheel connected to a main driveshaft;

d) or alternately providing a crank assembly and crank shaft which rotate a gear powertrain with a speed increasing ratio of about 1 to 10 which winds one or more main springs and providing main springs to the drive wheel assembly. whereby the drive wheel assembly comprises a soft, durometer, main drive wheel connected to a main driveshaft;

e) actuating a traction tension assembly by the crankshaft to rotate the drive shaft for swinging the door open;

f) providing a delay assembly for delaying release of potential energy of said main spring to said main drive shaft in order to allow safe ergonomic transfer of an entrant's weight to both feet, allowing said entrant to comfortably step aside to clear swinging of said door;

g) providing a return spring mounted on said crank shaft for returning said crank arm, to its home position;

h) the step of an entrant using said door opener to open said door without use of hands or electrical assist;

i) providing a carriage assembly to house all associated mechanisms and said relationships;

j) providing holes in said carriage to facilitate the securing of said door opening to new or existing doors;

k) providing clamping sub plate mounting system which wraps around bottom and edge of door to facilitate the installation of said opener on any door without penetrating, drilling holes, or doing any damage to existing glass, metal, wood, or fiberglass doors.

l) provide ergonomic cover to protect said door opener from weather, dirt, and environmental conditions; and, providing said cover to protect, guard and deflect pedestrians from being entangled or tripping on said door opener.

The method of opening a foot openable door opener without an electric assist further includes the optional step of providing the gear train including a clutch bearing allowing for one-way travel of the gear train with no backlash or backward movement.

Preferably the gear train has a speed increasing ratio of about 1 to 10.

The method also includes the step of the delay assembly having a spring-loaded mechanical or pneumatic cylinder, which is compressed by the main crankshaft when the pedal and crank arm are depressed, and wherein the mechanical or pneumatic cylinder has an opening, such as a fixed orifice or adjustable needle valve, for allowing air to escape from a compressed chamber in the pneumatic cylinder or dashpot, whereby regulating the delay releases stored potential from the main springs and starts a cycle of the main drive wheel turning without losing any potential energy.

Alternately the method optionally includes a friction clutch to restrain said drive wheel for a fixed or variable length of time, or a dampener, such as a dash pot cylinder to mechanically regulate spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

The method further includes the mechanical or pneumatic cylinder having a piston and a spring-loaded plunger, where the spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

Optionally the method further includes the mechanical or dashpot cylinder having a piston and a spring-loaded plunger, where the spring-loaded plunger depresses a pawl which engages a ratcheting wheel, which itself is directly connected to the aforesaid main drive wheel, whereby release of pressure within the cylinder causes the spring-loaded plunger to release the ratchet, and the delay releases stored potential from the main spring and starts a cycle of the main drive wheel turning without losing any potential energy.

Optionally, the method also includes the step in which the traction assembly is also actuated when the crank arm is depressed, rotating the crankshaft, which causes a depressing arm to pull down a bracket arm, engaging a spring-loaded mechanism held down by a locking pawl, causing a constant downward pressure for a predetermined length of travel, to accommodate an undercut under the door, threshold, and any slope in front of the door.

The method of opening the foot operable door opener further includes the step of having an activation pin hit an activation trigger when the main springs unwind at an end of its rotation, thereby releasing the locking pawl closing the spring-loaded mechanism, to raise up the main drive wheel 5.1 back to a resting position and ready for a next cycle.

Optionally the method also includes a time delay for the raising of the main drive wheel back to its original position for a prescribed length or variable length of time before lifting main drive wheel 5.1 back, to a resting position, and ready for a next cycle.

The method also includes the step of connecting the drive wheel assembly to the gear train which connects to the transfer shaft where the crank arm with a set of steel cables wrapped around a drum, whereby when the pedal and crank arm depressed, the cables turn the drum and transfer shaft, winding the main spring.

Optionally, the main springs are all left-handed and right-handed.

Furthermore, when a chassis is mounted on the door, it houses substantially all operative elements of the foot operable door opener.

In a second embodiment, a foot operable door opener operates by user exertion of force against a pedal attached to a crank arm and shaft, where a transfer shaft works with a transfer arm and a drive pawl, and with right-handed main springs as a drive assembly, mounted on a main chassis with attachments, such as chassis mounting holes and screws or a clamping sub plate. A gear train of this second embodiment includes a main gear, with a clutch bearing, an idler increasing gear and an idler shaft, as well as with a secondary speed increasing gear, a shaft, a drive gear driving a drive shaft with associated transfer gears, communicating with a drive wheel. A traction/tension carriage assembly regulates adhesive or slippage and coefficient of friction of the various components on surfaces upon which they move, including a bracket arm, an actuating arm, a connecting arm, a carriage depressing arm, a hinge pin, a tension arm with a tension arm roller. A traction spring is provided, along with a trigger actuator pin, to ensure smooth opening and closing of the door, with a delay by way of a friction slip clutch between the drive wheel and the drive shaft.

In a third embodiment, a non-motorized foot operable door opener with a drive train, preferably a planetary gear assembly, is initiated in an entrance cycle by the user stepping on a pedal This force exerted on the pedal drives the crank arm, a sixty to ninety (60-90) degree turn, engaging a soft wheel, to open the door D. A speed increasing planetary gear box, winds one or more springs, (right and left-handed) thereby opening the door, sufficiently to allow the entrant to pass until the foot pedal, is dis-engaged by the entrant. The crank arm is returned to its original position, with the aid of the return arm spring. This action causes the crank arm, to strike the trigger lever release, which in turn releases the ratcheting hinge mechanism and spring, allowing the wheel return lifting springs, to lift the wheel assembly to rotate up, back to its original up position, guided by the guide pin and stop. This disengages the wheel, from the ground, thus allowing the door to close with a standard overhead closer or spring-loaded hinge, which is standard hardware on most doors. At that time after the opening and closing of the door, the door is ready for the next entrant.

In an optional alternate embodiment shown in FIGS. 13, 14, 15, 16, 17 and 18, the drawings depict three different versions (V-4 as in FIGS. 13 and 14, V-5 as in FIGS. 15 and 16, and V-6 as in FIGS. 17 and 18) of a motorized door opening and closing system, in which the motor and batteries are shown in different locations. FIGS. 19A-19B, as well as FIGS. 20-32 show other embodiments for opening and closing of either a sliding door or a pivoting door, but which are shown utilizing a column lifter (i.e., a multi-stage linear actuator) as the linear actuation device. It is noted that any suitable linear actuation device now known in the art or later developed that may provide suitable linear actuation may alternatively or additionally be used in any embodiment described herein, and use of the term "linear actuator" herein is intended to broadly encompass any and all such possibilities. Aspects of these other embodiments are further described hereinafter.

The arrangement in FIGS. 17-18 may also incorporate a delay mechanism, and also may include an wheel idler wheel and hall effect sensor arrangement described hereinafter, to send information to the controller module 106.7 to control the speed of the door opening, the length of travel for the door (angle to open to), to determine the delay for the closing (i.e., the desired time delay before actuating the linear motion device 107.2 to cause its piston to raise the wheel 105.1 permitting the door to begin closing).

It is noted that the openable door depicted in drawing FIGS. 5A, 5B and 6, showing a person opening the non-motorized version shown in FIGS. 1-12 herein, are analogous to where the foot operable door opener of new drawing FIGS. 13-18.

For example, an activator button or switch can be physically attached to the door opening pedal 101.1, so that pushing on the pedal 101.1 will activate the electronic control features of the embodiments shown in FIGS. 13-18.

It is further noted that while a person can contact a foot pedal with motor assist options controlled by a controller of FIGS. 13-18, it is contemplated that optionally the controller can be operated by a remote switch located elsewhere than on the foot operable foot pedal.

Therefore, it is also intended that the activation of this motor assist can be activated optionally by a person who lacks physical capacity to push down on the pedal 101.1, and may instead be activated by pushing a finger operable hardwired or remote activator button/switch, proximity device, facial recognition, a scanned key card, Bluetooth communications, security emergency and environmental systems, or some human or non-human interface (not shown) which communicates with the controller module 106.7 (or 206.7) for controlling the sequence of the door opening and closing.

The door opener device shown in FIGS. 13-18 can also be a hybrid arrangement, where some of the mechanical springs and other activators shown in FIGS. 1-12 can be replaced by one or more of the controller module and sensors associated with a motorized door assist so that the door opener can utilize some of the mechanical door opening features of FIGS. 1-12 in combination with some of the electronic controls and sensors of FIGS. 13-18.

The controller module 106.7 may perform many functions, including, but not limited to, doing power manipulation, as follows:

- For example, the controller module 106.7 may start the cycle when the pedal 101.1 is depressed to actuate the switch 106.71, with the controller starting the delay in actuation of the motor 102.9 and movement of the door D, permitting the person to step aside and not be stuck by the door.
  - The controller module 106.7 may also be configured to not let the door swing open, if the person pressing on the pedal 101.1 to toggle the switch 106.71 did not move aside, with the aid of a proximity sensor configured to detect a person or even other objects that may be in the pathway of the door being opened.
- The controller module 106.7 may control the extension of the linear motion device 107.2 which may cause the driving wheel 105.1 to drop downward and make contact with the floor/ground G. The controller module 106.7 may be able to sense the ground (directly or indirectly) and also apply a specific pressure by sensing the added current draw on the motor when it encounters the resistance of the ground plus the added spring tension of the traction spring 107.6.
- The controller module 106.7 may start the drive motor 102.9 thereby causing the main gear 104.1 to rotate, and may also control the speed of the motor 102.9 to start out slowly and to subsequently increase in speed as it goes through its cycle to move the door more quickly, and may also slow down at the end of the arc of the opening or closing of the door D.
  - If a sensor in the controller module 106.7 determines that an obstruction in the path of travel has been encountered, or if someone pushes on the other side of the door after the linear motion device 107.2 has engaged the wheel 105.1 to the ground, the controller module 106.7 will sense the increased current draw from the drive motor 102.9 and cause retraction of the linear motion device 107.2 and lifting of the drive wheel 105.1, and may also reset for the next cycle.
  - The distance of travel may be measured using an wheel idler and Hall Effect sensor arrangement.
    - The controller module 106.7 may be electronically coupled to a hall effect sensor 106.82 that is configured to co-act with a plurality of magnets 106.83 (e.g., eight magnets) that may be radially mounted and evenly spaced on the side of an idler wheel 106.84, configured to roll freely on the ground G, which wheel may be support by a bracket 106.81 that may be mounted to the shaft 104.31 and/or to the chassis 103.1.
    - The number of magnets 106.83 on the idler wheel 106.84 may be counted as the idler wheel rotates on the ground G during movement of the door D, so that if there are eight magnets, there may be approximately 1½ inches of travel between each of the eight magnets, i.e., the distance of travel may be determined according to the diameter of the idler wheel 106.84 used, the number of magnets 106.83 used, and the radial placement of the magnets on the idler wheel, which distance may be calculated by the controller module 106.7 using an algorithm associated with the use of these components.

This determination of travel of the door made by the controller module 106.7 allows for the adjustment and programming of the door opening to not hit walls or other permanent obstructions for a swing door (and with respect to the width of the opening when used on a sliding door arrangement), within each specific application to 1½" of arc, of the door movement depending on whether there are eight magnets or possibly more magnets.

The controller module 106.7 may also sense if the drive wheel 105.1 is slipping on ice or due to other field conditions it may encounter, allowing the motor to turn the drive wheel added rotations until the door has reached its designated opening distance to occupy a desired door open position (and in reverse to occupy the door closed position).

If the drive wheel 105.1 does not have sufficient traction and is spinning, after a designated amount of time the linear motion device 107.2 may lift the drive wheel and the system may reset.

If the drive wheel 105.1 is slipping due to slippery environmental conditions, the controller module 106.7 may cause the linear actuation device 107.2 to extend to increase the pressure between the wheel and the ground surface to adjust for the slippery environment.

When the door has reached the designated distance of travel to the desired door open position, the controller module 106.7 will stop the drive motor 102.9.

Once the door D has been moved into the desired door open position, and after a programed designated amount of time, the controller module 106.7 may cause the linear motion device 107.2 to cause lifting of the drive wheel 105.1 off of the ground G, allowing the door to close, or alternatively the controller module 106.7 may cause the motor to operate in reverse and drive the door back into the closed door position, and may thereafter lift the drive wheel 105.1 once the door is back into the closed position.

This closing sequence could also be interfaced with a proximity sensing device associated with the controller module 106.7, to detect obstructions in the pathway of the door D and not allow the door to close if some obstruction (e.g., a person or boxes) was blocking free movement of the door.

In environmental or security applications, the door might automatically open due to a command from the controller module 106.7 as a sensor may have detected an excessively elevated temperature (i.e., being above a threshold temperature setting) and/or another emergency situation (e.g., excessive moisture or humidity detected).

The drive wheel might be programmed to keep the door open in some situation of heavy traffic or other environmental concerns.

For a handicapped person the pushing of an ADA button or a personal remote control, key card, facial recognition, or motion sensor could start the cycle allowing this to be used within a public place, or institution, or someone's home.

A speaker/microphone can also be employed for voice commands from the entrant, or warning alarm or instructions from the door closer to stand clear of the swinging or sliding door travel or status updates such as for service requirements for equipment performance and wear or battery life remaining, etc.

An optical sensor, similar to a garage door sensor, may be added to confirm the door has closed fully and is back in its fully closed position, ready for the next cycle. This may be used to account for packages, people or other obstructions which might stop or otherwise prevent the door from closing fully. It can also be used to orient the door in the specific space so it does not hit walls or frame while swinging or sliding.

All of the delay and timing functions may be adjusted with a user interface cable, Bluetooth or wireless connection, with a phone, computer, or app.

The motors on the system may be powered by hardwired line voltage with a battery backup, or may be battery powered. Batteries can be charged by being removed like in a power drill, or with induction charging contact which proximity may be engaged and sufficient when the door is closed. This may be powered by a low Volt DC power supply (i.e., "low" volt being less than 50 volts), like a small charging cube for a cell phone, which may reduce the risk of shock from higher voltage DC and AC chargers.

Without limitation, the following are some of the terms to be incorporated into the language to cover different iterations of the parts of the motorized door opener:

- Various motor types usable with any of the herein disclosed door opening/closing systems may include, but are not limited to, the following types of motors:
  - servo
  - brushed
  - brushless
  - DC motors
  - geared DC motors
  - step motors
  - Variable speed
  - AC motors
  - Hub motors
- Various linear motion devices include, but are not limited to:
  - dashpots
  - spring assisted
  - hydraulic
  - pneumatic
  - Linear actuators
  - Linear column lifting or column lift
  - mechanical
    - with rack and pinion
    - with lead screw
- Various controllers and feedback systems can be used for internal communications, to added sensors, or environmental inputs and interfaces including, but is not limited to the following:
  - Variable delays
  - speed controlling devices
  - direction controlling devices
  - sequence and timing devices
  - pulse width modulation (PWM) devices

- micro controllers
- Over Drive devices for release of linear motion (lifting the drive wheel)
- Encoders
- Control timing devices
- Stopped or stuck door sensors
- Cycle length if a wheel is not engaging the door to be opened.
- Linear motion—traction release devices, to stop the door opening, if someone pushes the door from an opposite side
- The controller can be programmed with a cell phone or computer with plug in interface
- The controller can be programmed with a cell phone or computer with App interface
- The controller has preferably a remote control device for communications
- The controller has preferably a motion sensor to be used with the door opening
- RF (radio frequency) communication
- Bluetooth communication
- Microwave communication
- Wireless communication
- Wired communication.

Various sensors and switches associated with the controller may include, but are not limited to, the following:

- OK Over Drive release of linear motion
- Movement sensors and switches
- foot actuator sensors and switches
- Overdrive releases sensors and switches
- Hall sensors and switches
- Reid switches and sensors
- Proximity movement sensors and switches
- Idler sensors and switches
- Angle sensing sensors and switches
- Artificial Intelligence (AI) sensors and switches
- Micro switches and sensors
- Proximity sensors and switches
- Momentary sensors and switches
- Power switch and sensors
- Push button sensors and switches
- Optoelectronic sensors and switches
- Optical sensors and switches
- Facial recognition
- Infra-red sensors and switches
- Wheel idler sensor and switches
- RF (radio frequency) sensors.

Battery types and power interfaces may include, but are not limited to, the following:

- nickel cadmium battery
- lead acid battery
- lithium ion battery
- other new battery technology
- Tesla battery
- Hydrogen battery
- Drivers
- Transformers
- Voltage regulators
- Wireless inductive charging devices for batteries
- Line voltage with battery backup Other terms may also be utilized hereinafter, and which may be defined where described.

BRIEF DESCRIPTION OF DRAWINGS

The present invention can best be understood in connection with the accompanying drawings. It is noted that the invention is not limited to the precise embodiments shown in the following drawings.

FIG. 5A, FIG. 5B and FIG. 6 show details of the environment in which the foot operable door opener is utilized, wherein:

FIG. 5A shows a pedestrian approaching a door having a foot operable door opener, including a foot contactable pedal attached to a crank arm, whereby a housing encloses the internal components of the foot operable door opener;

FIG. 5B is a close-up detail view of the pedestrian's foot approaching the pedal 1.1 mounted upon crank arm, and the housing mounted on the ground "G" in the vicinity of door "D"; and FIG. 6 is a close-up detail view of the wordless instructional logo.

LIST OF REFERENCE NUMERALS USED

FIGS. 1-6

1.0 CRANK ASSEMBLY

Numeral Description

Figure 1:
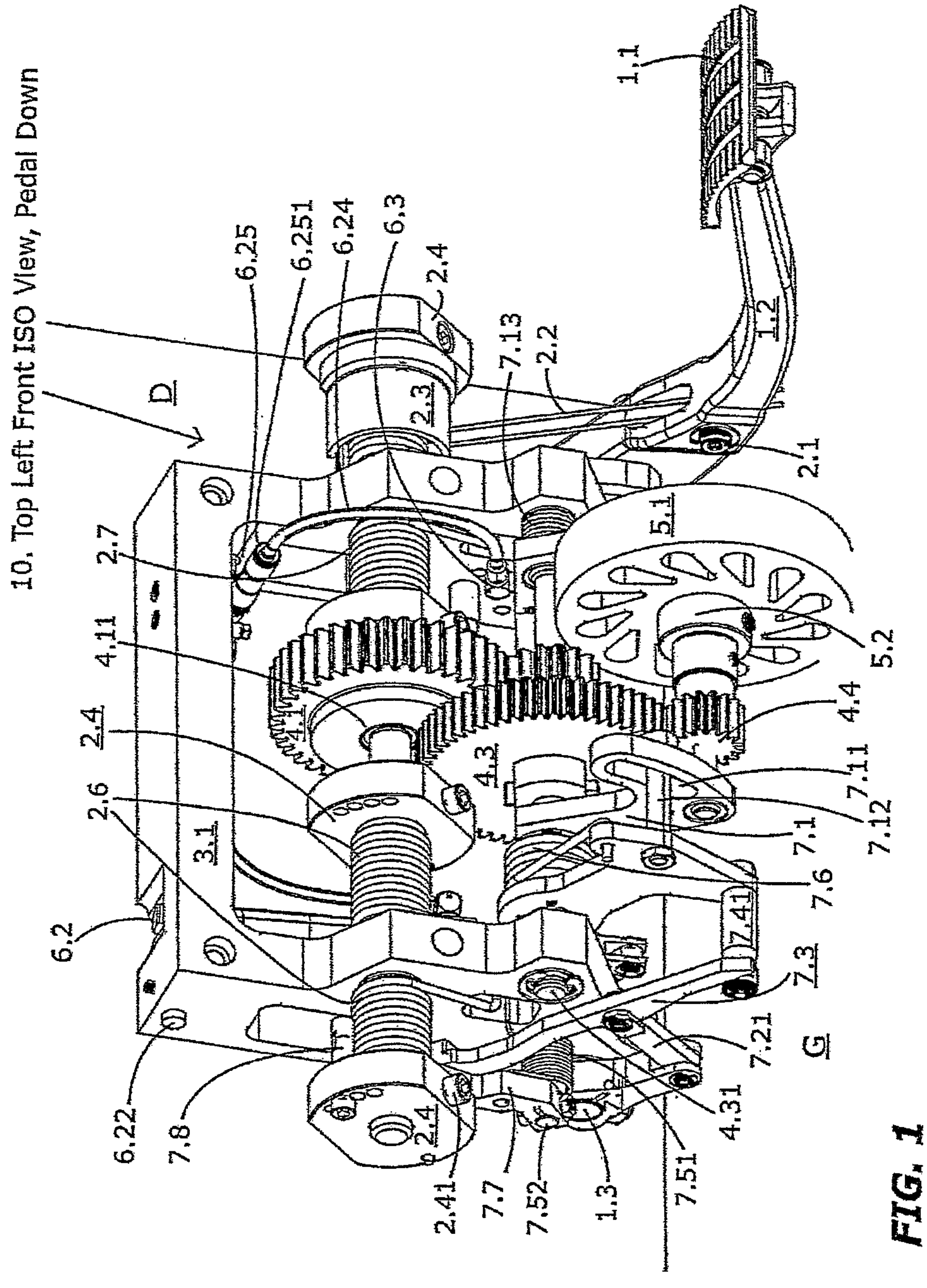
FIG. 1 is a top left front isometric view, shown with the foot pedal down.
Figure 2:
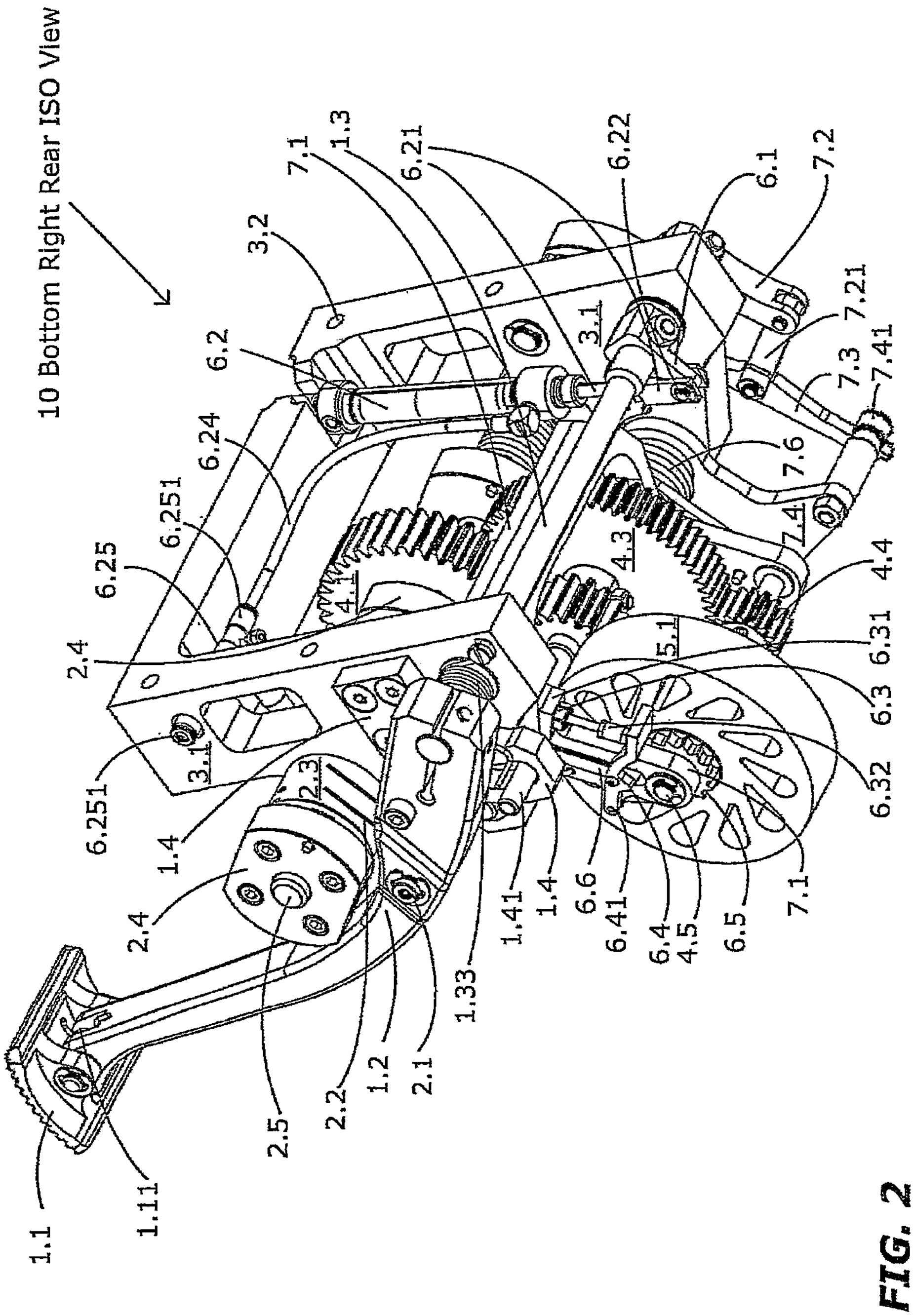
FIG. 2 is a bottom right rear isometric view, with the door and floor removed, and the pedal shown in an up position.
Figure 3:
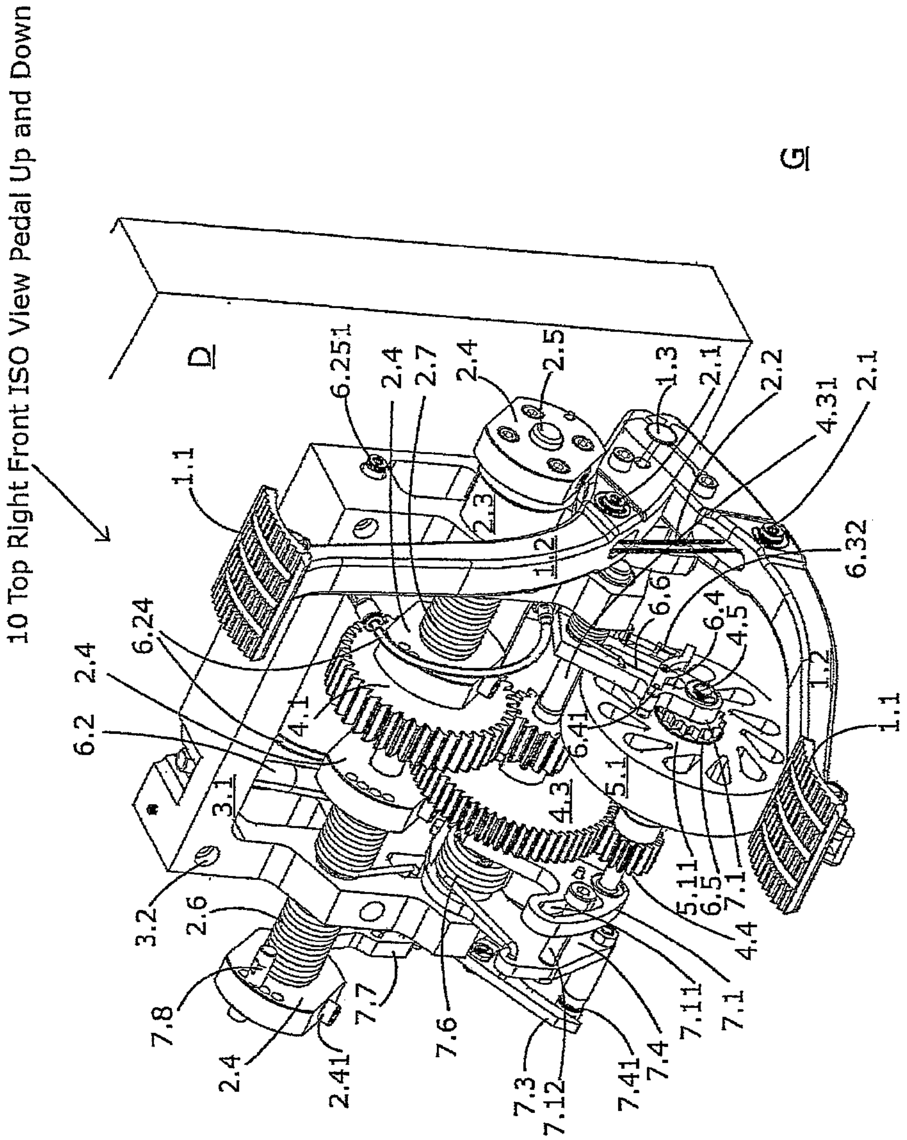
FIG. 3 is a top right front isometric view, shown with the foot pedal up and down.

1.0 Foot Activation
1.1 Pedal
1.11 Pedal spring
1.2 Crank arm
1.3 Crank shaft
1.31 Crank pin
1.32 Bushing
1.33 Arm return spring
1.331 Retaining screw
1.4 Arm guide bracket and stop
1.41 Guide pin
2.0 DRIVE ASSEMBLY Numeral Description

2.1 Cable termination pin
2.11 "e" clip ring
2.2 Transfer cable
2.3 Cable drum
2.4 Termination/tensioning hub
2.41 Tensioner locking screw
2.5 Transfer shaft
2.6 Main springs, right-handed
2.7 Main springs, left-handed
2.8 Tension locking screw
3.0 CHASSIS Numeral Description

3.1 Main chassis
3.2 Chassis mounting holes and screws
4.0 GEAR TRAIN Numeral Description

4.1 Main gear with clutch bearing
4.11 clutch bearing
4.2 Idler increasing gear
4.21 Idler shaft
4.3 Secondary speed increasing gear
4.31 Shaft
4.4 Drive gear
4.5 Drive shaft
4.51 Bushing
4.52 E clip
5.0 DRIVE WHEEL ASSEMBLY Numeral Description

5.1 Drive wheel
5.11 Drive wheel bearing
5.2 Wheel hub
6.0 DELAY ASSEMBLY Numeral Description

6.1 Spring-loaded Pneumatic cylinder compressing arm
6.11 Locking pin
6.2 Pneumatic double acting cylinder with spring return
6.21 Cylinder shaft and clevis
6.22 Clevis pin
6.23 E clip
6.24 Air line
6.25 Valve assembly
6.251 Check valve
6.252 Orifice restrictor
6.3 Single acting pin cylinder
6.31 Block
6.32 Plunger
6.4 Pawl
6.41 Hinge pin

6.5 Rachet wheel
6.6 Return spring
7.0 TRACTION/TENSION CARRIAGE ASSEMBLY Numeral Description

7.1 Fork assembly
7.11 Guide
7.12 Guide pin and stop
7.13 Fork assembly lifting spring
7.2 Actuating arm
7.21 Connecting link
7.3 Carriage depressing arm
7.31 Hinge pin
7.4 Tension arm
7.41 Tension arm roller
7.5 Traction locking pawl
7.51 Traction pawl spring
7.52 Pawl actuator shaft
7.6 Traction spring
7.7 Trigger lever
7.8 Trigger actuator pin
10 Safety Max door opener
12 Unit cover
13 Instructional signage graphic
D Door
G Ground

FIGS. 7-9

31.0 CRANK ASSEMBLY

Numeral Description

31.0 Foot activation
31.1 Pedal
31.2 Crank arm
31.3 Crank shaft
32.0 DRIVE ASSEMBLY Numeral Description

32.2 Transfer arm
32.3 Drive pawl
32.5 Transfer shaft
32.6 Main springs, right-handed
33.0 CHASSIS Numeral Description

33.1 Main chassis
33.2 Chaise mounting holes and screws
34.0 GEAR TRAIN Numeral Description

34.1 Main Gear
34.11 Clutch bearing
34.2 Idler increasing gear
34.21 Idler shaft
34.3 Secondary speed increasing gear
34.31 Shaft
34.4 Drive gear
34.5 Drive shaft
34.6 Transfer gears
35.0 DRIVE WHEEL ASSEMBLY Numeral Description

35.1 Drive wheel
36.0 DELAY ASSEMBLY
36.1 Friction plate and clutch assembly
37.0 TRACTION/TENSION CARRIAGE ASSEMBLY Numeral Description

37.1 Bracket arm
37.2 Actuating arm
37.21 Connecting arm
37.3 Carriage depressing arm
37.31 Hinge pin
37.4 Tension arm
37.41 Tension arm roller
37.6 Traction spring
37.8 Trigger actuator pin
310 Safety Max™ door opener

FIGS. 10-12

51.0 CRANK ASSEMBLY

Numeral Description

51.0 Foot activation
51.1 Pedal
51.2 Crank arm
51.3 Crank shaft
51.32 Bushing
51.33 Arm return spring
52.0 DRIVE ASSEMBLY
(Spring-loaded)

Numeral Description

52.6 Main springs, right-handed
52.7 Main springs, left-handed
53.0 CHASSIS Numeral Description

53.1 Main chaise
53.2 Chassis mounting holes and screws
54.0 GEAR TRAIN Numeral Description

54.1 Planetary gear assembly
54.11 Clutching bearing
54.5 Drive shaft
54.51 Bushing
55.0 DRIVE WHEEL ASSEMBLY Numeral Description

55.1 Drive wheel
56.0 DELAY ASSEMBLY
57.0 TRACTION/TENSION CARRIAGE ASSEMBLY Numeral Description

57.1 Bracket arm
57.11 Guide

57.12 Guide pin and stop
57.31 Hinge pin
57.5 Traction locking ratchet and hinge
57.6 Traction spring
57.7 Trigger lever
57.8 Wheel return lifting springs
100 Motor-Actuated Hands-Free Door Opening System
101.1 Pedal
101.2 Pedal Arm
102.9 Motor
102.91 Motor Bracket
102.93 Battery
103.1 Chassis
104.1 Main Gear
104.3 Speed Decreasing Gear
104.31 First Shaft
104.32 Second Shaft
104.4 Drive Gear
104.5 Speed Decreasing Gear
105.1 Drive Wheel
106.7 Controller Module
106.71 Switch
106.81 Bracket Supporting the Idler Wheel
106.82 Hall Sensor
106.83 Magnets on the Idler Wheel
106.84 Idler Wheel
106.85 Rubber O-Ring on Periphery of Idler Wheel
107.1 Bracket Arm (coupling link)
107.2 Linear Actuation Device
107.21 Motor
107.22 Linear Motion Bracket
107.6 Piston
107.7 Traction Spring
200 Motor-Actuated Hands-Free Door Opening System Using a Column Lifter for a Sliding Door
200' Motor Actuated Hands-Free Door Opening System Using a Column Lifter for a Pivoting Door
202.6 Wireless Charger
202.9 Drive Wheel and Hub Motor
202.91 Motor Bracket
202.93 Battery
203.1 Chassis Cover
203.2 Mounting Plate
203.2*w* Wireless Mounting Plate
205.1 Swivel Mechanism
206.7 Controller Module
206.71 Switch
206.71W Switch on Opposite Side of Door
206.8 Idler Wheel Sensor Assembly
206.82 Hall Sensor
206.83 Wheel with Magnets
206.831 Magnets
206.84 Spring Assembly
206.85 Sensors
206.85W Sensor on Opposite Side of Door
206.86 Speaker/Microphone
206.86W Speaker/Microphone on Opposite Side of Door
207.2 Lift Column
207.6 Traction Spring

DETAILED DESCRIPTION OF THE INVENTION

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic (e.g., a recitation of being "substantially straight"). A numerical difference provided by the approximating language may also correspond to a manufacturing tolerance associated with production of the aspect/feature being quantified/described (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculato-r.htm).

Any described use of a clearance fit indicates that the opening (e.g., a hole/recess) is larger than the part received therein (e.g., a shaft/protrusion), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org/~dclark/Reports/Encoder%20Upgrade/fittolerences%20%5BRead-Only%5D.pdf.

Any structures or methods described herein with respect to two elements being fixedly secured together means that any suitable joining technique known in the art may be used, including, but not limited to, using mechanical fasteners (e.g., rivets, screws, bolts & nuts, threaded inserts, etc.), adhesive, welding techniques (arc welding, friction welding, etc.), etc.

The present invention has broad applications to many technical fields for a variety of articles. For illustrative purposes only, a preferred mode for carrying out the invention is described herein, wherein a foot operable door opener is provided without an electrical assist.

In a first embodiment, shown in drawing FIGS. 1-6, the foot operable door opener of this invention has a pedal that is convenient for the user. Exposure to hand operable unsanitary hand operable door handles is minimized and for hands free door operation when moving through door portals when hands are occupied.

The current configuration of the first embodiment of the door opener is divided into seven distinct operational segments. The first segment is the crank assembly, 1.0. The cycle is initiated when the pedal 1.1 is depressed which moves the crank arm, 1.2, down transferring the torque to the crankshaft, 1.3. The crank arm returns back to the home position with the assistance of the return spring, 1.33.

The next segment is the drive assembly, 2.0. The drive assembly is connected to the crank arm with a set of steel cables, 2.2. The cables are wrapped around the drum, 2.3, when the pedal and crank arm are depressed, the cables, turn the drum, winding up the main springs, 2.6, 2.7. In the current configuration, the springs are both left-handed and right-handed, ganged up on the main shaft, 2.5, to generate the torque required to turn the wheel, 5.1 via gear train 4.0.

The chassis, 3.1, houses all the different mechanisms and bushings within the chassis. It also accommodates the means of securing the chassis with fasteners, such as screws or clamps, to the door.

The gear train, 4.0. has a speed increasing ratio of 1 to 10. The 60 degree turn on the crank arm, 1.2, will translate to 4.5 revolutions of the 4-inch wheel, 5.1. This is enough to open the door 25 to 30 inches. The main springs, 2.6, 2.7, drive the primary gear, 4.1, which has a one-way clutch bearing, 4.11, centered around the shaft, 2.5. This allows for the one-way travel of the gear with no backlash or backward movement. The large main gear is meshed with the small idler gear, 4.2, which is connected with gear, 4.3 via axle 4.31. The gear 4.3 is meshed with drive gear, 4.4. The drive gear 4.4 is mounted on the same shaft, 4.5, as the drive wheel, 5.1. The drive train transmits rotation of the transfer shaft 2.5 to driveshaft 4.5 with ratio 1:10 in the same rotational direction.

The drive wheel assembly, 5.0, consists of a drive wheel, such as, for example, a soft durometer wheel connected to the main driveshaft, 4.5, or a pneumatic main drive wheel, through a hub, 5.2. The energy stored in wound-up torsion springs 2.6 and 2.7 is transmitted via gear train to drive wheel 5.1. The drive wheel 5.1 is temporarily locked by delay system to allow a safe time delay, such as about 3 to 5 seconds, for the wheel 5.1 to start rotating.

The delay system, 6.0, holds and delays the release of the energy of the wound springs 2.6 and 2.7. This allows safe ergonomic transfer of one's weight to both feet. This unique feature enables one's weight to be planted back on the ground. This allows the entrant to comfortably step aside to clear the swinging door.

The delay assembly 6.0 consists of a double-acting pneumatic cylinder, with spring return, 6.2. The cylinder 6.2 is compressed by means of the main crankshaft, 1.3, when the pedal, 1.1 and crank arm, 1.2, are depressed. Cylinder, 6.2, through plastic tubes, 6.24 and check valves, 6.251, pressurizing the system to a single acting pin cylinder, 6.3, extending a plunger, 6.32. This plunger depresses a pawl, 6.4, which engages and locks a ratchet wheel, 6.5, which is directly connected to the main drive wheel 5.1. Air escapes from the compressed chamber of the single-acting pin cylinder, 6.2, through fixed orifice restrictor, 6.252, or needle valve, regulating the delay. As the pressure is released through the orifice, the spring-loaded plunger, 6.32, retracts releasing the pawl, 6.4, with the aid of a tension spring, 6.6, allowing the pawl 6.4, to release the ratchet, 6.5, on the main wheel, 5.1. This delay releases the stored energy of the wound-up torsion springs without losing any energy and frees rotation of the drive wheel 5.1.

The traction tension assembly, 7.0, is actuated when the main pedal crank arm, 1.2, is depressed. This rotates the crankshaft, 1.3, which is connected to the actuating arm, 7.2, which pulls down the carriage depressing arm, 7.3. through the connecting link, 7.21, The depressing arm, 7.3, pulls down the tension arm, 7.4, through tension arm roller, 7.41, which falls into a notch and is locked into place with the traction locking pawl, 7.5, assisted with traction pawl spring, 7.51, which maintains continuous light torque that keeps traction locking pawl in contact with round part of the tension arm 7.4. The depressing arm, 7.3, pulls down and engages the pre-loaded fork assembly, 7.1, through guide pin and stop 7.12. moving the drive wheel, 5.1 towards the ground. The traction spring, 7.6, keeps constant downward pressure and develops positive force to the ground to maintain traction throughout the one- and one-half inches of travel, 7.11. This is to accommodate: the undercut under a door, threshold, and any slope in the travel path of the opening door.

As the main springs, 2.6, 2.7, unwinds at the end of the cycle, an actuating pin 7.8 hits the trigger lever 7.7 and lifts the locking pawl 7.5 through pawl actuator shaft 7.52, releasing the fork assembly with the assistance of the fork assembly lifting spring, 7.13. This raises up the main drive wheel, 5.1, back to the resting position where it is ready for the next cycle.

Figure 4:
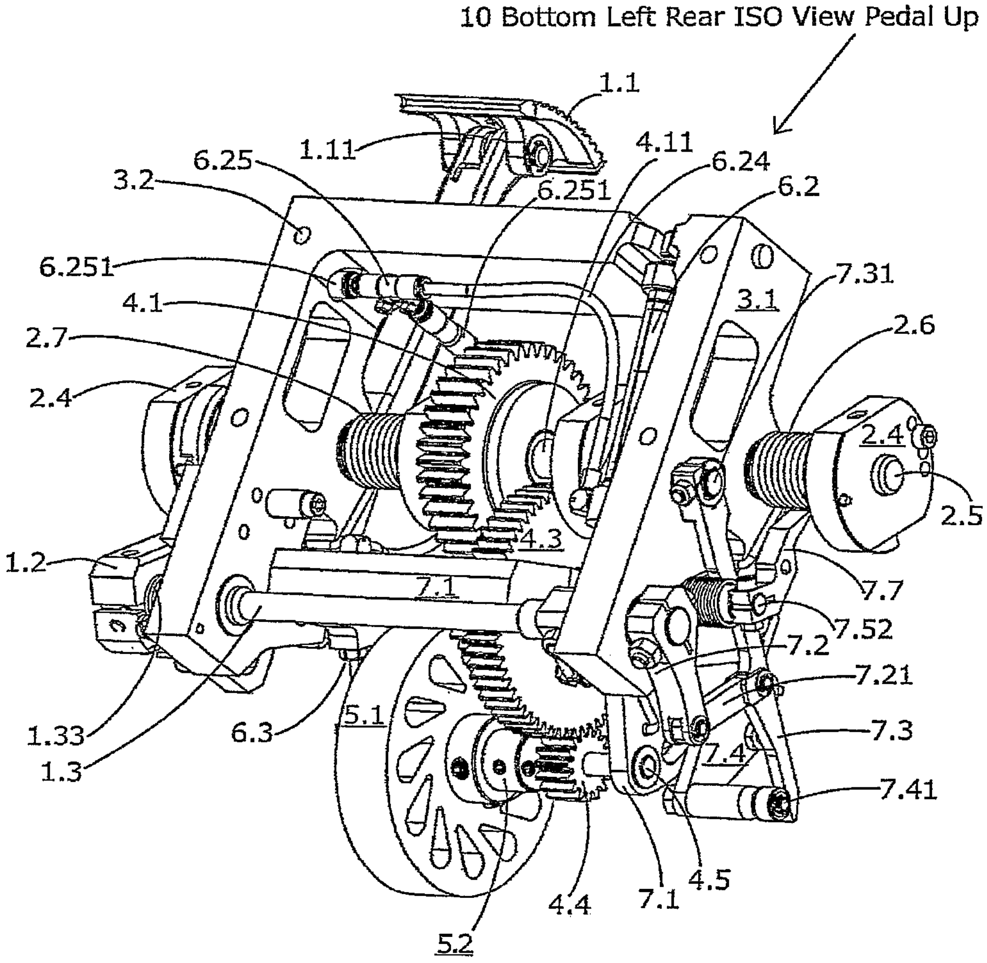
FIG. 4 is a bottom left, rear isometric view, shown with the door and floor removed, and the foot pedal in an up position.
Figure 4A:
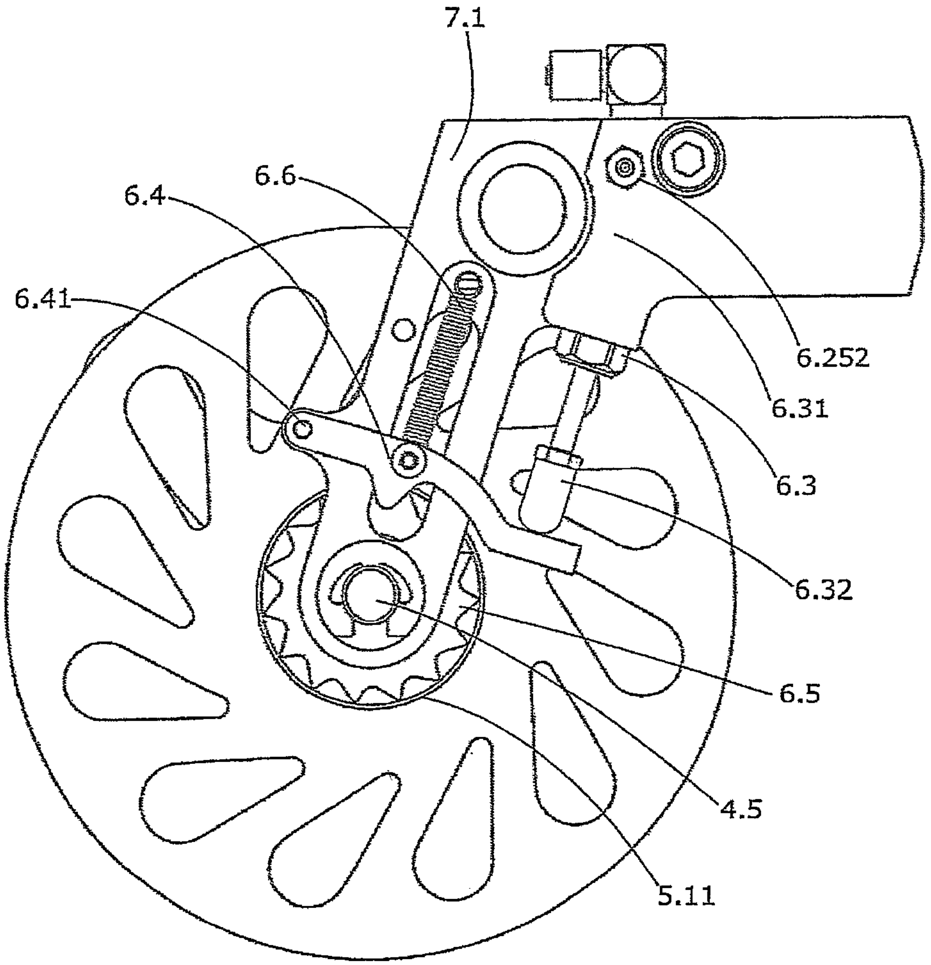
FIG. 4A is a detail section view of the main drive wheel, 5.1, delay system.
Figure 4B:
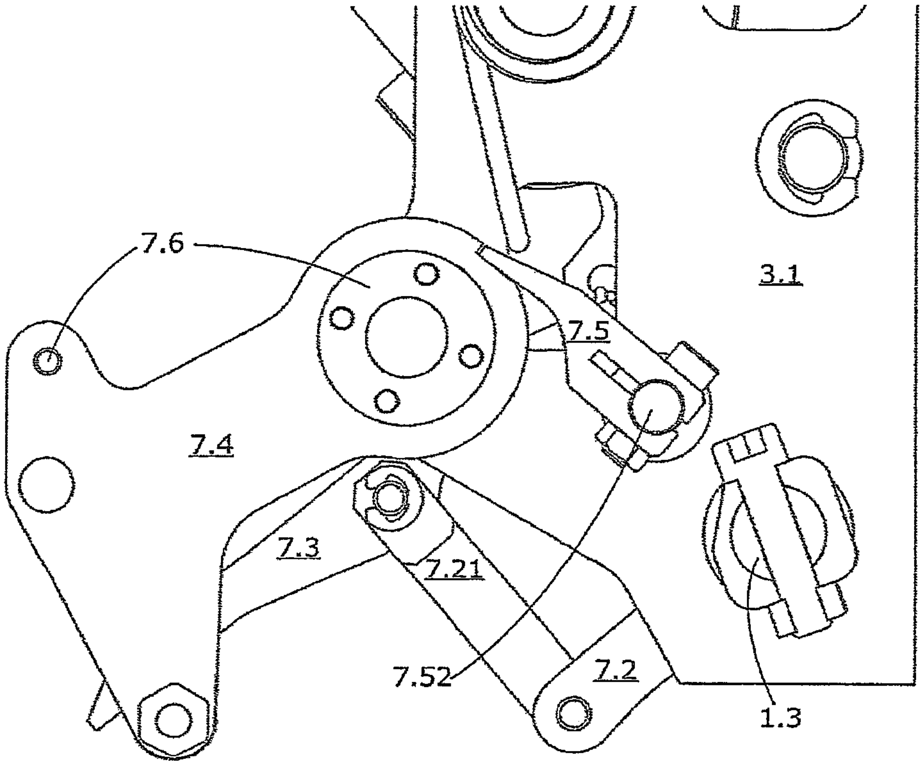
FIG. 4B is a detail section view of the traction carriage assembly.
Figure 4C:
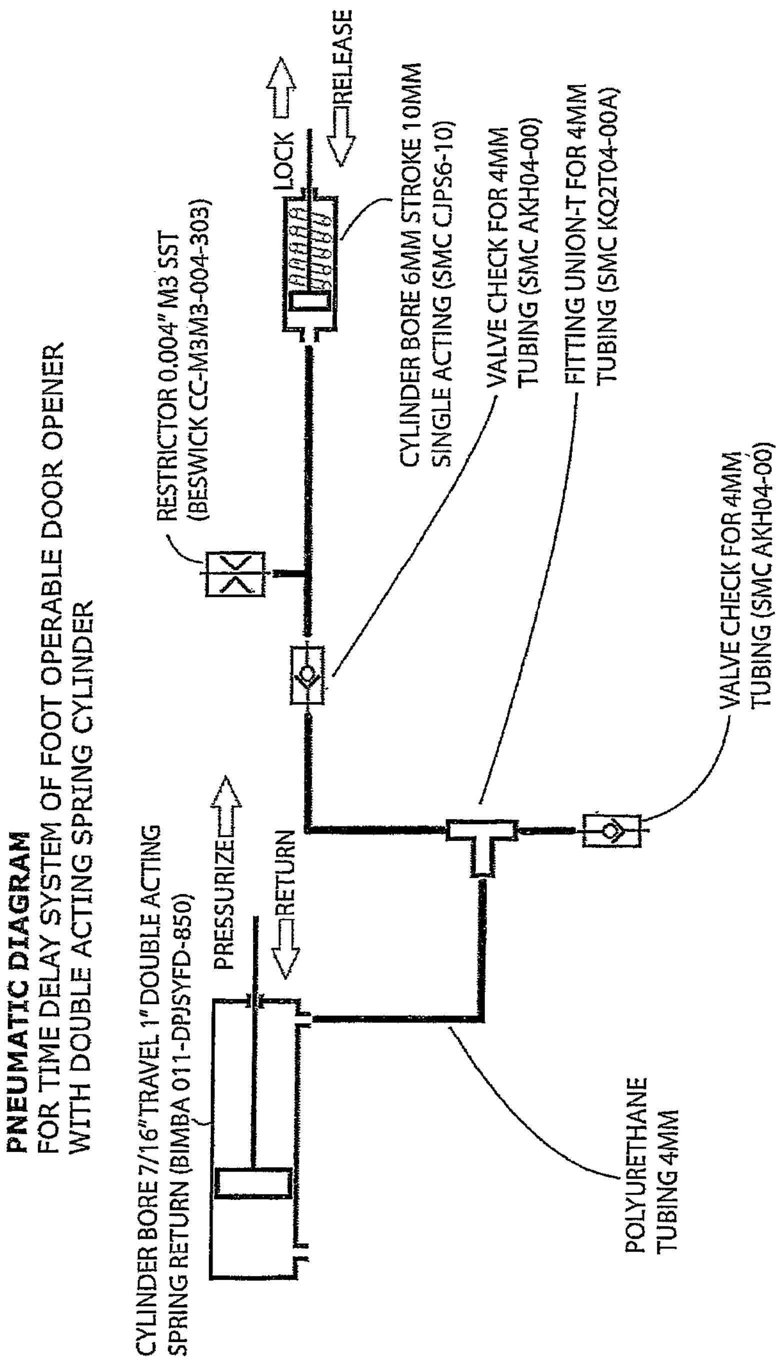
FIG. 4C is a diagrammatic block drawing of the pneumatic delay system.
Figure 4D:
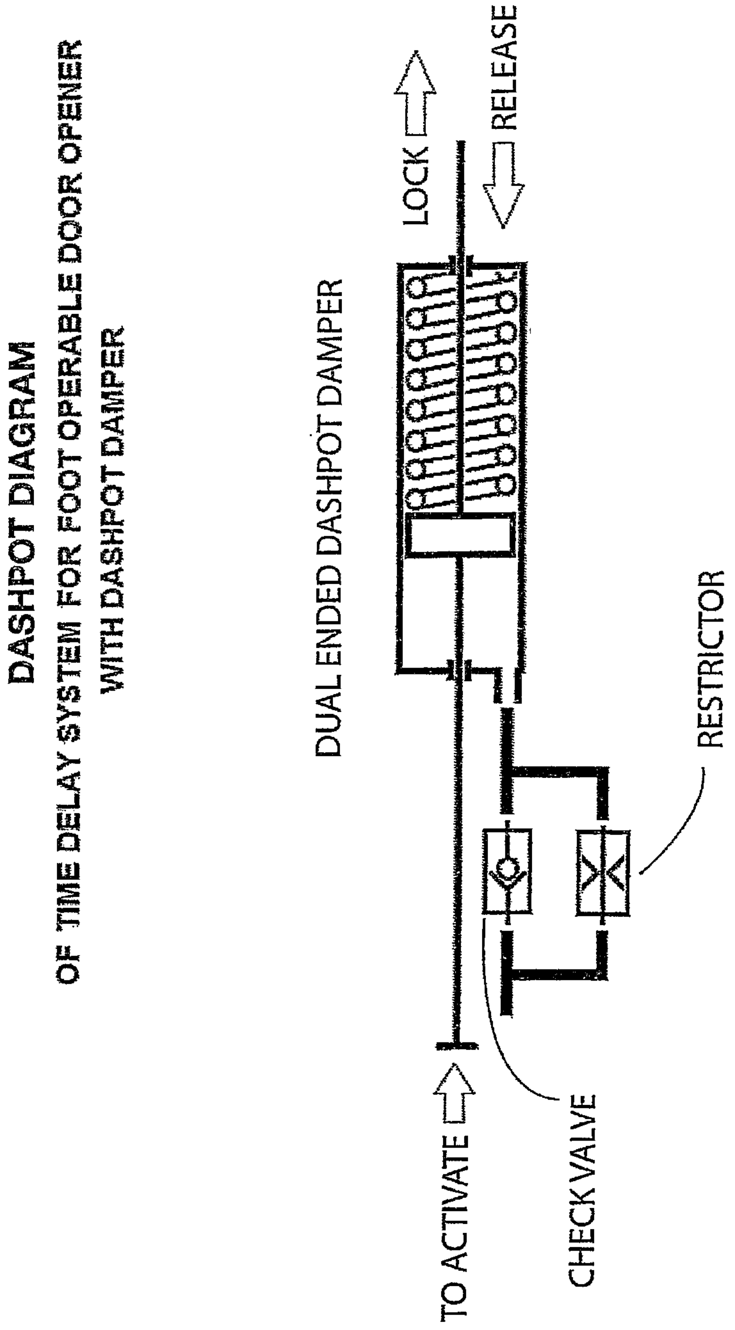
FIG. 4D is a diagrammatic block drawing of the dashpot delay system.
Figure 4E:
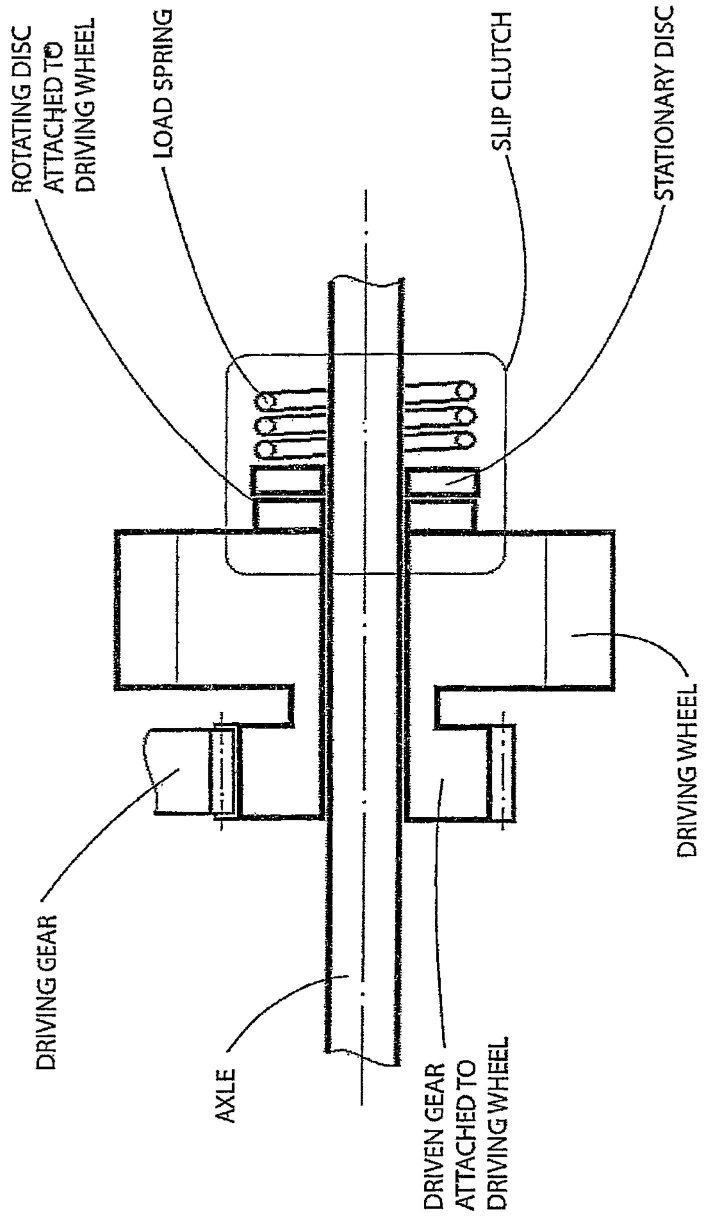
FIG. 4E is a diagrammatic block drawing of the slip clutch delay system.

FIGS. 4A, 4B, show section details of the mechanisms which are difficult to see in the isometric views. FIGS. 4C, 4D and 4E show optional systems with diagrammatic drawings.

FIG. 4A is a section close-up detail view of a wheel delay assembly. For example, as noted above, the delay assembly 6.0 consists of a double-acting pneumatic cylinder, with spring return, 6.2. The cylinder 6.2 is compressed by means of the main crankshaft, 1.3, when the pedal, 1.1 and crank arm, 1.2, are depressed. Cylinder, 6.2, through plastic tubes, 6.24 and check valves, 6.251, pressurizing the system to a single acting pin cylinder, 6.3, extending a plunger, 6.32. This plunger depresses a pawl, 6.4, which engages and locks a ratchet wheel, 6.5, which is directly connected to the main drive wheel 5.1. Air escapes from the compressed chamber of the single-acting pin cylinder, 6.2, through fixed orifice restrictor, 6.252, or needle valve, regulating the delay. As the pressure is released through the orifice, the spring-loaded plunger, 6.32, retracts releasing the pawl, 6.4, with the aid of a tension spring, 6.6, allowing the pawl 6.4, to release the ratchet, 6.5, on the main wheel, 5.1. This delay releases the stored energy of the wound-up torsion springs without losing any energy and frees rotation of the drive wheel 5.1.

FIG. 4B is a section close-up detail view of traction/tension carriage assembly. For example, as noted above, the traction tension assembly, 7.0, is actuated when the main pedal crank arm, 1.2, is depressed. This rotates the crankshaft, 1.3, which is connected to the actuating arm, 7.2, which pulls down the carriage depressing arm, 7.3. through the connecting link, 7.21, The depressing arm, 7.3, pulls down the tension arm, 7.4, through tension arm roller, 7.41, which falls into a notch and is locked into place with the traction locking pawl, 7.5, assisted with traction pawl spring, 7.51, which maintains continuous light torque that keeps traction locking pawl in contact with round part of the tension arm 7.4. The depressing arm, 7.3, pulls down and engages the pre-loaded fork assembly, 7.1, through guide pin and stop 7.12. moving the drive wheel, 5.1 towards the ground. The Traction spring, 7.6, keeps constant downward pressure and develops positive force to the ground to maintain traction throughout the one- and one-half inches of travel, 7.11. This is to accommodate: the undercut under a door, threshold, and any slope in the travel path of the opening door.

As the main springs, 2.6, 2.7, unwinds at the end of the cycle, an actuating pin 7.8 hits the trigger lever 7.7 and lifts the locking pawl 7.5 through pawl actuator shaft 7.52, releasing the fork assembly with the assistance of the fork assembly lifting spring, 7.13. This raises up the main drive wheel, 5.1, back to the resting position where it is ready for the next cycle.

FIG. 4C is a diagrammatic drawing of the optional pneumatic delay system. When the double acting cylinder is activated by the crank shaft 1.3, to pressurizes the system, with the aid of the check valves. The valves allow the pressure to build up in single acting pin cylinder, engaging the plunger. The second check valve in line from the primary cylinder maintains the seal and pressure at the pin cylinder. The orifice restrictor or needle valve relieves the pressure at a controlled rate which delays the release of the drive wheel. The first check valve in line relieves the pressure in the primary cylinder, so it has an unimpeded backstroke, so it is ready to charge the system with the next depression of the pedal.

This could also serve as a delay for the engagement of the traction release mechanism, 7.0, providing another delay option for holding the door open delaying the closing cycle with a fixed or variable time interval.

FIG. 4D is a diagrammatic drawing of an optional dashpot delay system. This mechanism can be used in conjunction with the pneumatic system in 4C or as a standalone system which is physically activated by mechanical means. The spring-loaded dashpot cylinder in conjunction with the restrictor or needle valve allows for the controlled release of the plunger equating into the time delay for the start of the drive wheel engagement.

This could also serve as a delay for the engagement of the traction release mechanism, 7.0, providing another delay option for holding the door open delaying the closing cycle with a fixed or variable time interval.

FIG. 4E is a diagrammatic drawing of a optional friction slip clutch delay system. A stationary fixed to the axle disc, engages a rotating disc, which is attached to the drive wheel. The two discs are allowed to slip a prescribed number of degrees until they mechanically engage and lock into each other. The time delay is adjusted by varying the tension applied to the load spring with a tensioning nut. This varies the duration of the slippage until the two surfaces mechanically engage.

This could also serve as a delay for the engagement of the traction release mechanism, providing another delay option for when the closing cycle would begin.

Figure 5A:
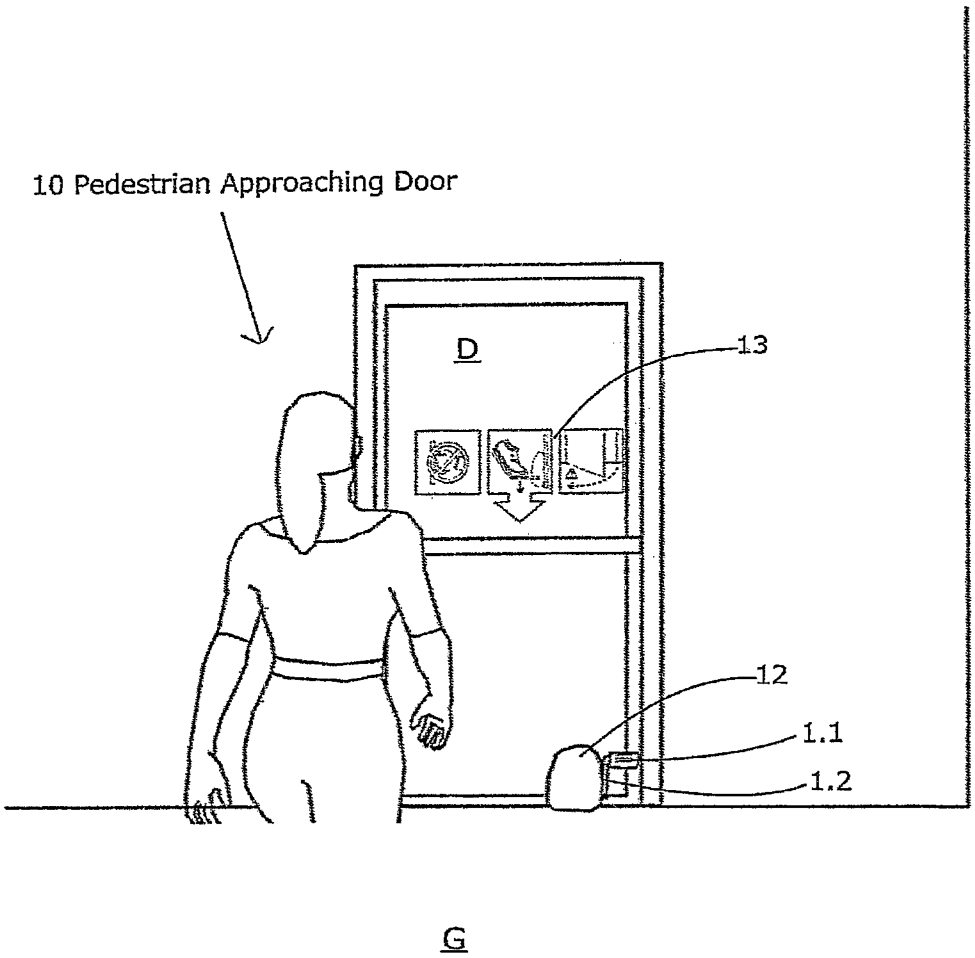
Figure 5B:
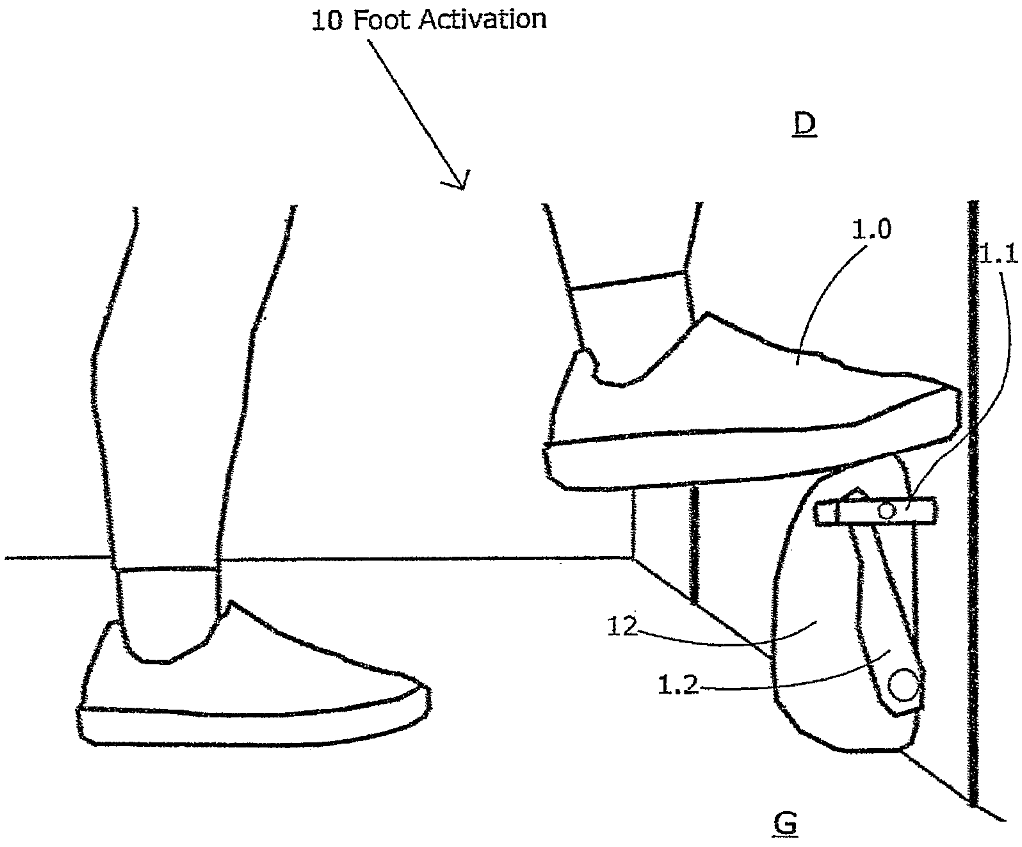
Figure 6:
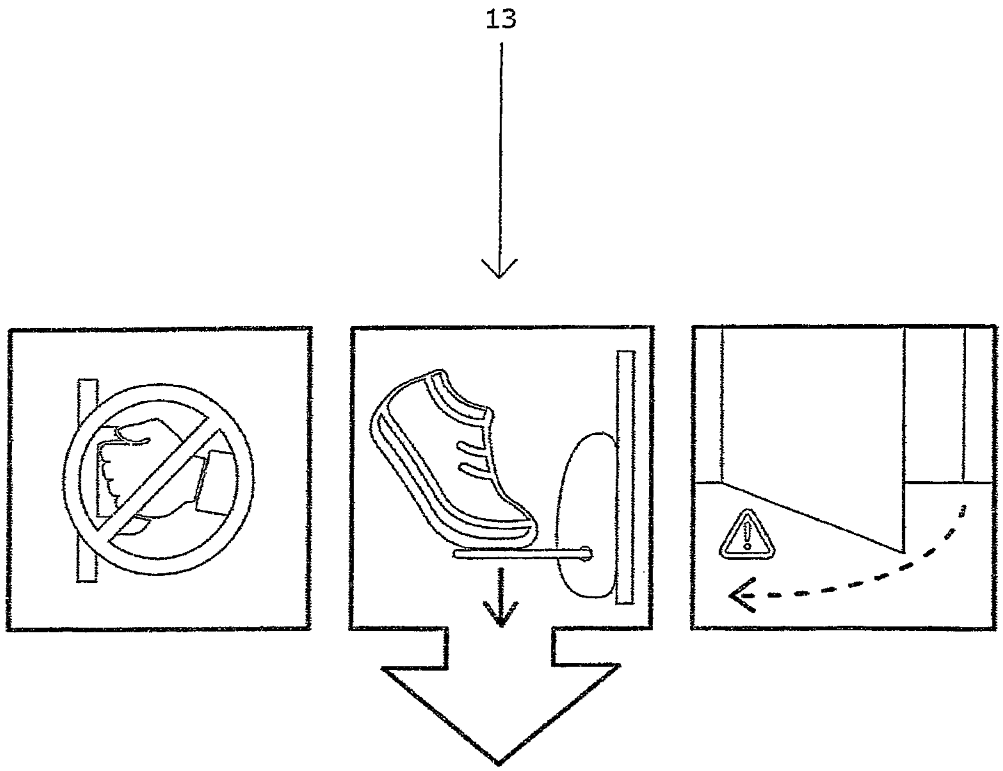

FIGS. 5A, 5B and 6 show details of the environment in which the foot operable door opener is utilized.

For example, FIG. 5A shows a pedestrian approaching a door "D" having a foot operable door opener 10, including s foot contactable pedal 1.1 attached to a crank arm 1.2, whereby a housing 12 encloses the internal components of the foot operable door opener 10. FIG. 5A also shows a wordless instructional logo 13 displayed upon the surface of the door or any suitable visually perceptible surface in the vicinity of the door. The logo preferably has a triptych of three images, including the diagonal "NO" sign through a picture of a user's hand holding a door handle, a close-up detail view of the pedestrian's foot contacting the pedal 1.1, and an image of the door shown being opened in the direction of the curved arrow depicted, noting caution to be exercised in the path of the swinging door.

FIG. 5B is a close-up detail view of the pedestrian's foot approaching the pedal 1.1 mounted upon crank arm 1.2, and the housing 12 mounted on the ground "G" in the vicinity of door "D".

FIG. 6, is a close-up detail view of the wordless instructional logo 13.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

Figure 7:
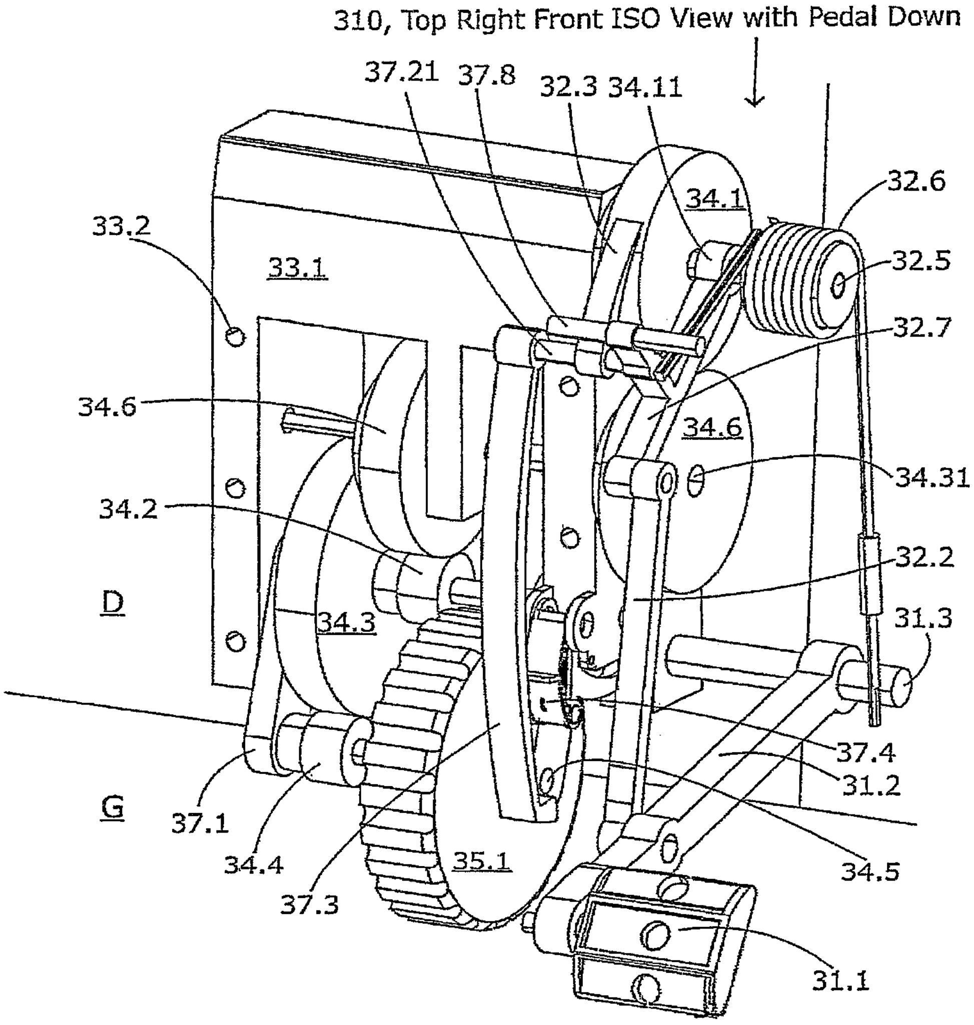
FIG. 7 is a top, right front isometric view of a second embodiment of the door opener, shown with the foot operable pedal in a down position.
Figure 8:
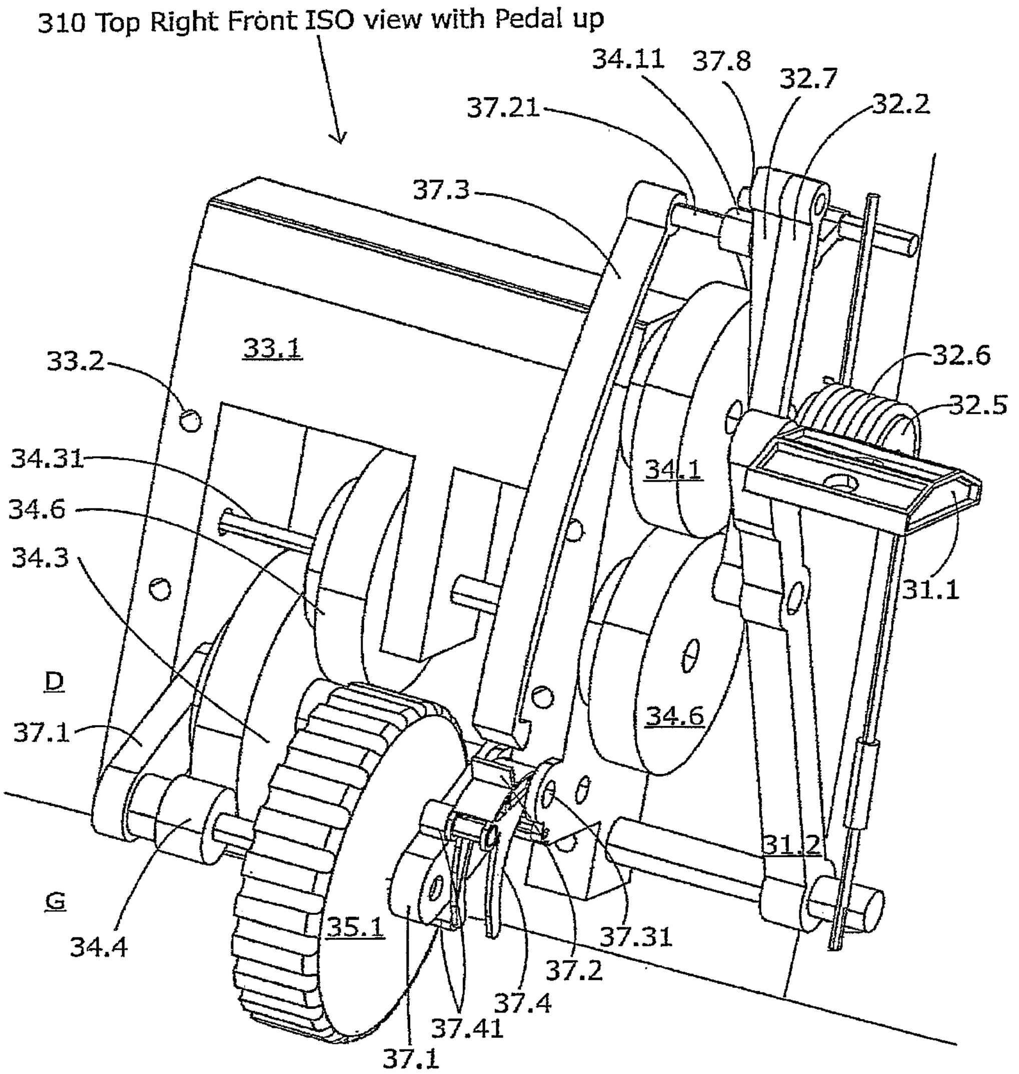
FIG. 8 is a top right front isometric view of the second embodiment of with the pedal up position.
Figure 9:
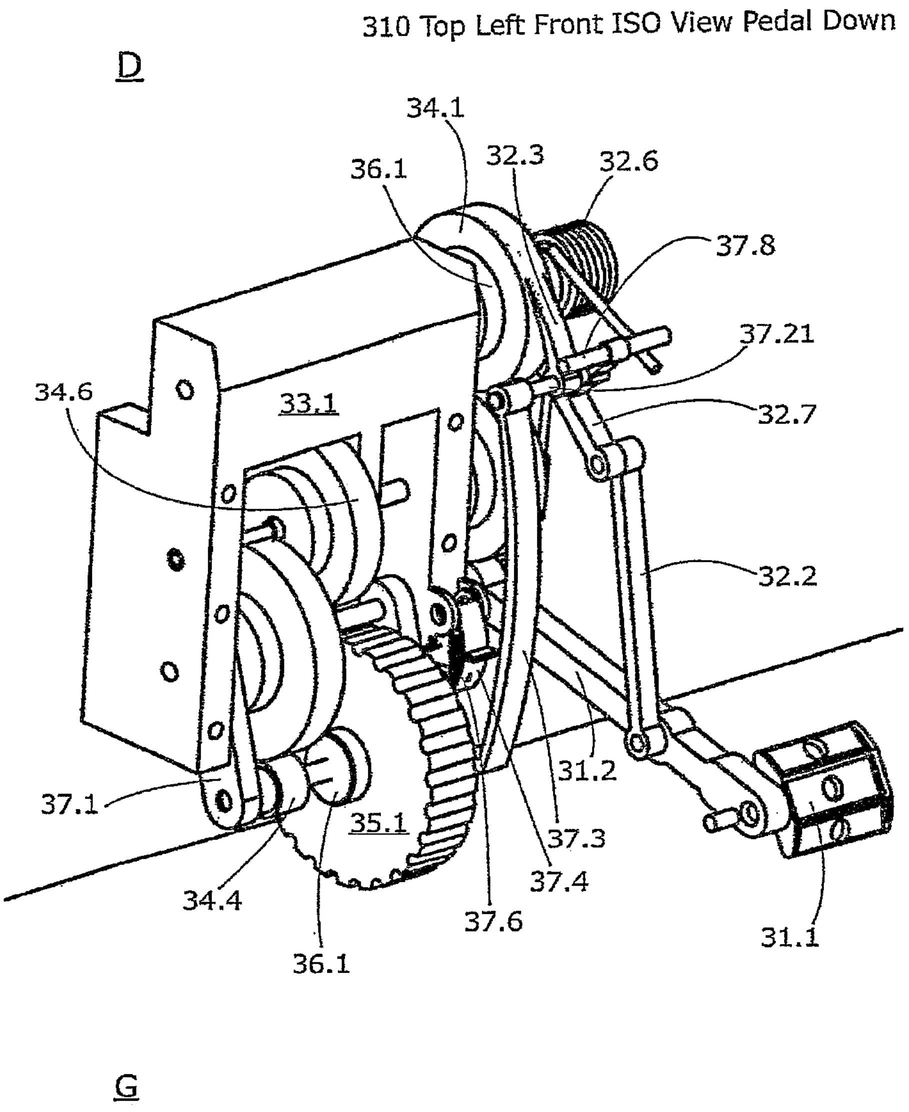
FIG. 9 is a top left front isometric view of the second embodiment of FIG. 7, shown with the pedal down, but with a delay slip clutch assembly to allow a user time to step away from an opening door.

In a second embodiment, as shown in FIGS. 7-9 the current configuration of the door opener is divided into seven distinct operations. The first operation is the crank assembly, 31.0. The cycle is initiated when the pedal, 31.1 is depressed which moves the crank arm, 31.2, down transferring the force to the crankshaft, 31.3. The crank arm returns back to the home position over the course of the opening cycle, with the assistance of the main spring, 32.6, through the trigger actuator pin, 37.8. The crank arm, 31.2, is connected to the driver arm, 32.7, through the connecting link, 32.2.

The next operation is the drive assembly, 32.0. The drive assembly is connected to the main spring, 32.6, when the pedal and crank arm are depressed, the main spring winds up and turns the main gear, 34.1, through the transfer shaft, 32.5, which has a clutch bearing, 34.11, centered around the shaft, 32.5. This allows for the one-way travel of the gear with no backlash or backward movement. The main gear is held in place and not allowed to unwind the main spring by the drive pawl, 32.3, which is depressed and set by the connecting link, 32.2. Winding the main spring, 32.6, The chassis, 33.1, houses all the different mechanisms and bushings within the chassis. It also accommodates the means of securing the mechanize with screws or clamps to the door.

The gear train, 34.0. has a speed increasing ratio of 1 to 10. This is so a 60-90 degree turn on the crank arm, 31.2, will net 2½ to 3 full revolutions of the 04-inch wheel, 35.1. This is enough to open the door 25 to 30 inches. The main Spring, 32.6, drive the main gear, 34.1, and meshes with the transfer gears, 34.6. The large transfer gears steps down to the small idler gear, 34.2, which again steps up to the secondary speed increasing gear, 34.3, and eventually to the drive gear, 34.4. The drive gear is mounted on the same shaft, 34.5, as the drive wheel, 35.1.

The drive wheel assembly, 35.0, consists of a soft durometer wheel connected to the main driveshaft, 34.5, connected to the drive shaft. The potential energy of the springs, 32.6, are wound with the depression of the pedal, 31.1 and the crank arm, 31.2, connected to the driver arm, 32.7 through the connecting link, 32.2, which winds the spring, 32.6. The potential energy is held back, momentarily, not allowed to release.

The delay assembly, 36.0, holds and delays the release of the potential energy of the wound springs. This allows safe ergonomic transfer of one's weight to both feet. This unique feature enables one's weight to be planted back on the ground. This allows the entrant to comfortably step aside to clear the swinging door.

The delay assembly consists of spring-loaded pneumatic cylinder, (not shown). The cylinder is compressed by means of the main crankshaft, when the pedal and crank arm, is depressed. Cylinder, with the aid of hoses, and check valves, moves air to the piston of a single action pin cylinder, and plunger. This plunger depresses a pawl, which engages a ratcheting wheel, which is directly connected to the main drive wheel. Air escapes from the compressed chamber, adjusted with a needle valve, regulating the delay. As the pressure is released, the plunger, disengages with the aid of a tension spring, allowing the pawl, to release the ratchet, on the main wheel.

Alternately the method includes the use of a spring-loaded dash pot with plunger to be used in leu of the single acting pin cylinder. This would be mechanically activated. This would eliminate the need for the pneumatic cylinder, hoses, and check valves. This delay releases the stored potential from the main springs and starts the cycle of the wheel turning without losing any potential energy.

Alternately the method includes a friction clutch plate, 36.1, to restrain said drive wheel, 35.1, or main gear, 34.1, for a fixed or variable length of time, as shown in FIG. 4E.

The traction tension assembly, 37.0, regulates adhesive, slippage or coefficient of friction of the various components on surfaces upon which they move. It is actuated when the main pedal crank arm, 31.2, is depressed. This rotates and drops the connecting arm, 37.21, which in turn drops the carriage depressing arm, 37.3. The depressing arm actuates bracket arm, 37.1 by engaging the actuating arm, 37.2, it engages the traction spring, 37.6. This keeps constant variable pressure on the bracket arm, 37.1, so there is constant pressure on the sloping floor.

As the drive pawl, 32.3, rotates along with the main gear, 34.1, the peddle, 31.1, transfer arm, 32.2, and connecting arm, 37.21, all lift the carriage depressing arm, 37.3. This in turn causes the depressing arm to lift the bracket arm, 37.1 by engaging the actuating arm, 37.2, which in turn engages the traction spring, 37.6, lifting the bracket arm, 37.1, and retracting the wheel, 35.1, so door, D, can now swing freely, back to the closed position with aid of the overhead of floor mounted, or spring-loaded hinges. This allows the door to close without human assistance.

Figure 10:
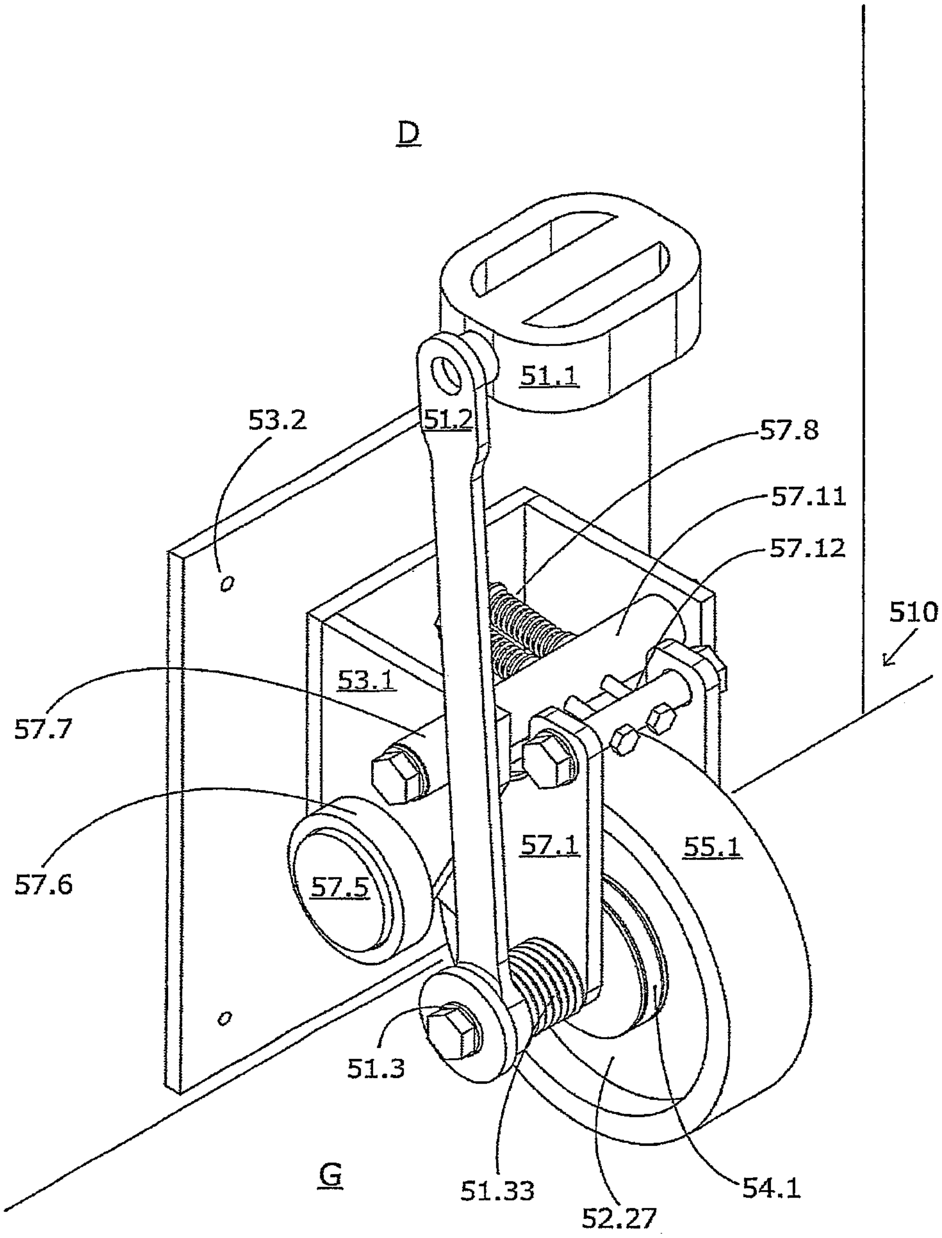
FIG. 10 is a left side isometric view of a third embodiment for a foot operable door opener, shown with the pedal in an up position.
Figure 11:
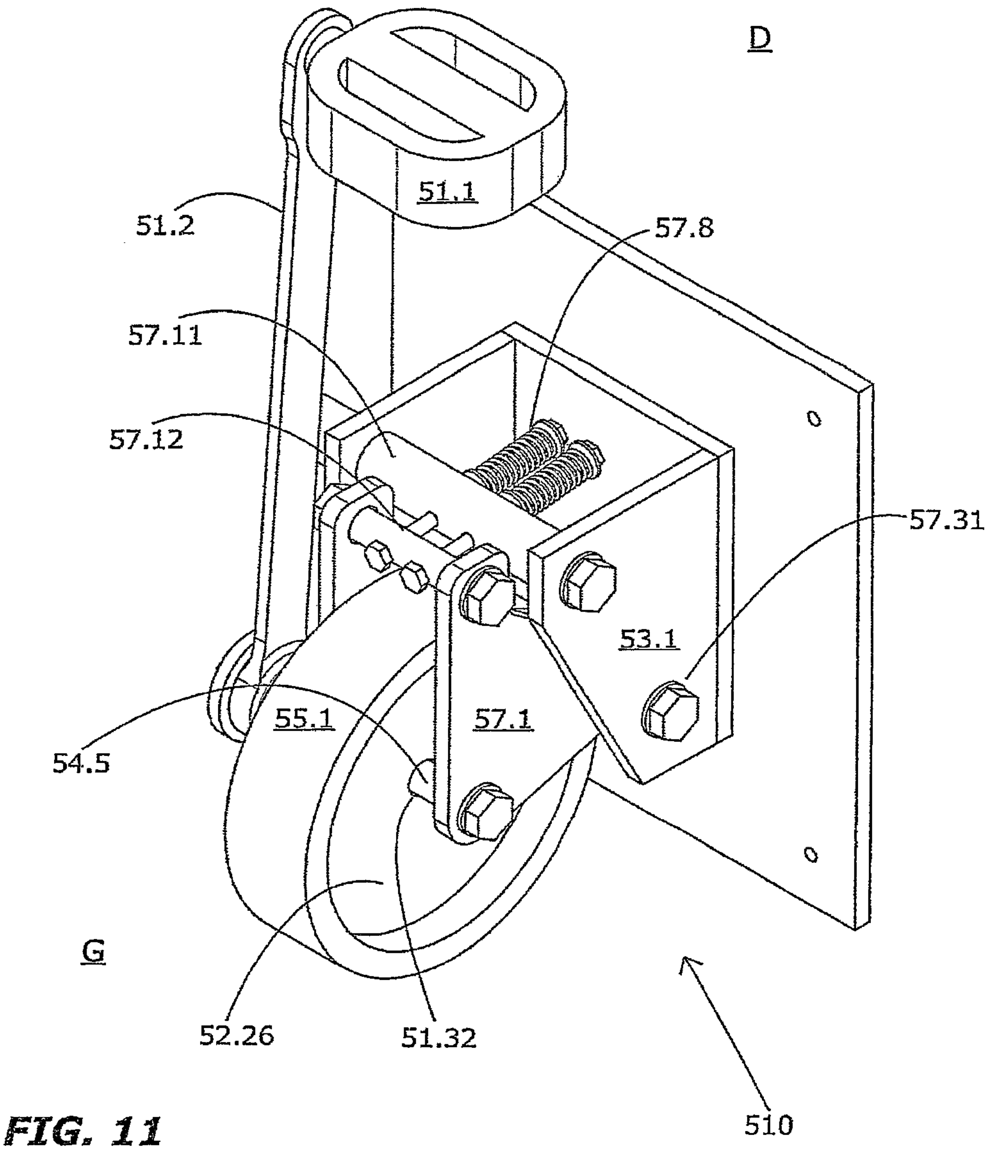
FIG. 11 is a right-side isometric view of the third embodiment for a foot operable door opener, shown with the pedal in an up position.
Figure 12:
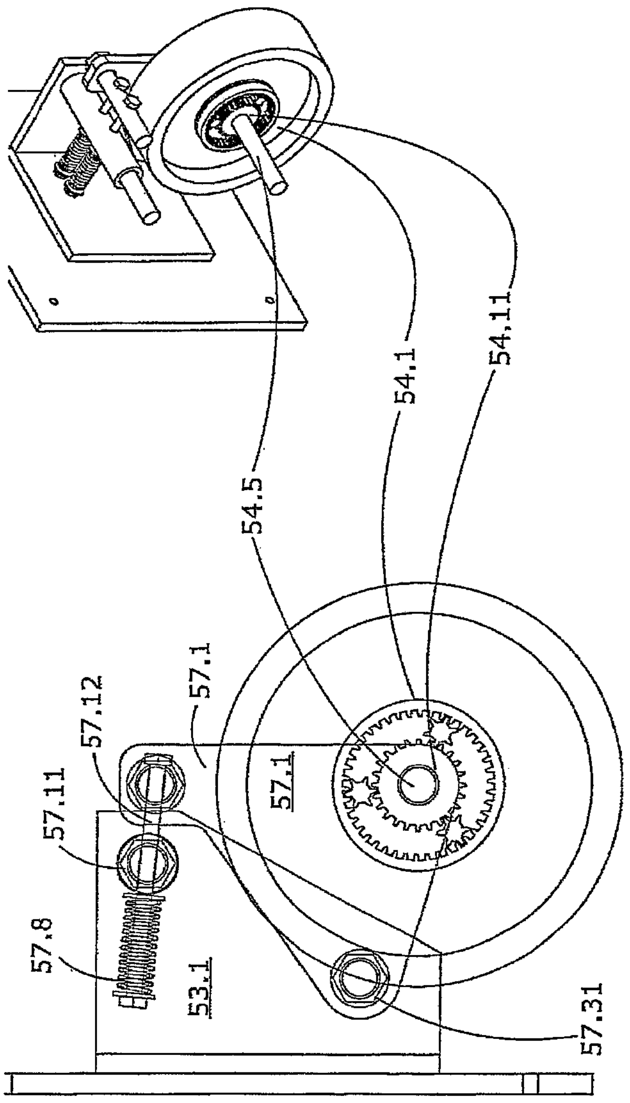
FIG. 12 is an exploded detail view of a planetary gear associated with the third embodiment.

In a third embodiment shown in FIGS. 10-12, a non-motorized foot operable door opener is initiated in an entrance cycle by the user stepping on a pedal, 51.1. This force exerted on the pedal 51.1, drives the crank arm, 51.2, a sixty to ninety (60-90) degree turn, engaging a soft wheel, 55.1, to open the door D. The pedal, 51.1, is hard linked to a crank arm, 51.2, which goes into a unidirectional clutch bearing, 54.11, connected to a planetary gear box, 54.1, connected to drive shaft hub, 54.5, to turn the soft wheel, 55.1. The downward pressure from the pedal, 51.1, pivots the bracket arm, 57.1, at a traction locking ratchet, 57.5, and hinge, 57.31, connected to the main chassis, 53.1, is a spring-loaded wheel assembly, 57.6, to keep constant pressure to the ground, G.

A speed increasing planetary gear box, 54.1, winds one or more springs, 52.27 and 52.26, (right and left-handed) which may work optionally if the sequence is reversed and goes from crank arm to gears, to winding springs, or also optionally multiple pumps of the pedal, turns the wheel system, which each are connected to drive shaft, 54.5, in turn rotating the wheel, 51.1, over multiple 360 degrees rotations, and thereby opening the door, D, sufficiently to allow the entrant to pass until the foot pedal, 51.1, is dis-engaged by the entrant. The crank arm, 51.2, is returned to its original position, with the aid of the return arm spring, 51.33. This action causes the crank arm, 51.2, to strike the trigger lever release, 57.7, which in turn releases the ratcheting hinge mechanism and spring, 57.5, and 57.6, allowing the wheel return lifting springs, 57.8, to lift the wheel assembly to rotate up, back to its original up position, guided by the guide pin and stop, 57.11, and 57.12, releasing the wheel, 55.1, from the ground, thus allowing the door to close with a standard overhead closer or spring-loaded hinge, which is standard hardware on most doors. At that time after the opening and closing of the door, the door is ready for the next entrant.

The embodiment of FIGS. 10-12 may include an optional, main spring, or springs, 52.27, and 52.26, both right and left-handed, which can be wound for a further assist to accommodate a delayed action, 56.0, where, at that point, a foot switch actuated spring-loaded wheel drops and engages an opening cycle as described above. The door which, after actuation, will close after a time delay, 56.0, on the retracting spring mechanism, also described above. Both opening and closing are by mechanical advantage, without the use of electric power or motors.

In general, in all three embodiments of FIGS. 1-6, 7-9 and 10-12, the present invention is differentiated, unique, novel, and distinguishable from any motorized prior art door openers, by its' being a simple machine without electric power, electric motors, scanner or traffic readers of any kind, and through mechanical advantage and a rachet, spring loaded hinge assembly, to keep constant pressure to the floor plane, hygienically opening doors when safety from disease, virus, bacteria, or other hazards which are wished to be avoided and hands free operation when ones hands are occupied such as food service and warehouse personnel, by the use of an economical apparatus that can be added/or retro fit to any door type, through brackets or the chassis mounting holes, or clamping plate, to secure to wood, hollow metal, metal framed glass, all glass, etc. doors, to facilitate ingress and egress passages of all types, locations, and environments.

In general, in all three embodiments of FIGS. 1-6, 7-9 and 10-12, the present invention is differentiated, unique, novel, and distinguishable from any non-motorized prior art door openers, by its' being a simple machine that can develop the mechanical advantage necessary to open exterior and other doors safely, hands free with integrated delay, to afford using an ergonomically user friendly and safe interface when paired with doors which have standard resistance due to the presence of overhead, floor closers, and spring hinges.

It is further noted that while FIGS. 4A, 4B, 4C, 5A, 5B and 6 are shown in conjunction with the preferred embodiment of FIGS. 1-4, it is known that FIGS. 4A, 4B, 4C, 5A, 5B and 6 can also be used with the alternate embodiments of FIGS. 7-9 and 10-12.

A second embodiment shown in drawing FIGS. 7, 8 and 9 describes a non-preferred embodiment with a friction slip clutch delay assembly and where the gear train includes a main gear, an idler increasing gear and a secondary gear.

A third embodiment shown in drawing FIGS. 10, 11 and 12 describes another non-preferred embodiment, optionally without a delay assembly, and where the gear train is a planetary gear assembly.

Motorized and/or Motor Assist Embodiments

Figure 13:
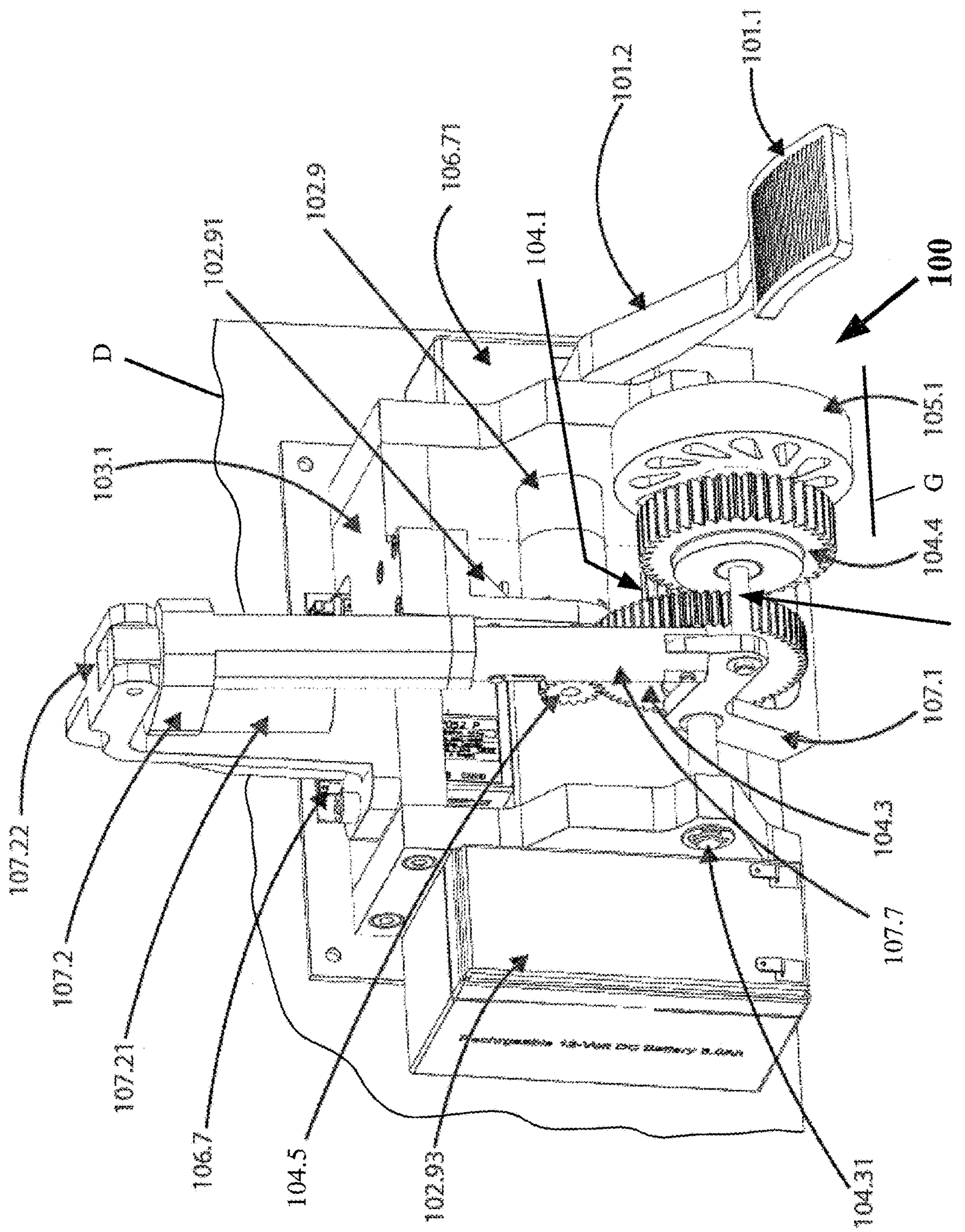
FIG. 13 is a top left isometric view of a fourth embodiment of a door opening and closing system, which uses a motor, along with a speed decreasing, power increasing gear ratio allowing for a low torque higher speed motor, and in which the positions of the external battery and activation switch can be reversed, making this door opening/closing system right-handed or left-handed in orientation.
Figure 14:
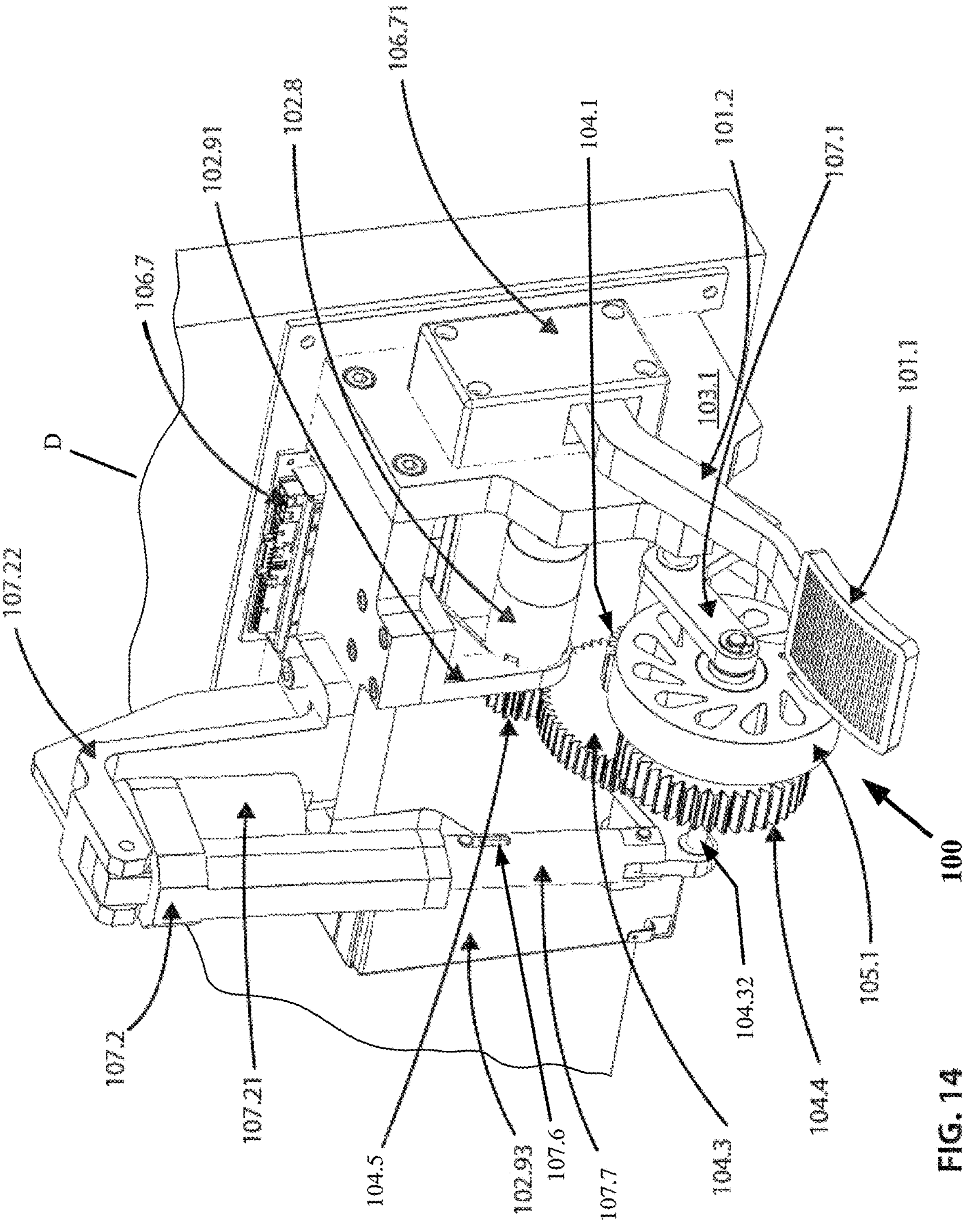
FIG. 14 is a top right isometric view of the embodiment shown in FIG. 13.
Figure 15:
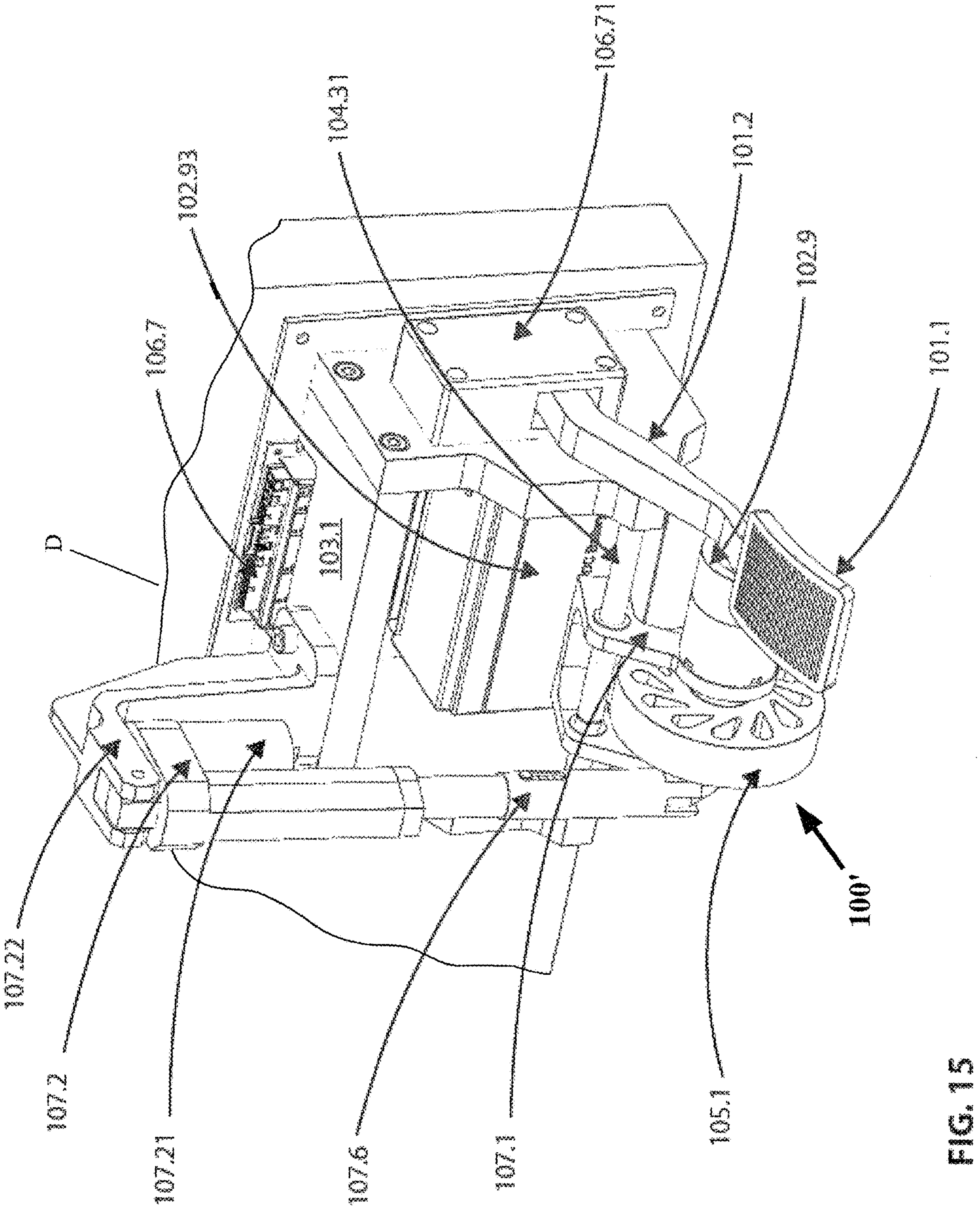
FIG. 15 is a top right isometric view of a fifth embodiment of a door opening and closing system, which uses a motor and a direct drive, such as a hub motor, which may require a higher torque, lower speed motor, but requires the least number of moving parts.
Figure 16:
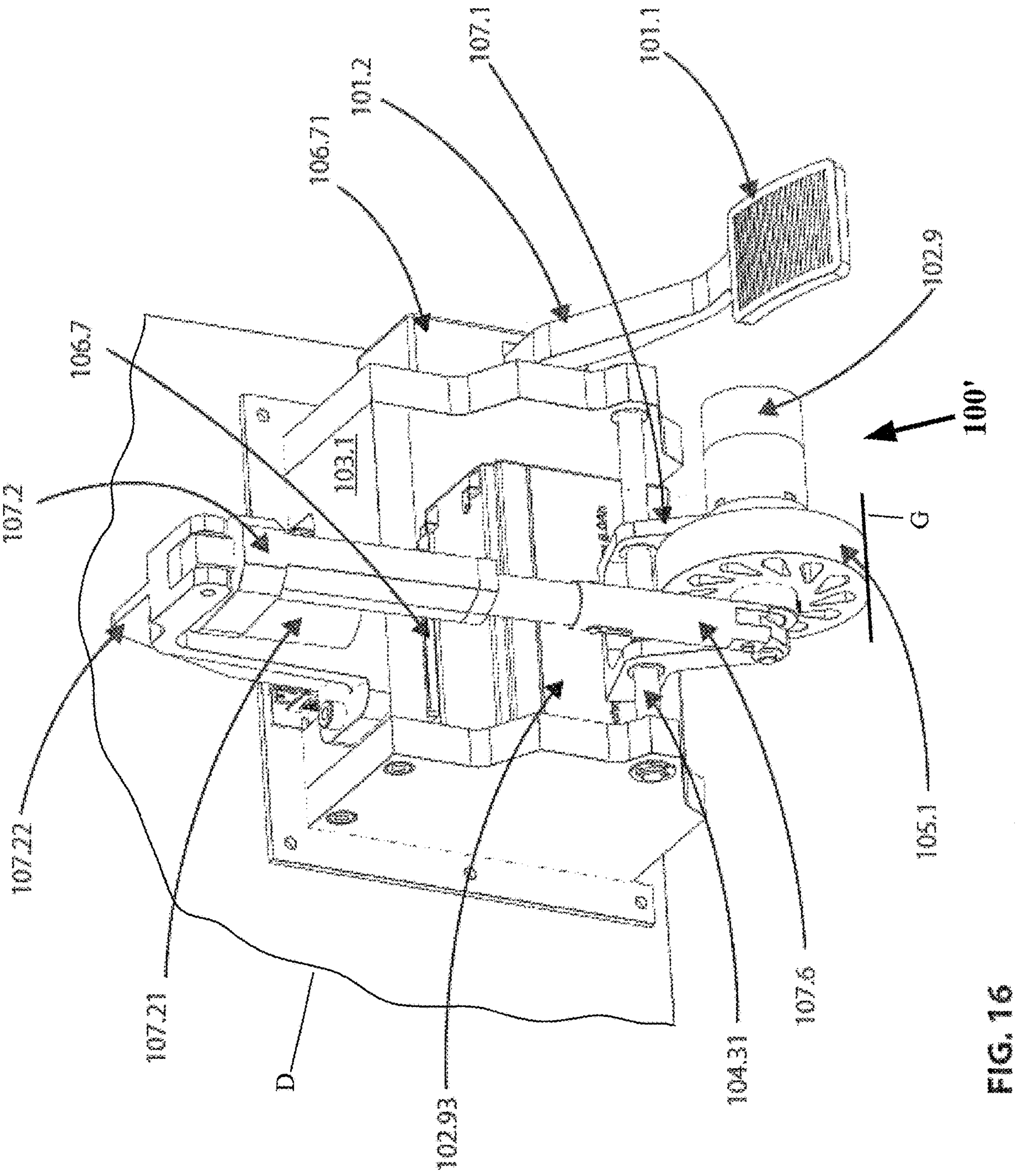
FIG. 16 is a top left isometric view of the embodiment shown in FIG. 15.
Figure 17:
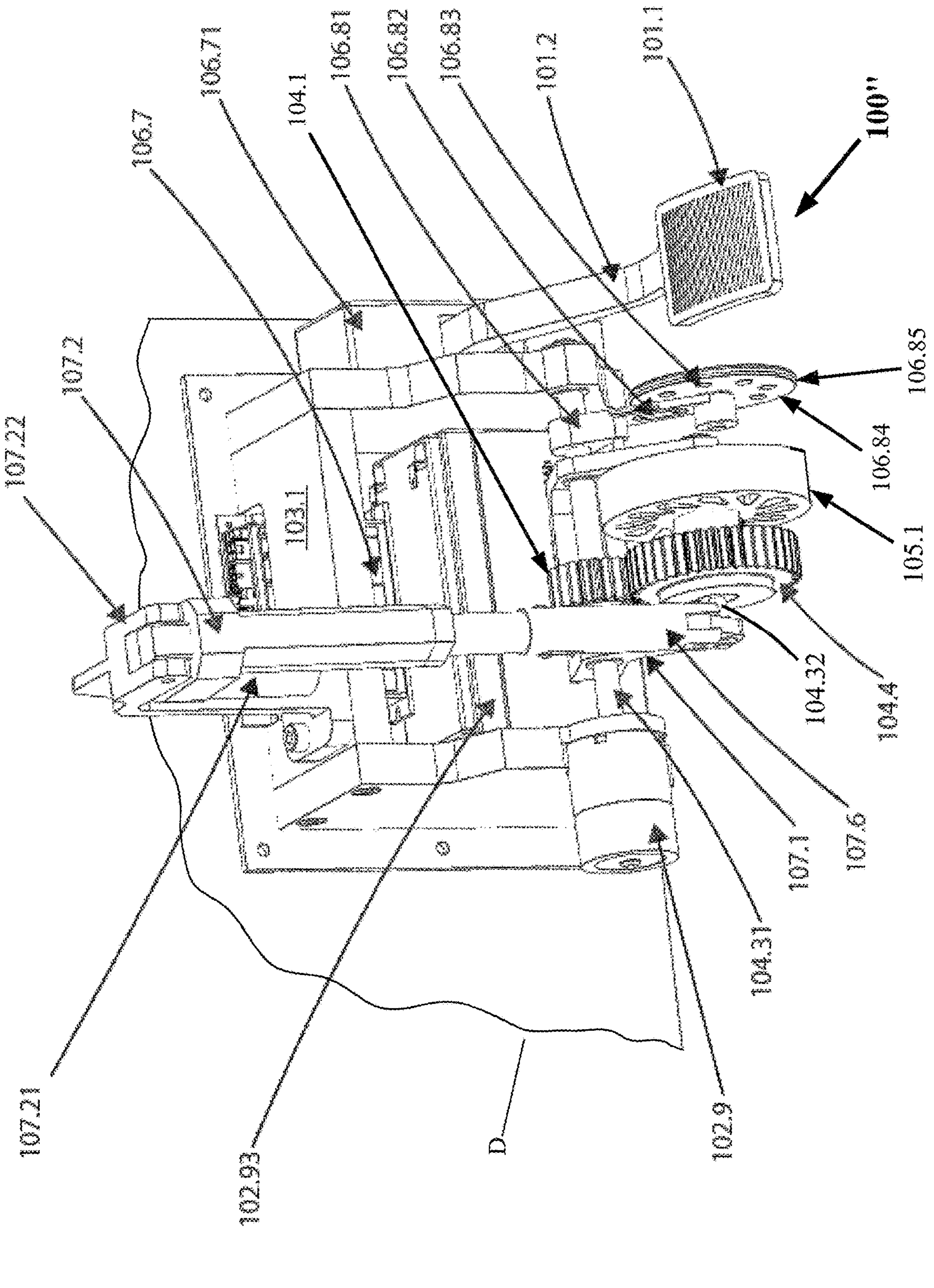
FIG. 17 is a top left isometric view of a sixth embodiment of a door opening and closing system, which uses a moderate torque and moderate speed motor, and a moderate power increasing, speed decreasing gear ratio, along with a wheel idler sensor assembly that uses hall sensors and magnets.
Figure 18:
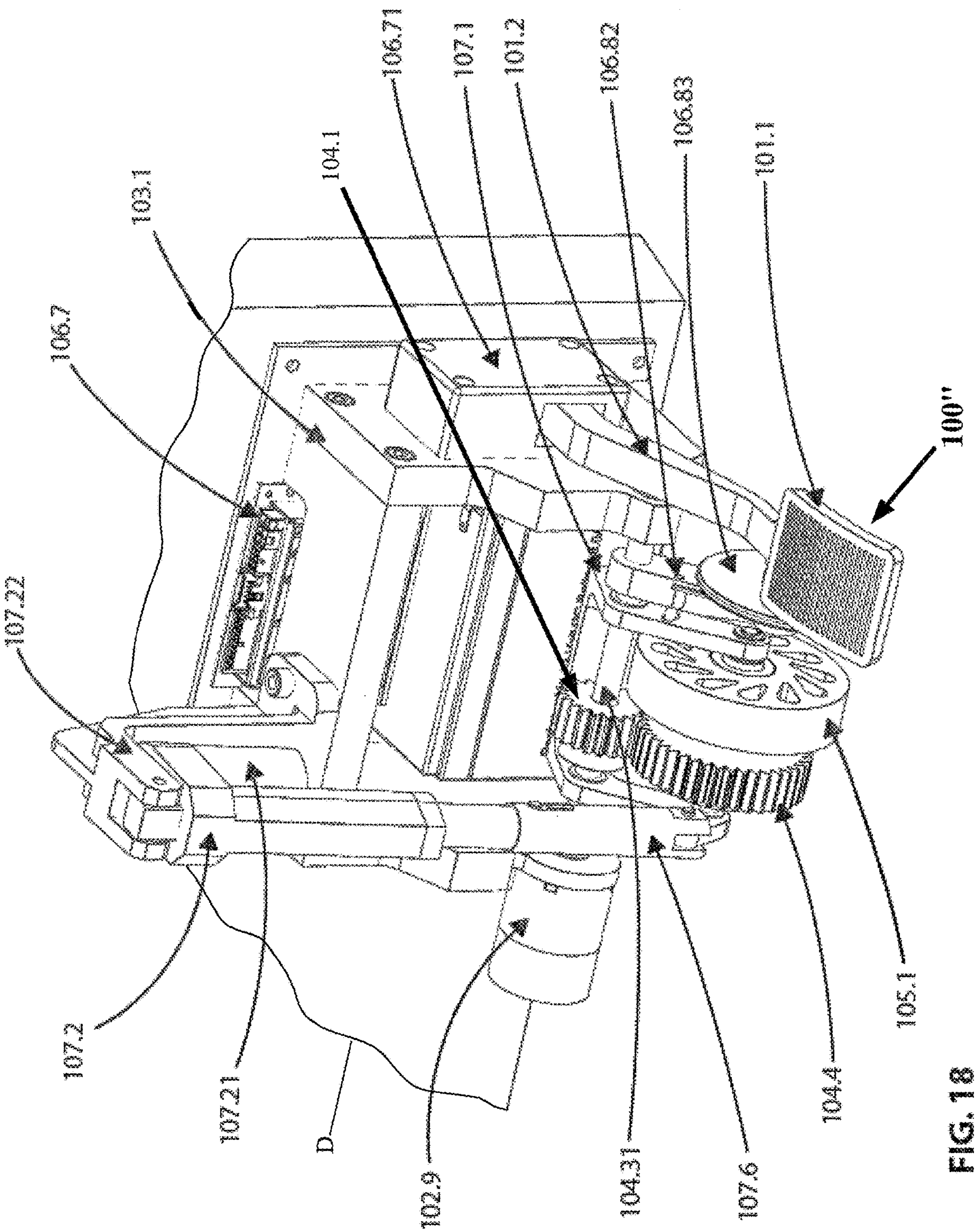
FIG. 18 is a top right isometric view of the embodiment shown in FIG. 17.
Figures 19A, 19B:
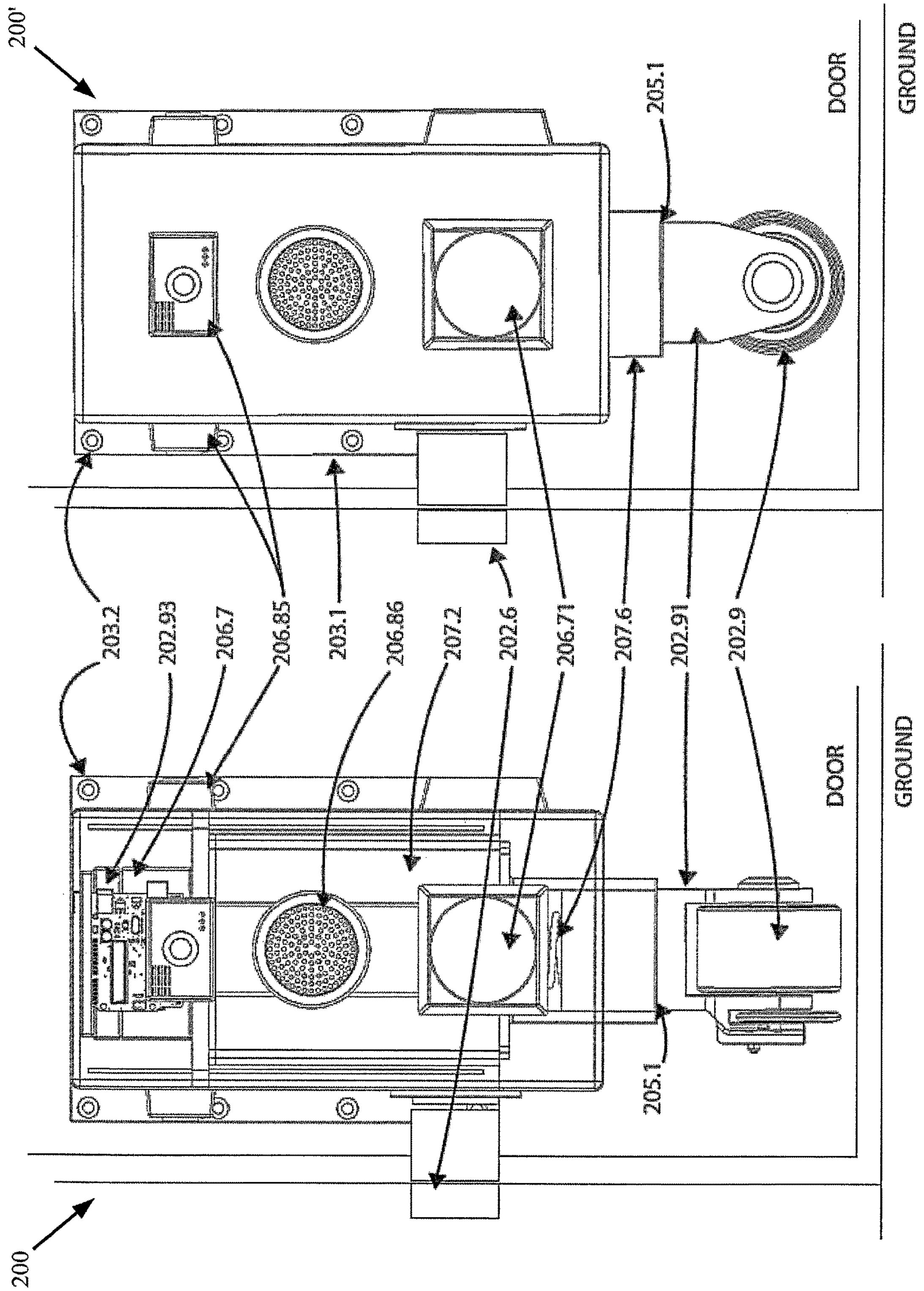
FIG. 19A and FIG. 19B are front views showing another embodiment that is usable for opening and closing of either a sliding door arrangement (FIG. 19B) or a pivoting door (FIG. 19A), where the embodiment utilizes a column lifter (i.e., a multi-stage linear actuator) as the linear actuation device.

Other alternate (motorized) embodiments are shown in FIGS. 13, 14, 15, 16, 17 and 18, and FIGS. 19A-32. FIGS. 13-14 depict a first motorized embodiment, FIGS. 15-16 illustrate a second motorized embodiment, and FIGS. 17-18 illustrate a third motorized embodiment configured to provide motorized actuation of the door for the user. The three embodiments of FIGS. 13-14, FIGS. 15-16, and FIGS. 17-18 may be differentiated by at least the various motor and the battery locations utilized in each arrangement, and where each embodiment is shown using a linear actuator to operate with respect to opening and closing of a pivoting door. These three different embodiments may also be used for opening and closing of a sliding door, merely by using a different wheel orientation (e.g., rotating the orientation of the wheel axle 90 degrees). FIGS. 19A-19B, as well as FIGS. 20-32 show other embodiments for opening and closing of either a sliding door or a pivoting door, but which are shown utilizing a column lifter (i.e., a multi-stage linear actuator) as the linear actuation device. It is noted that any suitable linear actuation device now known in the art or later developed that may provide suitable actuation may alternatively or additionally be used in any embodiment described herein, and use of the term "linear actuator" hereinafter is intended to broadly encompass any and all such types of linear actuation devices. Aspects of these other embodiments are further described hereinafter.

A hands-free door opening/closing system 100 is shown in FIGS. 13-15. The hands-free door opening/closing system 100 may include a chassis 103.1, a first shaft 104.31, a second shaft 104.32, a drive wheel 105.1, at least one coupling link 107.1, a main (first) gear 104.1, a drive (second) gear 104.4, a motor 102.9, and an actuation member that is configured to trigger actuation of the motor (i.e., to trigger the motor to start to initiate shaft rotation). As seen in FIGS. 13-15, the motor 102.9 may be a hub motor, where the motor is incorporated into the hub of the wheel.

The chassis 103.1, in addition to providing a framework configured to support the mechanical components of system 100, may furthermore include mounting holes that are configured for mounting of the door opening/closing system 100 to the door D.

Note that one single, suitably thick, coupling link may be used to position the second shaft with respect to the first shaft and may create a cantilevered arrangement; however, greater stability may be obtained by using two coupling links. Also note that where two coupling links are used, they may furthermore be joined together as a single integral part, and may form a u-shaped coupling link member 107.1 having two links that extend from a base flange to form a clevis, and that configuration is illustrated in the figures merely to be illustrative of the various possible different configurations.

In what may be the simplest of the motorized embodiments that use gears, as seen in the FIGS. 17-18, the shaft 104.31 may be rotatably mounted to the chassis 103.1 (note that in other embodiments this shaft may be fixedly mounted to the chassis), and the housing of the motor 102.9 may also be fixedly mounted to the chassis 103.1 and the rotor of the motor may be coupled to, and configured to drive, the shaft 104.31 to rotate, when the motor is activated by the controller module 106.7. It is noted that the controller module 106.7 may include, but is not limited to, use of an Arduino® UNO R4 Wi-Fi.

The shaft 104.31 may be rotatably mounted to the u-shaped coupling link member 107.1 using holes in proximity to its base flange, while holes at the distal ends of the links of the clevis of the coupling link member 107.1 may rotatably support the second shaft 104.32.

The main gear 104.1 may be fixedly secured to the first shaft 104.31, and each of the drive gear 104.4 and the drive wheel 105.1 may be fixedly secured to the second shaft 104.32. Being so mounted, and with the main gear 104.1 and the drive gear 104.4 being configured to mesh, rotational motion in a first direction imparted to main gear 104.1 via rotation of the first shaft 104.31 by the motor 102.9 will cause the drive gear 104.4 and thus also the second shaft 104.32 to correspondingly co-rotate according to the gear sizes/ratios utilized, with the corresponding co-rotation of the second shaft 104.32 similarly causing the drive wheel 105.1 to co-rotate, and thus move along the floor or ground G to thereby open the door D.

In one possible embodiment, the u-shaped coupling link member 107.1 may be fixedly secured to prevent its individual movement (e.g., by being fixed to the chassis 103.1), and thus the mounting location of the chassis on the door D must be carefully set to provide a requisite amount of engagement force between the drive wheel 105.1 and the floor or ground G, because the drive wheel 105.1 is thereby fixedly positioned with respect to the door D (and with respect to the floor/ground surface). In this embodiment, the movement of the door D from the desired (and preset) door open position back towards the door closed position may be accomplished by the controller module 106.7, which may cause the motor 102.9 to operate in reverse, causing counter-rotational motion (i.e., rotation in a second direction) to be imparted to main gear 104.1 via counter-rotation of the first shaft 104.31 by the motor 102.9, thereby causing the drive gear 104.4 and thus also the second shaft 104.32 to correspondingly counter-rotate, with the corresponding counter-rotation of the second shaft 104.32 causing the drive wheel

105.1 to counter-rotate and thus move in the opposite direction with respect to the floor or ground G to thereby close the door D.

In another possible embodiment, the shaft 104.31 may be rotatably mounted to the u-shaped coupling link member 107.1 and the u-shaped coupling link member 107.1 may be free to pivot about that shaft 104.31 (i.e., it is not fixed to the chassis 103.1), being free to pivot to the extent that it may be driven by its connection with the linear actuation device 107.2, as discussed further hereinbelow, forming a cam pivot for drive wheel 105.1 (i.e., it may have a pivot point with an eccentric movement). The linear actuation device 107.2 may have one end pivotally mounted with respect to the second shaft 104.32 (either pivotally mounted directly to the second shaft 104.32 or pivotally mounted to a portion of the U-shaped coupling link member 107.1 (as illustrated herein), and a second end pivotally mounted with respect to the chassis 103.1, e.g., using bracket 107.22. The linear actuation device 107.2 may be any suitable linear actuator, including, but not limited to, the actuators disclosed in U.S. Pat. No. 4,759,386 to Grouw; U.S. Pat. No. 4,489,248 to Petersen; U.S. Pat. No. 5,491,372 to Erhart; U.S. Pat. No. 5,747,896 to Nagai; U.S. Pat. No. 7,541,707 to Hochhalter; U.S. Pat. No. 3,887,155 to Bertalot; U.S. Pat. No. 6,224,037 to Novick; and U.S. Pat. No. 9,480,333 to Randlov.

The controller module 106.7 may control extension of the piston 107.6 of the linear actuation device 107.2 to position the drive wheel 105.1 in contact with the ground G when it is desired that the door D be driven into its open position, and the controller module 106.7 may control retraction of the piston 107.6 of the linear actuation device 107.2 to lift the drive wheel 105.1 off of the floor surface, so that the door may close on its own (or the door may close via spring biasing—not shown).

The motor 102.9 may be triggered to actuate (i.e., may be triggered to begin causing the first shaft 104.31 to rotate) by any suitable apparatus and method known in the art, and may preferably be a hands-free apparatus. For example, a pedal 101.1, and an associated pedal arm 101.2 may be pivotally mounted with respect to the chassis 103.1, and may also be coupled to toggle a switch 106.71 which can be mounted on either side of the chassis to enable the left hand or right hand mounting onto a door, that may control the power supply to the motor 102.9 via the controller module 106.7. So, tapping on the pedal 101.1 may initiate hands-free opening (and closing) of the door D, as discussed hereinafter. Other apparatus that may alternatively or additionally be used to trigger the motor 102.9 to actuate may include, but is not limited to: a push button arrangement that may be positioned on the door, and may be actuated by a portion of the user's arm (e.g., the elbow); facial recognition, a proximity sensor that may be mounted to the chassis 103.1 (or to the door), which may detect the user when he/she is within a threshold distance of the sensor and may then command the switch 106.71 to supply power to the motor 102.9; a voice activated microphone; a remote control; a key card and card reader, a user interface cable, Bluetooth or wireless connections/communications, an API running on a smartphone, computer, an app, a home or office security or media system or service, a home or office WiFi system similar to Alexa, Echo, Siri, Google Assistant, Nest, Android, or similar interface device and smart office and home technologies, etc., which may permit remote opening and closing of the door D by someone located very distant from the door (e.g., across town, and/or out of the country).

The motor 102.9 may be powered by a fixed or removable rechargeable low volt DC power supply (e.g., one or more batteries 102.93) that may be positioned in a receptable of the chassis 103.1 (see FIG. 17); or the motor may be hardwired to receive ordinary line voltage, and may use a battery as a backup power supply. The recharging may be from a small, charging cable or by a proximity inductive charging which is engaged when the door is in the closed position, solar or photovoltaic cells, or removable for remote charging.

When the motor 102.9 is triggered to operate, as described above, it may cause the first shaft 104.31 to rotate a first selective amount of angular rotation, which is configured to cause co-rotation of the main gear 104.1 and thereby cause co-rotation of the drive gear 104.4, and thus cause rotation of the second shaft 104.32 a second selective amount of angular rotation, which in turn thereby causes the drive wheel 105.1 to co-rotate a third selective amount of rotation. This third selective amount of rotation of the drive wheel 105.1 is correlated to a radial distance that the drive wheel 105.1 is positioned away from the axis of a hinge of the door D (i.e., from the door hinge line), and in combination with contact of the drive wheel 105.1 (and its particular diameter) with the floor surface, it causes rotation (pivoting) of the door a desired angular amount to thereby pivot from a door closed position into a desired door open position (e.g., 90 degrees of door rotation).

The controller module 106.7 may be wired (not shown) or may wirelessly communicate with respect to various components of the system, or external systems and inputs, to be configured to control many different aspects of the operation of the system 100.

Figure 18A:
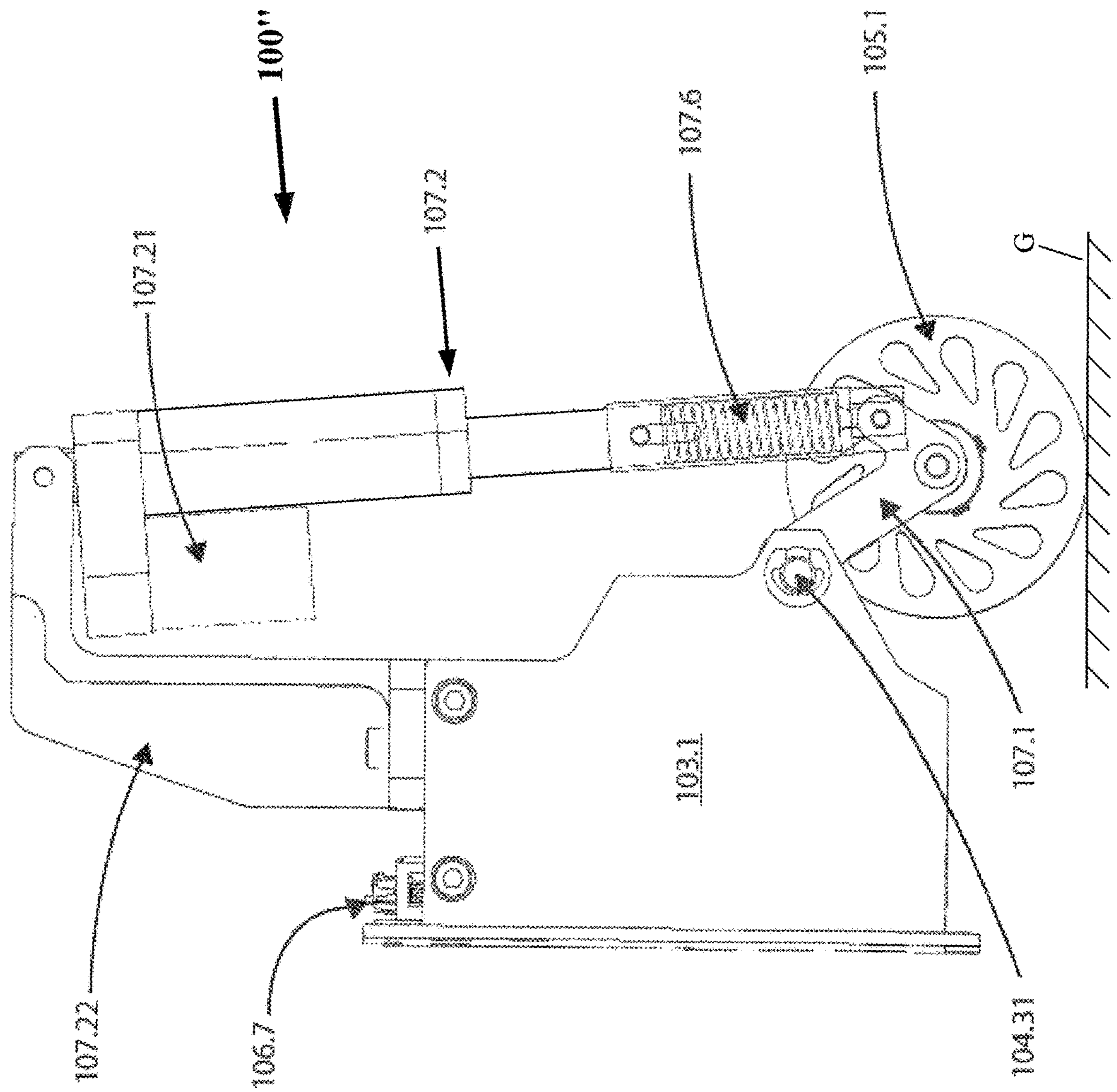
FIG. 18A is a side view showing the embodiment of FIG. 18, but showing the piston of the linear actuation device transparent to expose the spring therein.

The controller module 106.7 may also be configured to control the motor 102.9 to cause a time delay between when the motor is triggered to actuate (by the user using the selected hands-free apparatus, e.g., foot pedal 101.1, arm 101.2, and switch 106.71), and when the motor is activated and actually begins rotating to cause the described shaft rotations. Also, the controller module 106.7 may be configured to further control the motor 102.9, such that when the door D has been rotated open by the system 100 to the desired door open position, the controller module may lock the motor 102.9 and essentially freeze rotation of the drive wheel 105.1, to maintain the door at the desired door open position for another pre-determined or programmable time period. The controller module 106.7 may also be configured to cause the motor 102.9 to operate in reverse, as noted above, after a predetermined time or programmable delay, to effect closing of the door using the drive wheel 105.1. Additionally, the controller module 106.7 may be configured to control the linear actuation device 107.2, to consistently maintain a pre-set and/or variable, and/or programmable amount of pressure between the drive wheel 105.1 and the floor surface, to provide a necessary amount of traction in various different conditions. Additionally, or alternatively, the controller module 106.7 may, after a pre-set amount of time, shut off the motor 102.9, and subsequently trigger the motor 107.21 of the linear actuation device 107.2 to cause the piston 107.6 of the linear actuator to retract, and thereby lift the otherwise static drive wheel 105.1 off of the floor surface, permitting the door to automatically return, on its own, into the closed door position, which door return may be spring biased (e.g., using torsion springs or a clock spring at the door hinge(s) to bias the door towards the closed door position- or hydraulic or spring or other door closing devices, all not shown). Note that the linear actuation device 107.2 may also utilize a helical spring 107.7, whereby the spring 107.7 may be coupled to a portion of the link 107.1 (see e.g., FIG. 18A), such that when the linear actuation device 107.2 is extended, its piston may be extended an amount being sufficient to compress the spring to apply a prescribed amount of pressure between the drive wheel 105.1 and the floor/ground surface (G) to allow for changes in floor pitch and slope without losing traction. When the door D reaches the door closed position (or at some time prior to that), the controller module 106.7 may shut off the motor 107.21 of the linear actuation device 107.2 and freeze the position of the piston 107.6 with respect to the outer tube, and thereby maintain the lowermost portion of the drive wheel 105.1 at a predetermined or programmable height/position above the floor surface. Alternatively, once the door D reaches the door closed position, the controller module 106.7 may subsequently trigger the motor 107.21 of the linear actuation device 107.2 to cause the piston 107.6 of the linear actuator to extend, and thereby lower drive wheel 105.1 into contact with the floor surface, while keeping the motor 102.9 inactive, so that the door cannot be driven open, but is ready to be opened, once it is so commanded by the user utilizing the selected hands-free apparatus (e.g., foot pedal 101.1, arm 101.2, and switch 106.71). The converse can also be achieved with the linear actuator extended and maintained in the open position to keep the door in the open position when programmed for this function.

As seen in FIGS. 17-18, the controller module 106.7 of the system 100 may also be configured to operate in conjunction with an idler wheel and a hall sensor, or similar devices, to monitor and control the speed of the door opening, the amount of travel of the door D (angle to open for a pivoting door, or distance traveled linearly when used with a sliding door), and to determine the delay for the closing (when to actuate the linear motion device 107.2 to raise the wheel 105.1). It is possible to obtain such information using the drive wheel 105.1 or optical sensor, instead of an idler wheel, but the drive wheel is under pressure with the floor/ground G and being driven to rotate to overcome the inertia of the door D, and as such the drive wheel may slip or otherwise provide information that may not accurately reflect the actual real-time performance with respect to the door's travel, and an optical sensor may be accurate but is also prone to malfunction due to the accumulation of dirt and debris, whereas the idler wheel is not being driven to open the door and may be more accurate as to the information obtained and used.

The controller module 106.7 may be electronically coupled to a hall effect sensor or similar device 106.82 that is configured to co-act with a single or plurality of magnets 106.83 (e.g., eight magnets) that may be radially mounted and equally spaced on at least one side of an idler wheel 106.84 that is configured to roll freely on the ground G, which idler wheel may be supported by a bracket 106.81 that may be mounted to the shaft 104.31 and/or to the chassis 103.1. The idler wheel 106.84 may be metallic, or not, and may have a circumferential groove at the outer periphery of the wheel that may receive a rubber O-ring 106.85, which may serve to make the idler wheel's movement more reliable like most rubber wheels or other material which have a high coefficient of friction (e.g., having very little tendency to slip or be distorted).

The number of magnets 106.83 on the idler wheel 106.84 may be counted by the sensor 106.82 as the idler wheel rotates on the ground G during movement of the door D, so that if there are eight magnets, there may be approximately one and a half inches of travel between each of the eight magnets, i.e., the distance of travel may be determined according to the diameter of the idler wheel 106.84 used, the number of magnets 106.83 used, and the radial placement of the magnets on the idler wheel, which distance may be calculated by the controller module 106.7 using an algorithm associated with the use and particular arrangement of these components.

This determination of the travel of the door D made by the controller module 106.7 allows for the adjustment and programming of the door opening to not hit walls or other permanent obstructions within each specific application to 1½" of arc, of the door movement depending on the number of magnets, whether there are eight magnets or possibly more magnets.

Use of the idler wheel 106.84 and the sensor arrangement may permit the controller module 106.7 to determine if the drive wheel 105.1 is slipping due to ice, sand, an oil/grease covered surface, or due to other field conditions that may be encountered, allowing the motor 102.9 to turn the drive wheel added rotations (or a portion of a rotation) until the door D has reached its designated opening distance to occupy a desired door open position (and to similarly operate in reverse to occupy the door closed position).

Figure 14A:
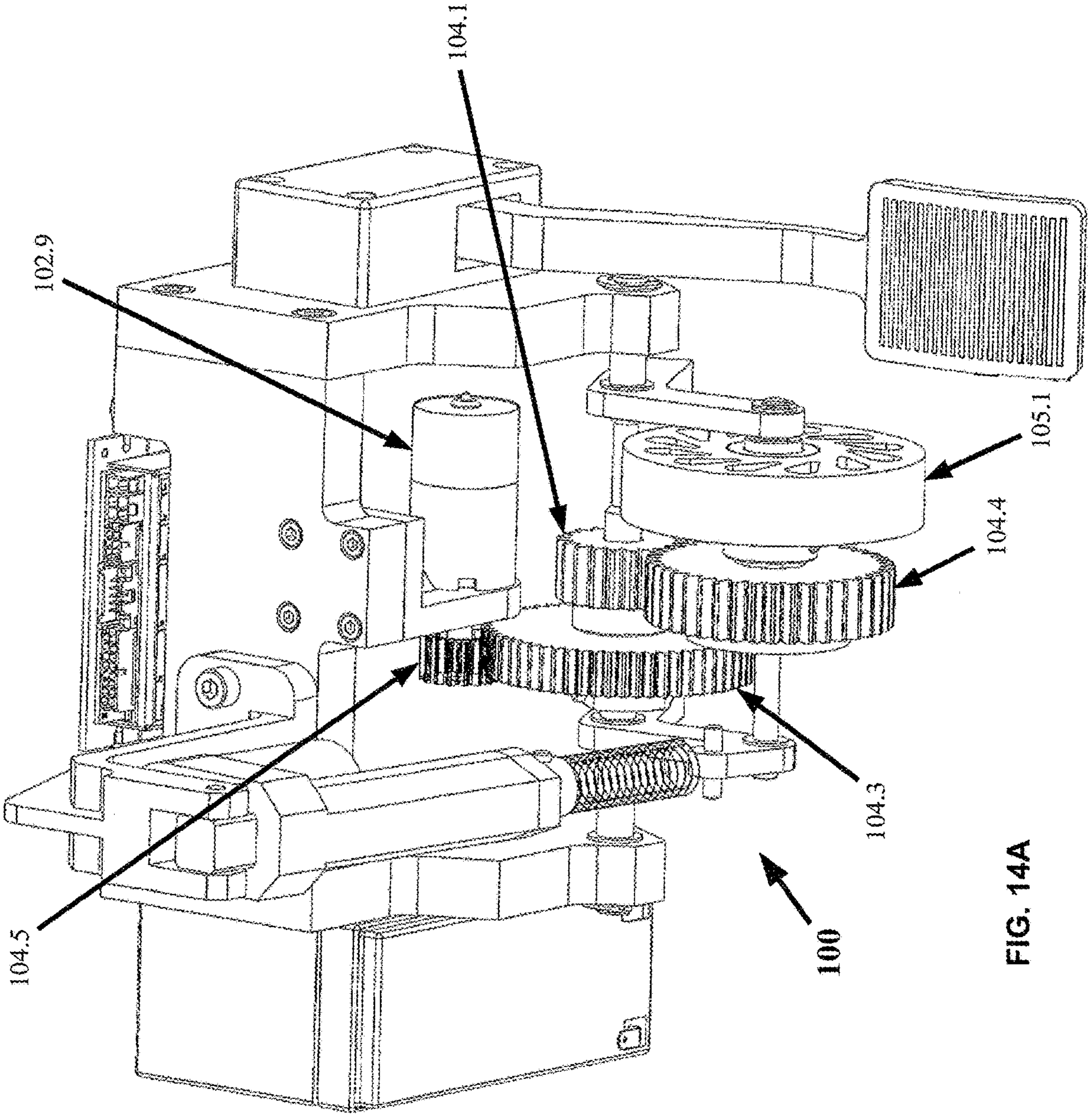
FIG. 14A is another perspective view of the embodiment shown in FIG. 13.

The arrangement shown in FIGS. 13-14A is constructed similar to the arrangement shown in FIGS. 17-18, except that the motor 102.9 may be positioned/mounted differently, and it may utilize four gears. As seen in FIGS. 13-14A, the motor 102.9 may be mounted to the chassis 103.1 either using an integral flange of the chassis, or using a separate bracket 102.91. The rotor of the motor 102.9 may be coupled to a first speed decreasing gear 104.5, which may mesh with, and drive, the second speed decreasing gear 104.3 that is fixedly secured to the first shaft, causing the first shaft to rotate, and also causing the gear 104.1 that is also fixedly secured to the first shaft to similarly rotate. The gear 104.1 meshes with, and drives, the gear 104.4 to cause rotation of the second shaft and thus the drive wheel, in accordance with the combination of gear ratios that are used for the four gears. This may be particularly suitable for high traffic commercial applications.

The arrangement shown in FIGS. 15-16 may be constructed similar to the arrangement shown in FIGS. 17-18, except that the motor 102.9 may be positioned/mounted differently, and it may not utilize any gears. The motor 102.9 may also be a hub motor. As seen in FIGS. 15-16 the motor 102.9 may be mounted to the link 107.1, and the rotor of the motor may be coupled to the second shaft to thereby cause rotation of the drive wheel 105.1 to thereby cause the drive wheel to rotate relative to the second shaft and open the door.

Note that for any of these motorized embodiments the controller module 106.7 may determine if an obstruction in the path of travel has been encountered by the door (e.g., a box left on the ground, a person walking nearby, or if someone pushes on the either side of the door), after the linear motion device 107.2 has caused the drive wheel 105.1 to engage with the ground and may have even been actuated to open the door D at least part way. The controller module 106.7 may be able sense the obstruction by being able to sense an increase in the current draw by the drive motor 102.9, being indicative of an added load on the motor (i.e., the obstruction hindering movement of the door D). Upon detecting the obstruction, the controller module 106.7 may cause retraction of the linear motion device 107.2 to cause lifting of the drive wheel 105.1, so the door may close on its own, and the system may also reset for the next door opening cycle.

The controller module 106.7 coupled with the idler wheel may also be used to determine if the door is moving as a result of the rotation of the drive wheel, and may increase the pressure on the drive wheel by causing further extending of the linear motion device to adjust for variable environmental conditions in real time if the drive wheel is slipping.

As noted above, FIG. 19A shows a motor-actuated hands-free door opening and closing system 200, being used for opening and closing of a pivoting door. FIG. 19B shows a motor-actuated hands-free door opening and closing system 200', being used for opening and closing of a pivoting door. The motor-actuated hands-free door opening and closing system 200' may be the same as the motor-actuated hands-free door opening and closing system 200, except that the bracket 205.1 may be configured to alternatively mount the drive wheel with the axle perpendicular to the door, rather than being oriented parallel to the door. The same bracket 205.1 may be configured to simply mount to the lift column/actuator being clocked 90 degrees; additionally, or alternatively, a swivel mechanism 205.1 may be used. As such, only the motor-actuated hands-free door opening and closing system 200 is described hereinafter, with the understating that the component parts may be common to the motor-actuated hands-free door opening and closing system 200'.

Figure 20:
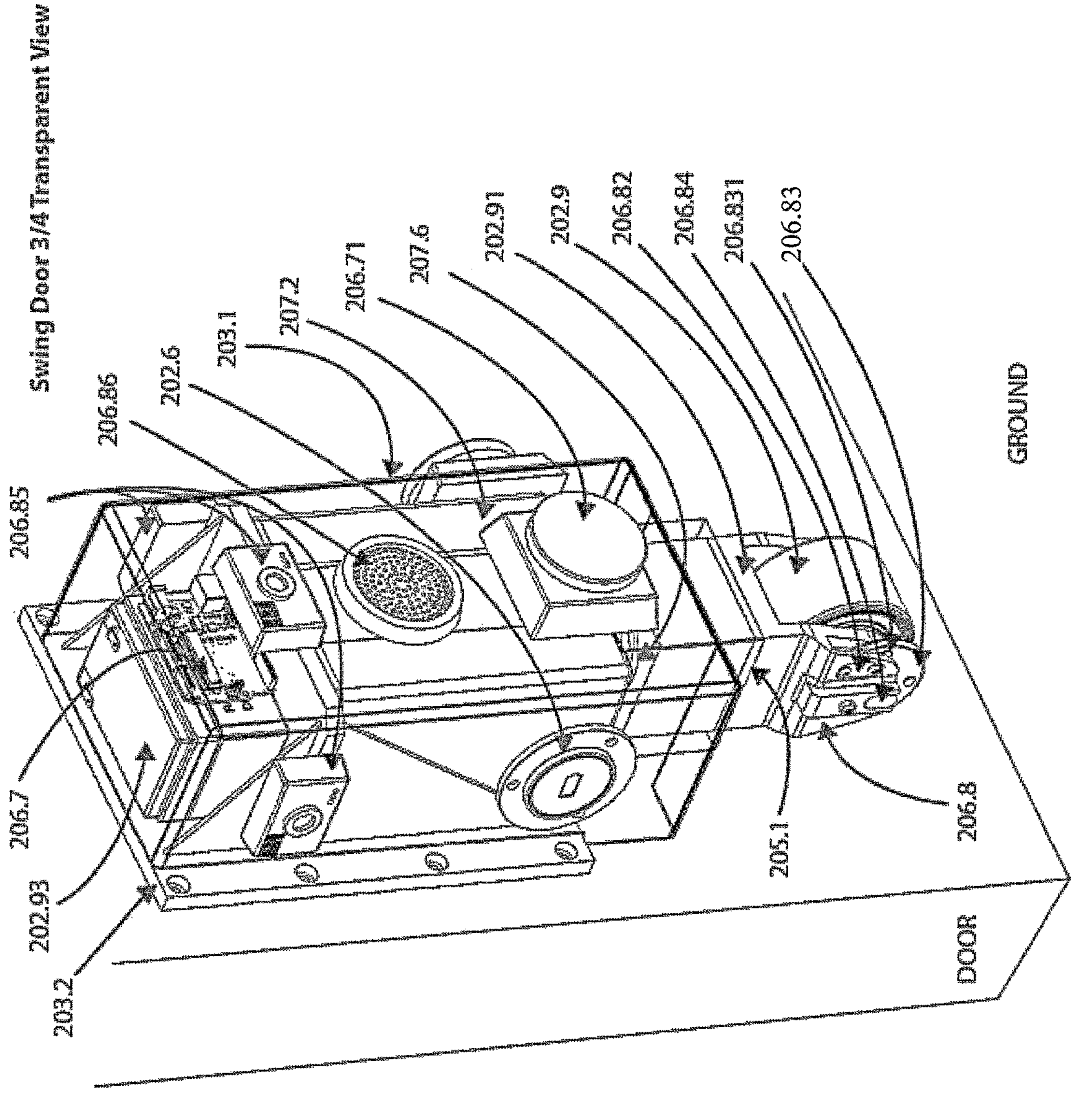
FIG. 20 is a transparent perspective view of the arrangement of FIG. 19A, where the embodiment is being used to open and close a pivoting door.
Figure 21:
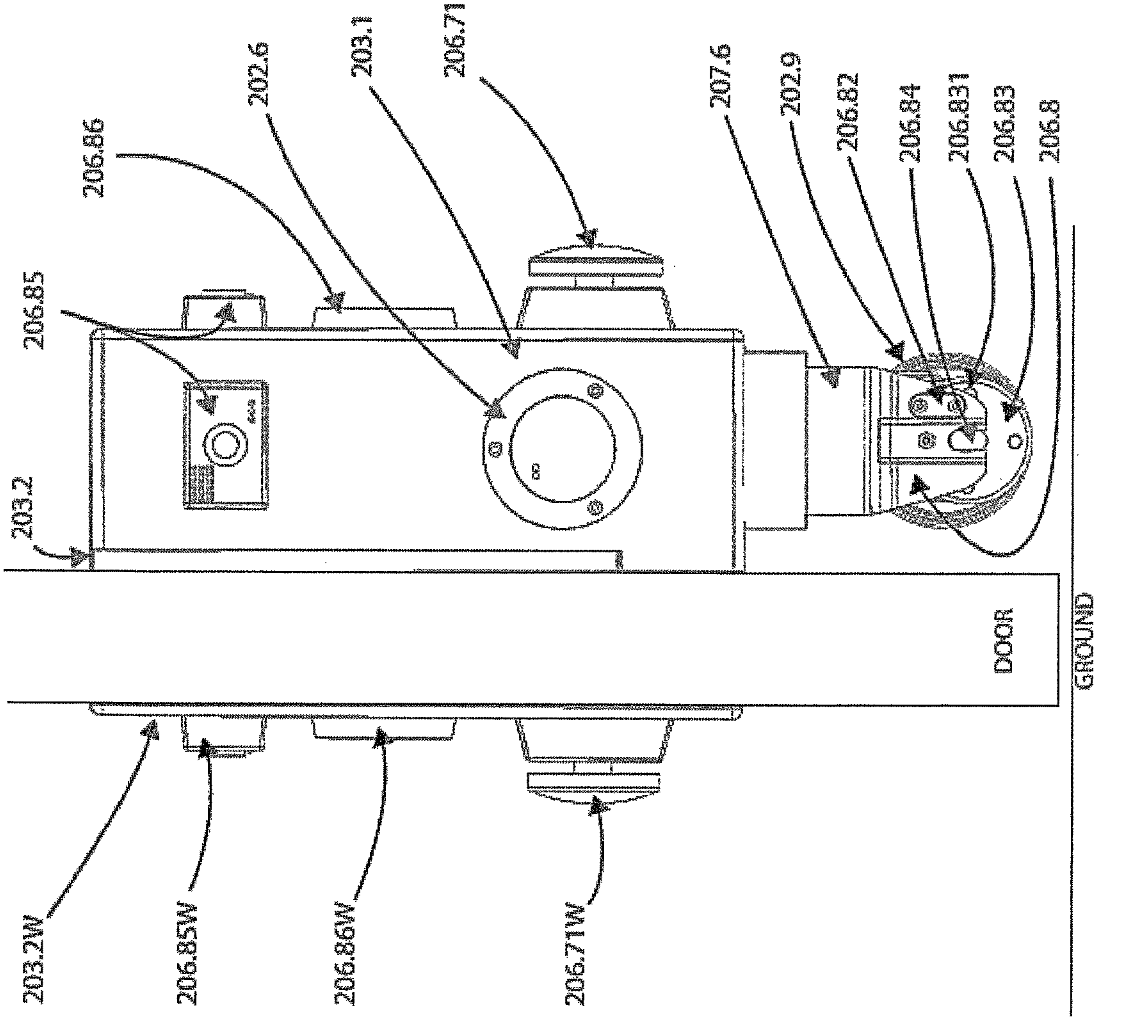
FIG. 21 is a side view of the arrangement of FIG. 20.
Figure 22:
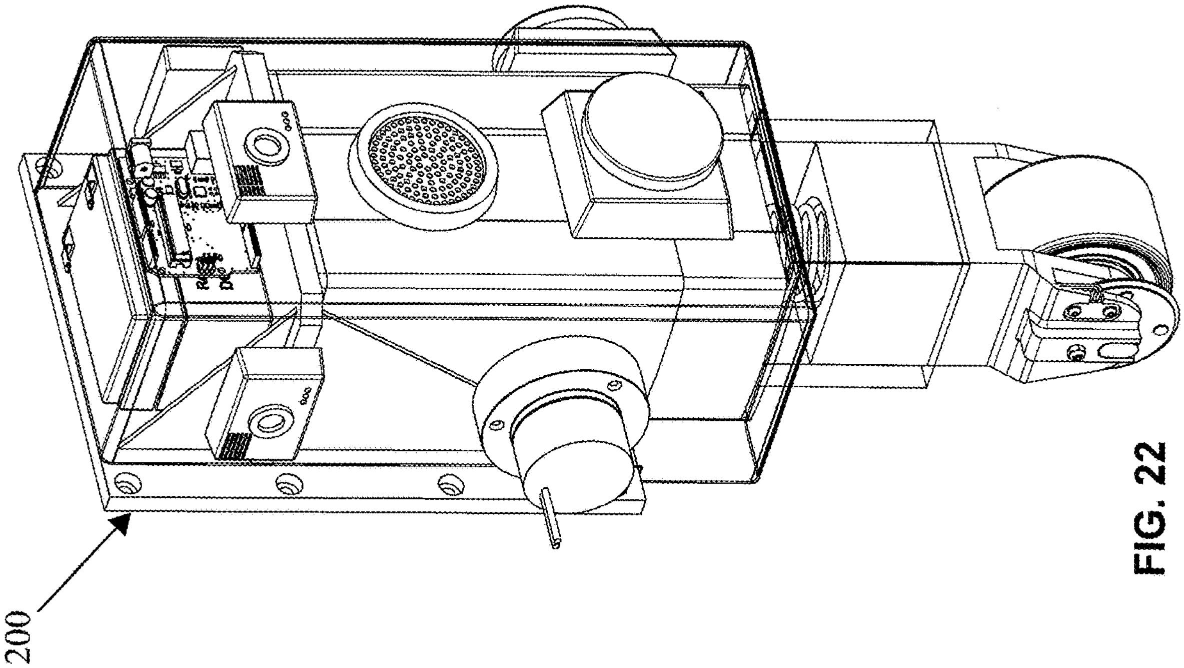
FIG. 22 is a transparent perspective view of the door opening and closing embodiment shown in FIG. 20.
Figure 23:
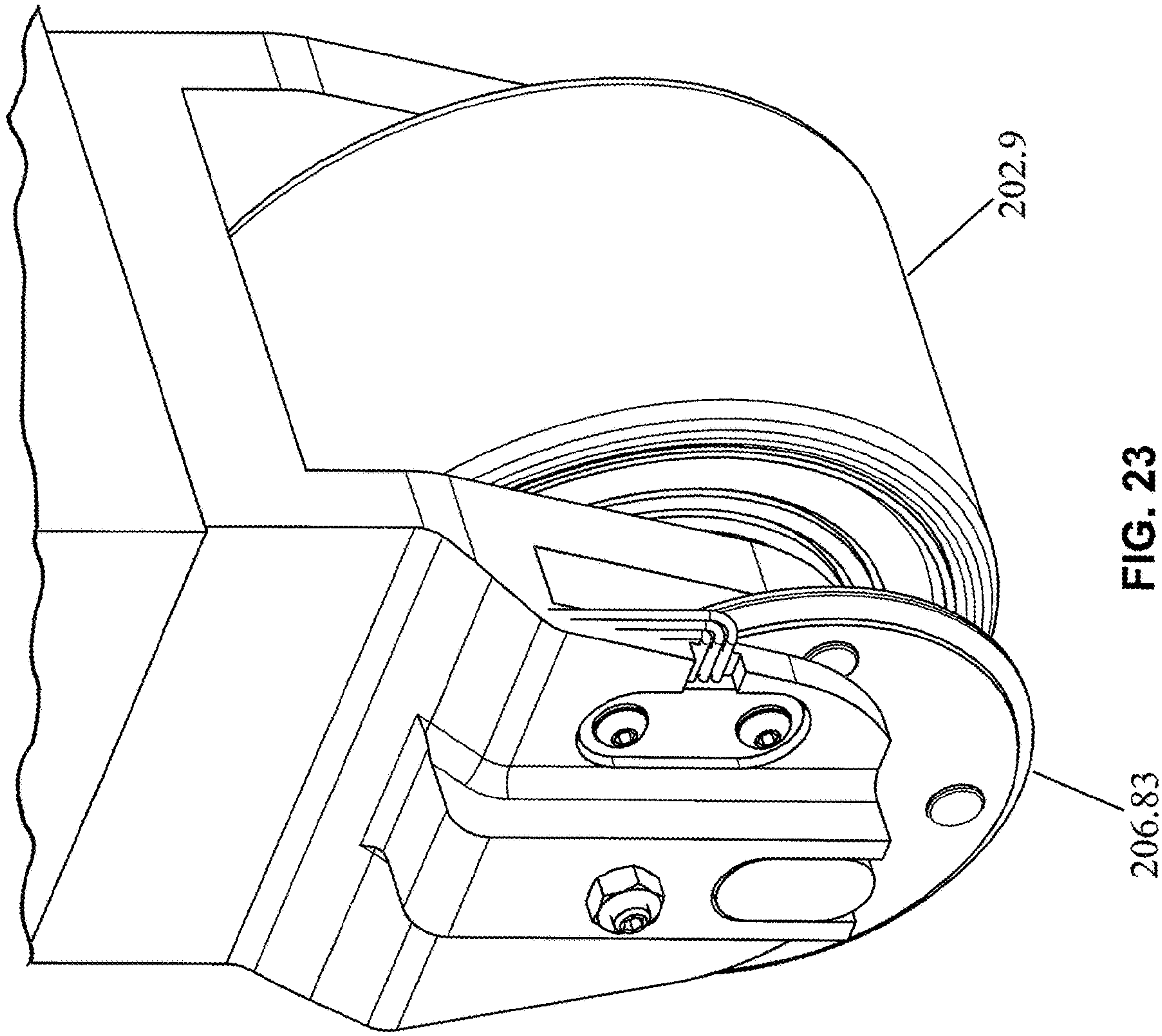
FIG. 23 is an enlarged perspective view showing the drive wheel, the drive wheel bracket, the idler wheel, and the hall sensor arrangement with magnets for the embodiment of FIG. 20.
Figure 24:
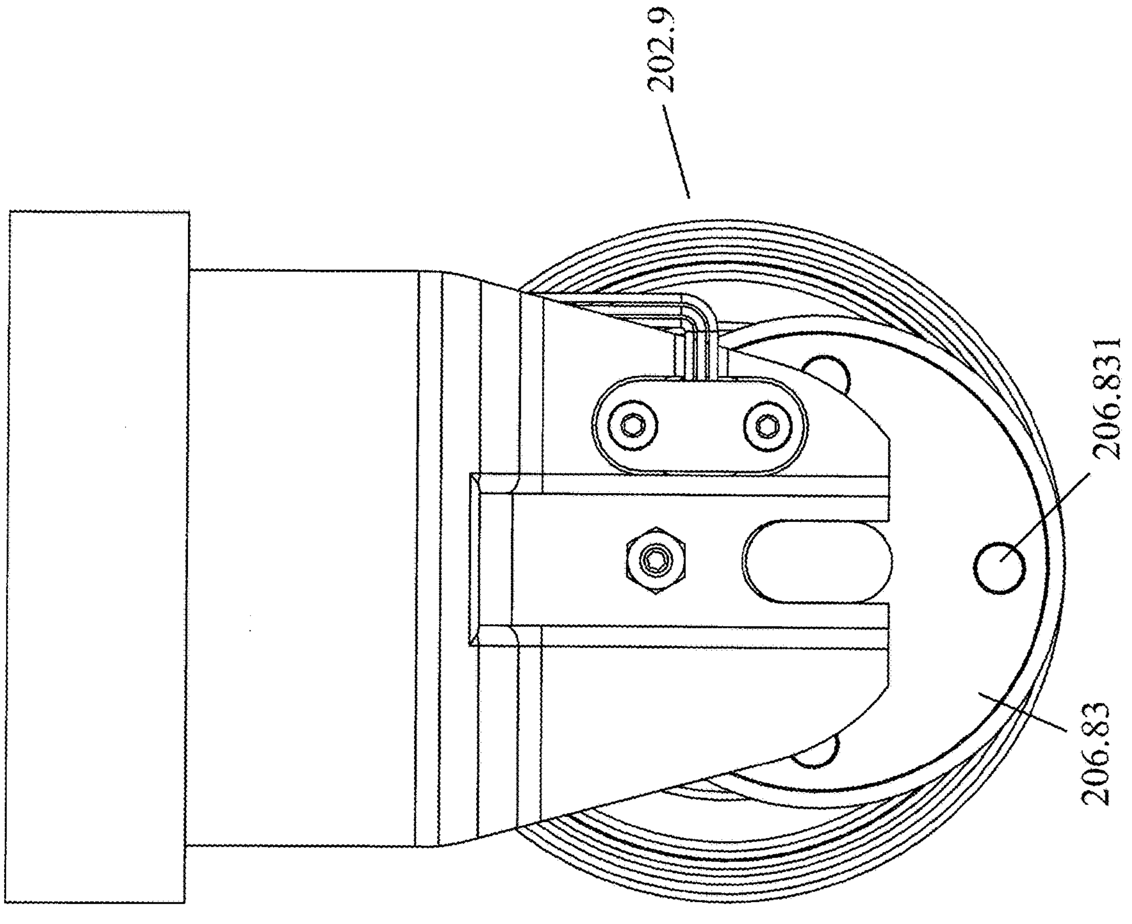
FIG. 24 is an enlarged side view of the drive wheel, the drive wheel bracket, the idler wheel, and the hall sensor arrangement with magnets shown in FIG. 23.
Figure 25:
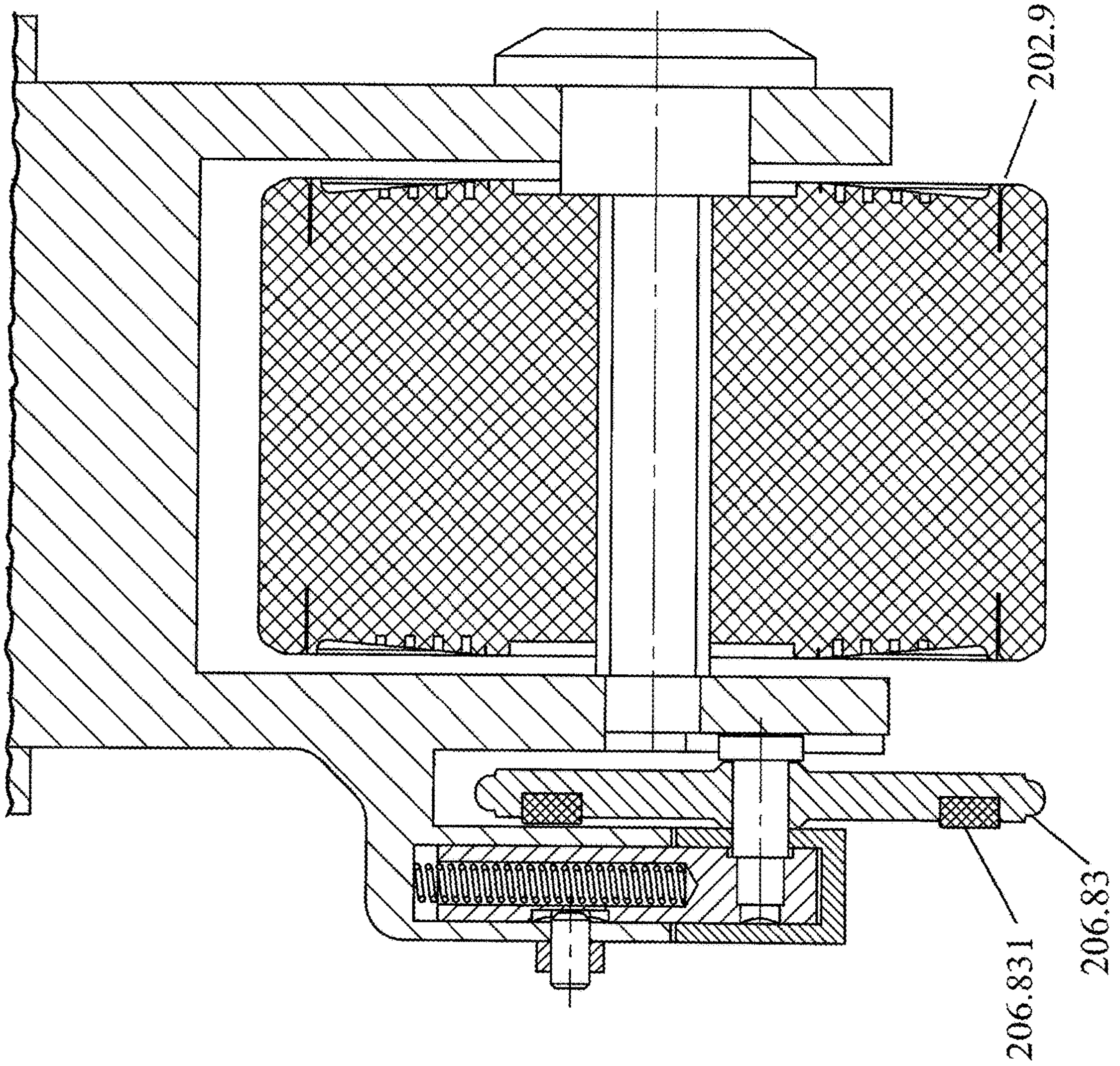
FIG. 25 is an enlarged cross-sectional view through the drive wheel, the drive wheel bracket, the idler wheel, the idler wheel spring assembly, and the hall sensor arrangement with magnets shown in FIG. 23.
Figure 26:
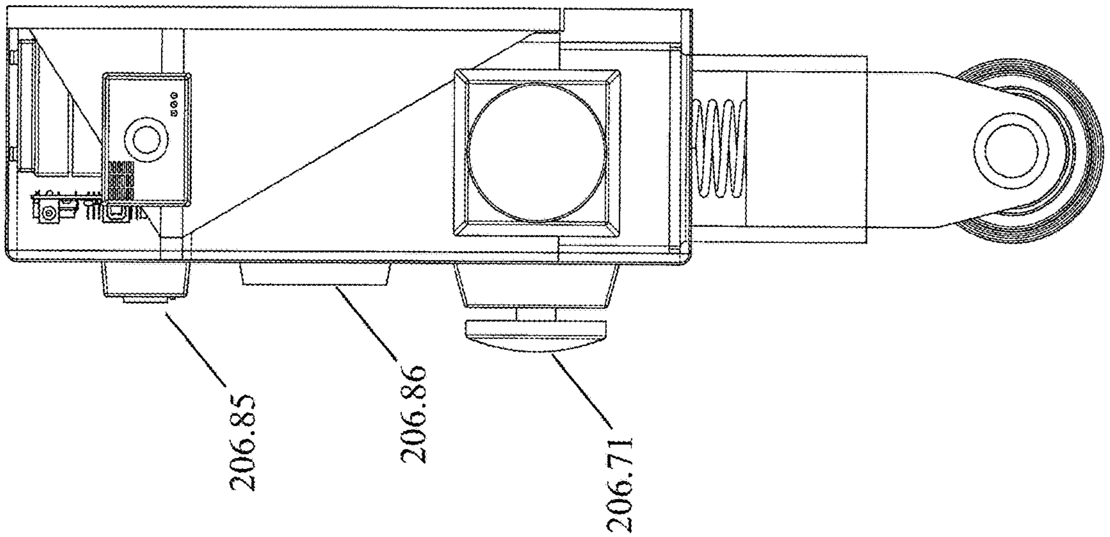
FIG. 26 is a transparent side view showing the traction spring, controller, and battery of the embodiment shown in FIG. 20.
Figure 27:
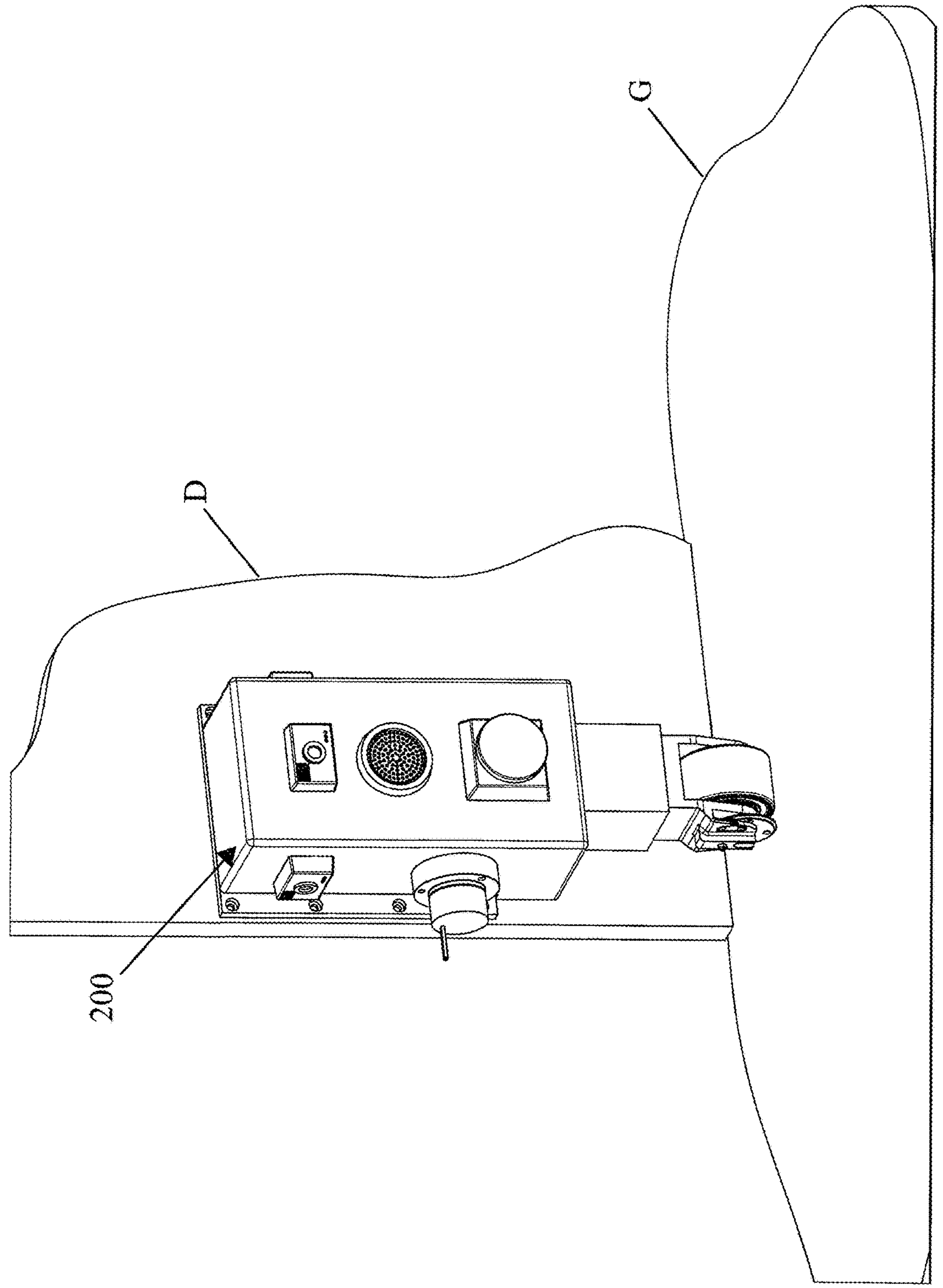
FIG. 27 is a perspective view showing the embodiment of FIG. 20 mounted to a door configured to pivot upon door hinges.
Figure 28:
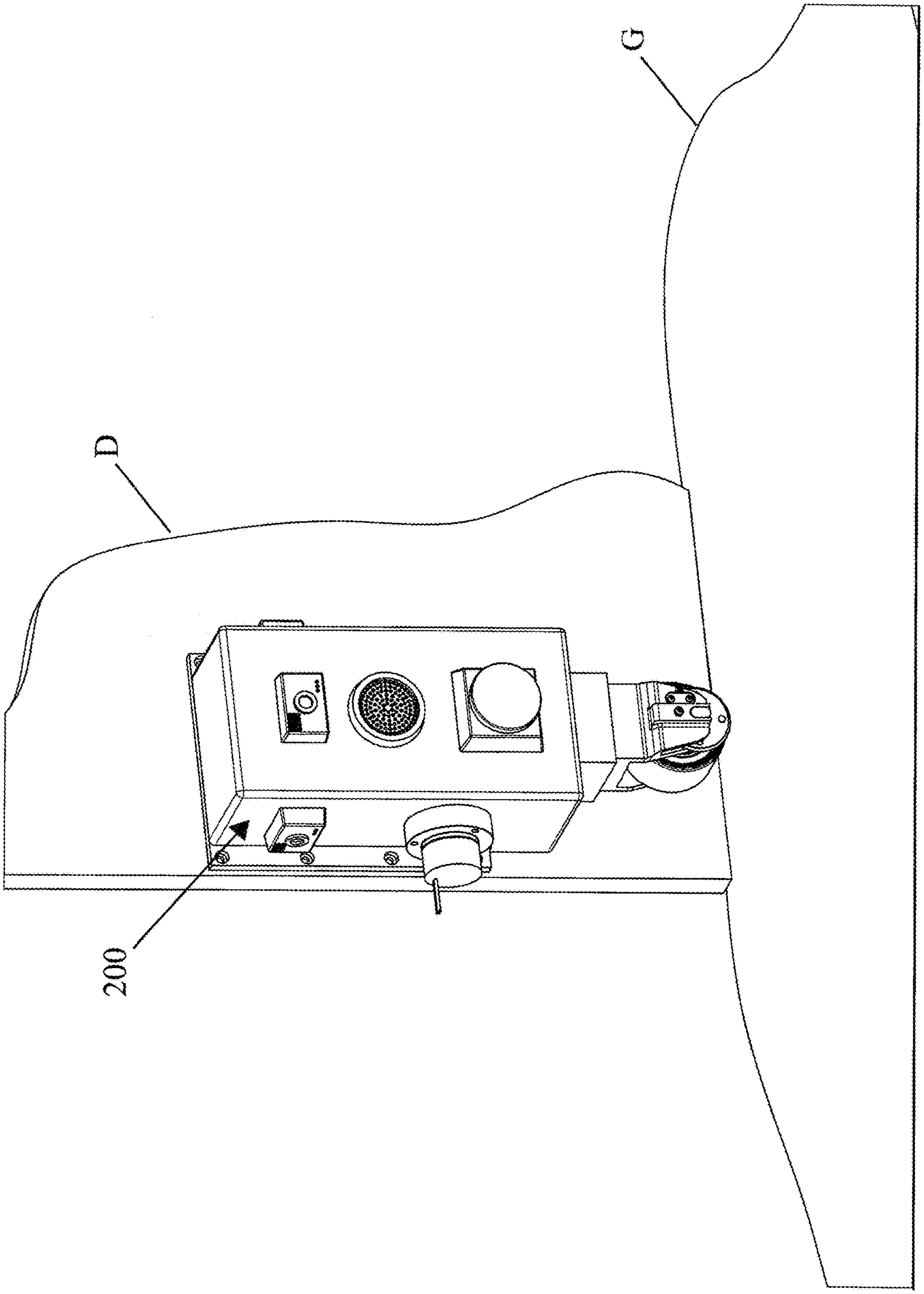
FIG. 28 is a perspective view showing the embodiment of FIG. 20 mounted to a door configured to slide relative to a master door frame.
Figure 29:
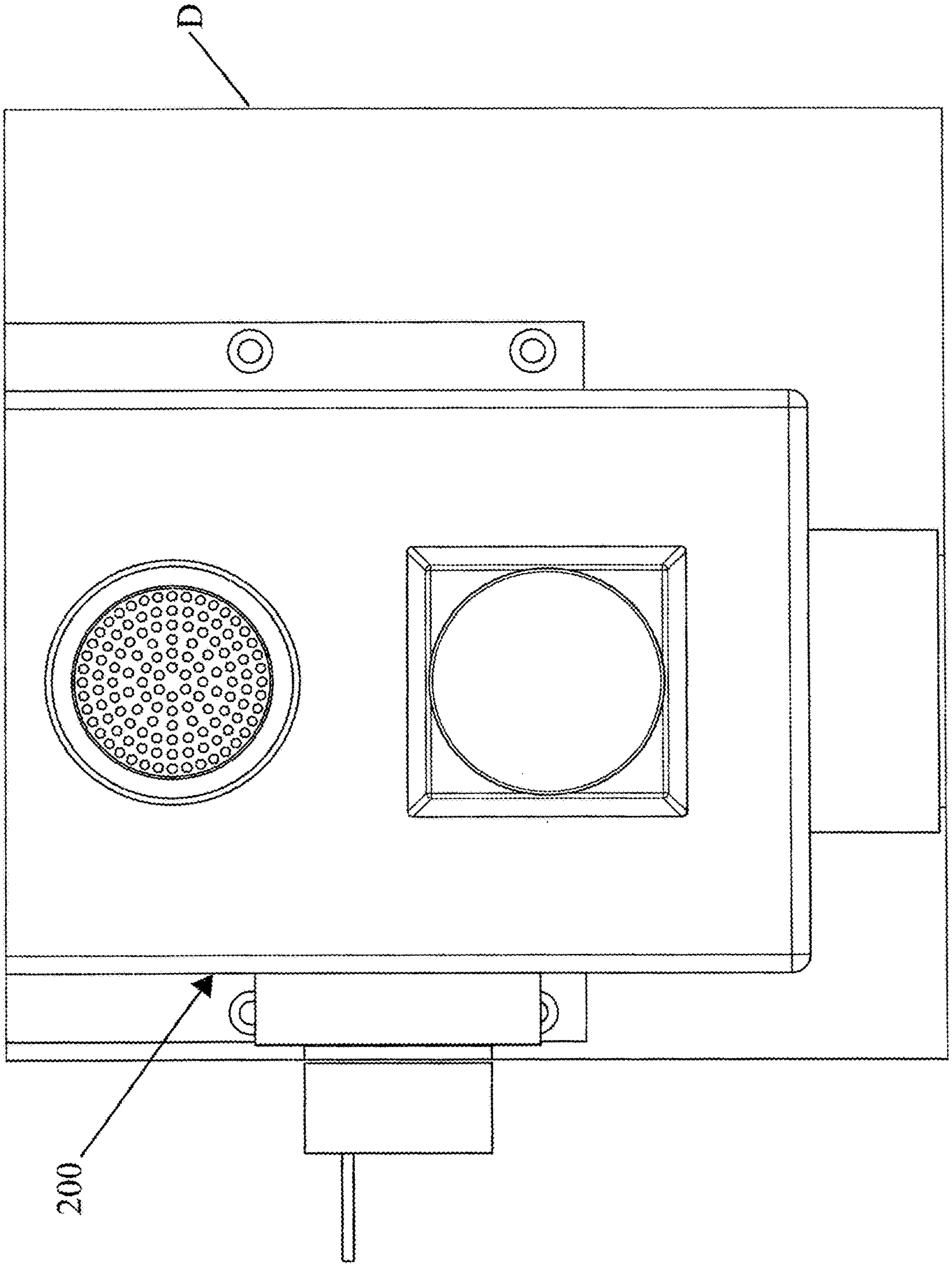
FIG. 29 is an enlarged front view of the switch, wireless charging contact, and speakers/microphone used in the embodiment of FIG. 20.
Figure 30:
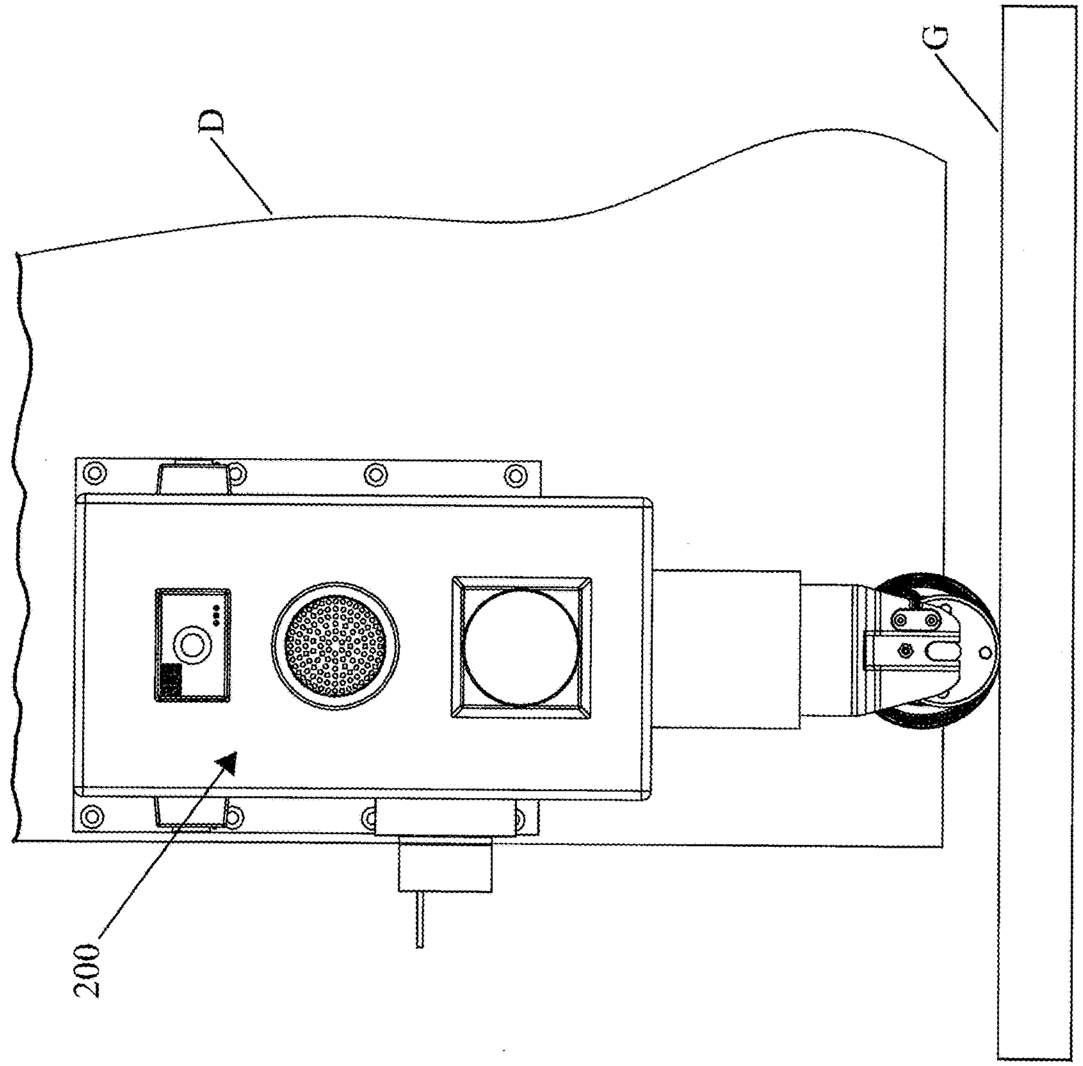
FIG. 30 is a side view showing the embodiment of FIG. 28, being shown with the drive wheel lowered into contact with the ground or floor.
Figure 31:
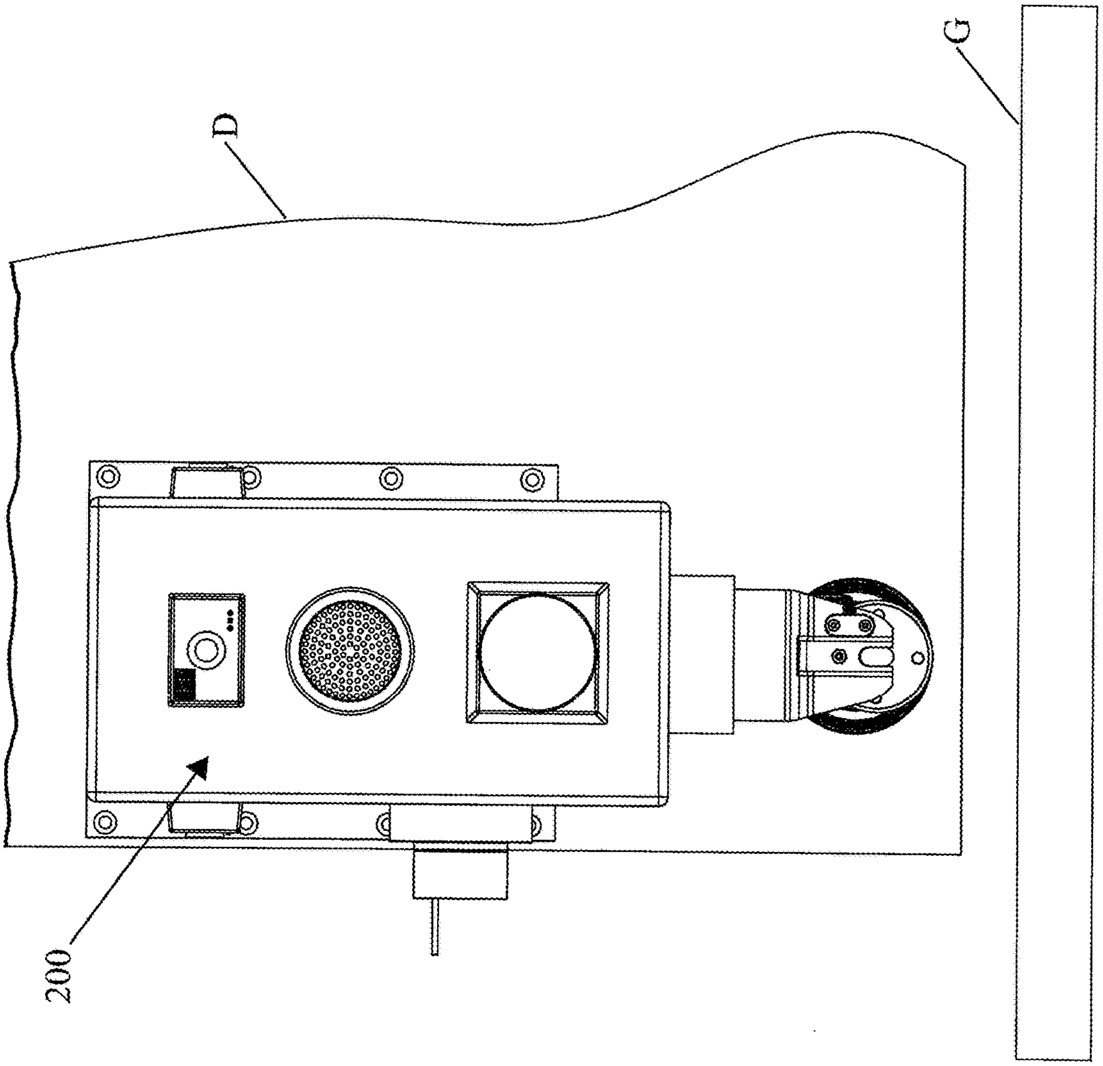
FIG. 31 is the side view of the arrangement shown in FIG. 30, being shown with the drive wheel raised up into a retracted position.
Figure 32:
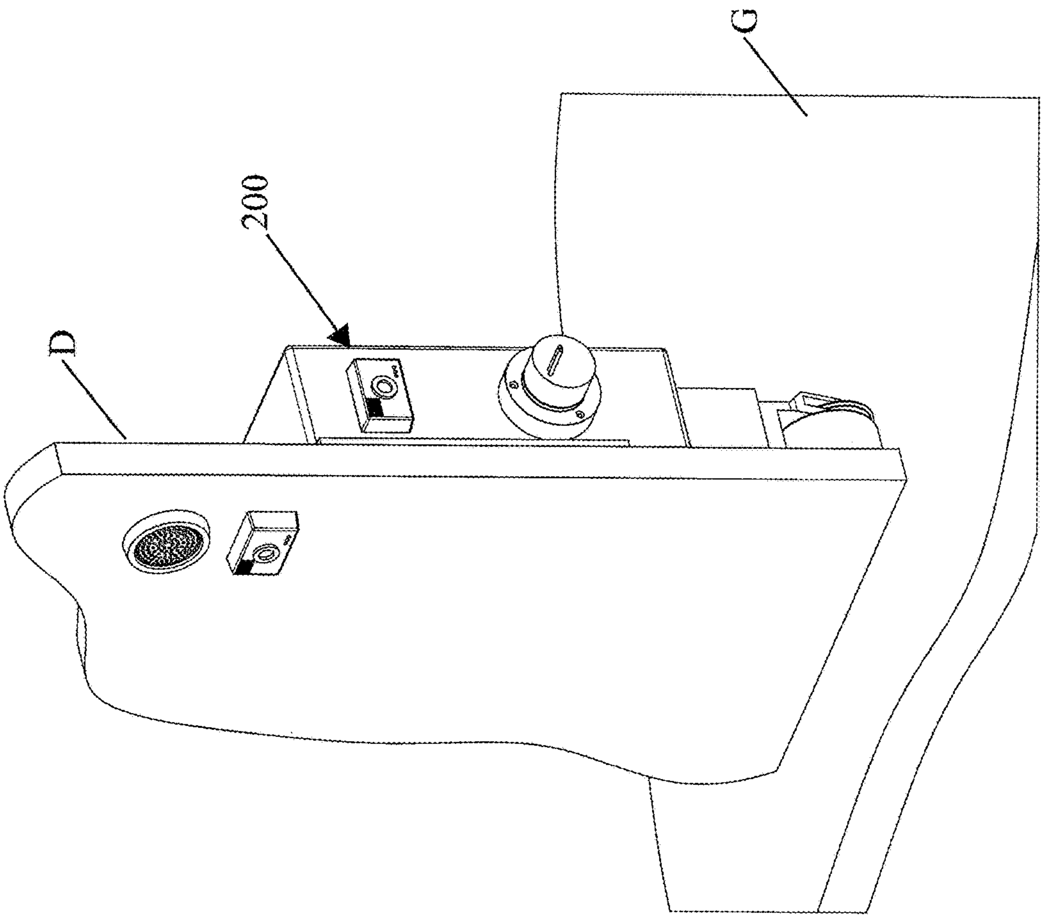
FIG. 32 is a reverse perspective view of the arrangement shown in FIG. 28.

As seen at least in FIG. 19A and FIG. 20, a combination drive wheel and hub motor 202.9 may mounted to a mounting bracket 202.91 via an axle to rotate with respect to said bracket, where the hub motor is configured, when activated, to cause the drive wheel to rotate. As seen in those figures, the door opening and closing system 200 may also include a chassis (e.g., a mounting plate 203.2 and mounting cover 203.1) that may house the component parts, and which is configured to mount to the door.

The door opening and closing system 200 may use, for the linear actuation device, a column lifter (i.e., a multi-stage linear actuator) 207.2 to drive the bracket-mounted drive wheel relative to the chassis mounting plate between a retracted position and one or more extended positions. A retracted position may be seen in FIG. 31, and an extended position may be seen in FIG. 30. Note that the floor or ground surface shown in FIG. 30 appears level, and where that is not the case, other extended positions would be needed to maintain proper contact and required pressure between the drive wheel and the floor or ground surface. The controller module 206.7 may be configured to sense loads, and may thus be configured to cause the column lifter 207.2 to extend into any necessary extend position to cause the desired amount of pressure between the drive wheel and the floor surface or ground surface. Any suitable type of switch (e.g., switch 206.71 which may permit toggling via a user's foot or a motion sensor 206.85) may be configured to trigger activation of the hub motor to cause the drive wheel to rotate a selective amount of angular rotation, to thereby drive the door to move (i.e., to slide or pivot) from a door closed position into a desired door open position. Power may be provided by a battery 202.93 that may be recharged in any suitable manner, including, but not limited to, use of a wireless charger 202.6.

The door opening and closing system 200 may also use an idler wheel sensor assembly 206.8, including an idler wheel 206.83 with magnets 206.831, a spring assembly 206.84, and a hall sensor 206.82. Speaker and microphone 206.86 may be used for communication of sound, to permit the use of voice control/commands for opening and closing of the door, and to provide for sound alarms or voice directions. A traction spring 207.6 may be used to bias the bracket 202.91 downward, to bias the drive wheel into contact with the floor.

While illustrative implementations of one or more embodiments of the disclosed systems are provided hereinabove, those skilled in the art and having the benefit of the present disclosure will appreciate that further embodiments may be implemented with various changes within the scope of the disclosed systems. Other modifications, substitutions, omissions and changes may be made in the design, size, materials used or proportions, operating conditions, assembly sequence, or arrangement or positioning of elements and members of the exemplary embodiments without departing from the spirit of this invention.

The door opening and closing system 200 may also use an idler wheel sensor assembly 206.8, including an idler wheel 206.83 with magnets 206.831, and a hall sensor 206.82. Speaker and microphone 206.86 may be used for communication of sound, to permit the use of voice control/commands for opening and closing of the door, and to provide for sound alarms or voice directions. A traction spring 207.6 may be used to bias the bracket 202.91 downward, to bias the drive wheel into contact with the floor. While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A foot operable door opener with motor assist comprising:

a control module associated with a foot operable pedal, said foot operable door pedal communicating with a motorized unit having gears for moving a door opening and closing drive wheel;

said foot operable door opener having a delay mechanism with a wheel idler sensor, to send information to said controller module to control the speed of the door opening, the length of travel for the door, the travel angle to open the door and to determine a delay for the opening and closing by starting and extending or raising a linear motion device to engage the door opening and closing drive wheel for opening and closing the door.

2. The foot operable door opener with motor assist as in claim 1, wherein said controller module controls power manipulation by starting a opening/closing cycle when a switch associated with a pedal is depressed starting said delay for a person to step aside; and wherein said controller module does not let the door swing open if the person pressing said switch does not move aside, with the aid of a proximity sensor capable of detecting a person or object in the pathway of the door being opened.

3. The foot operable door opener as claim 2 wherein said controller module controls the extension of a linear motion device which engages said door opening and closing drive wheel to the ground, wherein further said controller module senses the ground and applies a specific pressure by sensing the added current draw on a motor when it encounters the resistance of the ground plus the added spring tension of a traction spring controlling said door opening and closing drive wheel.

4. The foot operable door opener with motor assist as in claim 3 wherein said controller module starts a drive motor and a main gear controlling said door opening and closing drive wheel, and controls the speed of said drive motor to start out slowly and increase speed as it goes through said opening/closing cycle, and slows down at the end of the arc of the opening or closing door, wherein further if a sensor in said controller module encounters an obstruction in the path of travel of the door, or if someone pushes on the other side of the door after said linear motion device has engaged said drive wheel to the ground, said controller module senses the increased current draw from said drive motor and retracts said linear motion device lifting said drive wheel or reverses to the closed position and resets the for the next said door opening/closing cycle.

5. The foot operable door opener with motor assist as in claim 4 further comprising a proximity sensing device associated with said controller module, to detect an obstruction in the pathway of the door and not allow the door to close if the obstruction is in the path of the door.

6. A hands-free door opening and closing system, said system comprising:

a chassis, said chassis configured to mount to the door;

a first shaft, said first shaft being mounted with respect to said chassis;

a second shaft;

a drive wheel, said drive wheel being fixedly mounted to said second shaft;

at least one coupling link having a first end and a second end, said first end of said at least one coupling link being rotatably mounted to said first shaft, and said second shaft being rotatably mounted proximate to a second end of said at least one coupling link;

a first gear, said first gear being fixedly mounted with respect to said first shaft;

a second gear, said second gear being fixedly mounted with respect to said second shaft;

wherein said first gear is configured to mesh with said second gear;

a motor, said motor being electrically powered and configured, when actuated, to cause said first shaft to rotate a first selective amount of angular rotation;

wherein said first selective amount of angular rotation of said first shaft is configured to cause rotation of said first gear and thereby cause co-rotation of said second gear and corresponding co-rotation of said second shaft a second selective amount of angular rotation;

wherein said second selective amount of angular rotation of said second shaft thereby causes said drive wheel to rotate a third selective amount of rotation;

wherein said third selective amount of rotation of said drive wheel is correlated to a radial distance of the mounting location of said chassis on the door from the axis of a hinge of the door, and in combination with contact of said drive wheel with a floor surface or ground surface, causes rotation of the door a desired angular amount from a door closed position into a desired door open position; and a foot operable pedal, said foot operable pedal mounted to said chassis in proximity to the floor surface or ground surface and configured, when depressed by the foot of a user, to trigger said actuation of said motor.

7. The hands-free door opening and closing system according to claim 6, wherein said motor is configured to operate in reverse, to cause counter-rotation of said drive wheel, and cause counter-rotation of the door said third selective amount angular amount, to pivot the door from said desired door open position into said door closed position.

8. The hands-free door opening and closing system according to claim 7, wherein said first end of said at least one coupling link is rotatably mounted to said first shaft, and said second end of said at least one coupling link is rotatably mounted to said second shaft, said at least one coupling link being thereby configured to rotatably mount said second shaft with respect to said first shaft, and said second shaft thereby being configured to rotate with respect to said chassis between a first position and a second position; and wherein said system further comprises:

a linear actuator, a first end of said linear actuator being rotatably secured with respect to said chassis, and a second end of said linear actuator being rotatably coupled to said at least one coupling link;

a controller module;

wherein said controller module is configured to cause said linear actuator to extend to cause a desired amount of pressure between said drive wheel and the floor surface or ground surface, when said motor is actuated to open the door; and wherein said controller module is configured to retract and thereby raise said drive wheel off of the floor surface or ground surface, permitting automatic closing of the door.

9. The hands-free door opening and closing system according to claim 8, wherein said control module is configured to read and monitor door positioning and orientation information with the use of an idler wheel sensor; and wherein said controller module is configured to monitor door opening with said idler wheel sensor and if the door is not opening sufficiently, causing said linear actuator to extend further to cause an increased amount of pressure between said drive wheel and the ground to adapt to snow, ice, wind, or other variable environmental conditions.

10. The hands-free door opening and closing system according to claim 9, wherein said controller module is configured to create a time delay between said hands-free triggering and initiation of said actuation of said motor to open the door.

11. The hands-free door opening and closing system according to claim 10, wherein said controller module is configured to create a time delay between when the door reaches the desired door open position and said retraction of said linear actuator thereby permitting the automatic closing of the door.

12. The hands-free door opening and closing system according to claim 11, wherein said motor is energized by rechargeable battery powered.

13. A hands-free door opening and closing system comprising:

a chassis, said chassis configured to mount to the door;

a first shaft, said first shaft being mounted to said chassis;

a second shaft;

at least one coupling link having a first end and a second end, said first end of said at least one coupling link being pivotally mounted with respect to said first shaft;

wherein said second shaft is rotatably mounted to said at least one coupling link, proximate to said second end of said at least one coupling link and being parallel to said first shaft;

a first gear, said first gear being a spur gear positioned coaxially on said first shaft;

a second gear, said second gear being a spur gear positioned coaxially on said second shaft;

a drive wheel, said drive wheel being fixedly mounted to said second shaft;

a motor, said motor being electrically powered and configured, when activated, to cause said first shaft to rotate to thereby drive said first gear to co-rotate, and to thereby cause said second gear and said second shaft to correspondingly rotate, and cause said drive wheel to rotate a first selective amount of angular rotation;

a linear actuator, a first portion of said linear actuator being pivotally mounted with respect to said chassis, and a second portion of said linear actuator being pivotally mounted with respect to said at least one coupling link;

a controller module, said controller module configured to cause said linear actuator to extend to cause said at least one drive link and said second shaft to pivot, with respect to said first shaft, to create contact between said drive wheel and the floor surface or ground surface with a desired amount of pressure therebetween;

a foot operable pedal, said foot operable pedal mounted to said chassis in proximity to the floor surface or ground surface and configured, when depressed by a foot of a user, to trigger said linear actuator to extend to place said drive wheel into contact with the floor surface or ground surface with the desired amount of pressure, and to trigger said activation of said motor to cause said drive wheel to rotate said first selective amount of angular rotation, to thereby drive the door to move from a door closed position into a desired door open position.

14. The hands-free door opening and closing system according to claim 13, wherein said controller module is configured to cause said linear actuator to adjust in real time to maintain the desired amount of pressure between said drive wheel and the floor surface or ground surface, throughout said rotation of said drive wheel said first selective amount of angular rotation, to thereby prevent slipping of the drive wheel upon the floor surface or ground surface during movement of the door between the door closed position and the desired door open position.

15. The hands-free door opening and closing system according to claim 14, wherein said controller module is configured to create a time delay between said switch being toggled and initiation of said activation of said motor, to prevent contact between the door and the user that toggles said switch.

16. The hands-free door opening and closing system according to claim 15 wherein said motor is configured to operate in reverse, to cause counter-rotation of said drive wheel to drive the door to move from said desired door open position into said door closed position.

17. The hands-free door opening and closing system according to claim 16, wherein said controller module is configured to cause said linear actuator to retract and thereby raise said drive wheel off of the floor surface or ground surface, permitting automatic self-closing by the door; and wherein said controller module is configured to create a time delay between when the door reaches the desired door open position and said retraction of said linear actuator to raise said drive wheel.

18. The hands-free door opening and closing system according to claim 17, further comprising: a spring;

wherein said second portion of said linear actuator is configured to slide with respect to said first portion of said linear actuator;

wherein said spring is configured to bias said second portion of said linear actuator to slide with respect to said first portion, to bias said second portion of said linear actuator into contact with the floor surface or ground surface.

19. The hands-free door opening and closing system according to claim 13, wherein said first gear is configured to mesh with said second gear; and wherein said motor is configured, when activated, to directly drive said first shaft to rotate and cause said first gear to co-rotate, wherein said first gear drives said second gear to rotate and thereby causes co-rotation of said drive wheel.

20. The hands-free door opening and closing system according to claim 13, further comprising:

a third shaft, said third shaft being parallel to said first shaft;

a third gear, said third gear being a spur gear positioned coaxially on said third shaft;

a fourth gear, said fourth gear being a spur gear positioned coaxially on said first shaft;

wherein said third gear is configured to mesh with said first gear;

wherein said fourth gear is configured to mesh with said second gear; and wherein said motor is electrically-powered and is configured, when activated, to directly drive said third shaft to rotate and thereby cause said third gear to rotate, wherein rotation of said third gear drives said first gear to rotate and causes co-rotation of said fourth gear, wherein said fourth gear drives said second gear to rotate and cause co-rotation of said drive wheel.

21. The hands-free door opening and closing system according to claim 13, wherein said drive wheel is formed of a soft durometer material, said soft durometer material comprising: a rubber material.

22. The hands-free door opening and closing system according to claim 13, further comprising:

an idler wheel sensor, wherein said control module is configured to read and monitor door positioning and orientation information from rotation of said idler wheel sensor;

wherein said controller module is configured to monitor movement of the door from the door closed position with said idler wheel sensor; and wherein when the door is not opening accordingly to rotation of said drive wheel, said controller module configured to cause said linear actuator to extend further to cause an increased amount of pressure between said drive wheel and the floor surface or ground surface to adapt to snow, ice, wind, and other environmental conditions.

23. The hands-free door opening and closing system according to claim 13, wherein said at least one coupling link comprises: a first coupling link and a second coupling link joined together with a base flange to form a u-shaped coupling link member.

24. A hands-free door opening and closing system comprising:

a drive wheel;

a mounting bracket;

an axle, wherein said axle is configured to rotatably mount said drive wheel with respect to said bracket;

a motor, said motor being electrically powered and configured, when activated, to cause said drive wheel to rotate;

a chassis, said chassis configured to mount to the door;

means for linear actuating of said bracket-mounted drive wheel relative to said chassis between a retracted position and one or more extended positions;

a controller module, said controller module configured to cause said means for linear actuating to extend into any of said one or more extended positions to cause a desired amount of pressure between said drive wheel and the floor surface or ground surface;

a foot operable pedal, said foot operable pedal being mounted to said chassis in proximity to the floor surface or ground surface and configured, when depressed by a foot of a user, to trigger said activation of said motor to cause said drive wheel to rotate said a selective amount of angular rotation, to thereby drive the door to move from a door closed position into a desired door open position, when said motor is actuated to open the door.

* * * * *